United States Patent
Meurer

(10) Patent No.: US 7,314,572 B1
(45) Date of Patent: Jan. 1, 2008

(54) METHODS OF AND APPARATUS FOR LOW-ANGLE-TRAY SETTLING WITH MULTI-ZONE CONFIGURATION

(75) Inventor: Charles Lonnie Meurer, Golden, CO (US)

(73) Assignee: Meurer Research, Inc., Golden, CO (US)

( * ) Notice: Subject to any disclaimer, the term of this patent is extended or adjusted under 35 U.S.C. 154(b) by 83 days.

(21) Appl. No.: 11/354,396

(22) Filed: Feb. 14, 2006

(51) Int. Cl.
*B01D 21/04* (2006.01)

(52) U.S. Cl. .................. 210/802; 210/803; 210/521; 210/527

(58) Field of Classification Search ............ 210/801, 210/802, 803, 521, 522, 523, 524, 541; 428/177, 428/192
See application file for complete search history.

(56) References Cited

U.S. PATENT DOCUMENTS

| | | | |
|---|---|---|---|
| 630,962 A | 8/1899 | Wood | |
| 747,113 A | 12/1903 | Allen | |
| 748,981 A | 1/1904 | Oliver | 210/540 |
| 1,102,463 A | 7/1914 | Wyckoff | 210/519 |
| 1,176,775 A * | 3/1916 | Morris | 210/521 |
| 1,493,861 A | 5/1924 | Raymond | 210/519 |
| 1,543,621 A | 6/1925 | Ruckstuhl | 210/522 |
| 1,557,340 A | 10/1925 | Sandmann | 210/522 |
| 1,703,967 A | 3/1929 | Sperr, Jr. | 261/122.1 |
| 1,705,329 A * | 3/1929 | Hills et al. | 210/521 |
| 1,717,713 A | 6/1929 | Logan | 261/122.1 |
| 1,793,510 A | 2/1931 | Raymond | 210/519 |
| 1,918,742 A | 7/1933 | Elrod | 210/525 |
| 1,968,031 A * | 7/1934 | Donohue | 210/802 |
| 2,090,813 A * | 8/1937 | Schumacher | 210/802 |
| 2,134,203 A * | 10/1938 | Gwynne et al. | 210/521 |
| 2,144,385 A | 1/1939 | Nordell | 210/3 |
| 2,242,139 A | 5/1941 | Monroe | 210/540 |
| 2,302,450 A | 11/1942 | Laughlin | 210/130 |
| 2,314,977 A | 3/1943 | Green | 210/522 |
| 2,328,655 A | 9/1943 | Lannert | 261/122 |
| 2,379,615 A | 7/1945 | Walker | 210/176 |
| 2,473,297 A * | 6/1949 | Parker | 210/522 |
| 2,502,187 A | 3/1950 | Wahlgren | 261/122 |
| 2,589,882 A | 3/1952 | Sinner et al. | 242/388 |

(Continued)

OTHER PUBLICATIONS

Hazen, A.; On Sedimentation, 1904, Transactions of the American Society of Civil Engineers, vol. 53, pp. 45-88.

*Primary Examiner*—Christopher Upton
(74) *Attorney, Agent, or Firm*—C. E. Martine, Jr.

(57) ABSTRACT

Settleable-particles are separated from a dirty flow of settleable-particles and fluid by trays having a planar section configured with opposed ends and opposed sides, and an entrance edge and an exit edge on opposed ends. The section has opposed side edges, and an upturned entrance lip at each of the entrance and exits edges, with downturned lips at each side edge. A settler unit has one tray as an upper tray and another tray as a lower tray, the two trays being mounted parallel and at a low-angle to define a dirty flow entrance, a clean flow exit, and a pocket between the upturned entrance lip and the upturned exit lip for receiving and capturing settled-particles from the dirty flow while cleaner flow flows from the entrance to the exit. A sludge exit is at each side of the trays for permitting the captured settled-particles to exit the pocket.

34 Claims, 18 Drawing Sheets

U.S. PATENT DOCUMENTS

| | | | |
|---|---|---|---|
| 2,640,682 A | 6/1953 | Votypka | 242/388 |
| 2,650,810 A | 9/1953 | Nordell | 261/121 |
| 2,684,330 A | 7/1954 | French | 210/8 |
| 2,897,976 A | 8/1959 | Arthur | 210/173 |
| 2,930,485 A | 3/1960 | Nordell | 210/158 |
| 2,947,525 A | 8/1960 | Klein | 261/122 |
| 2,997,284 A | 8/1961 | Nechine | 261/DIG. 47 |
| 3,063,689 A | 11/1962 | Coppock | 261/124 |
| 3,083,953 A | 4/1963 | Langdon et al. | 261/122 |
| 3,134,324 A | 5/1964 | Schwaninger | 101/269 |
| 3,182,799 A * | 5/1965 | Kroffa | 210/802 |
| 3,321,185 A | 5/1967 | Zenke | 242/388 |
| 3,331,510 A * | 7/1967 | Arnold | 210/521 |
| 3,333,704 A | 8/1967 | McGivern | 210/242 |
| 3,353,683 A | 11/1967 | Geiger | 210/527 |
| 3,416,176 A | 12/1968 | Ravitts | 15/1.7 |
| 3,494,462 A | 2/1970 | Baud | 210/112 |
| 3,613,564 A | 10/1971 | Adamski | 100/118 |
| 3,613,889 A | 10/1971 | Reed | 210/84 |
| 3,616,651 A | 11/1971 | Chang et al. | 405/158 |
| 3,669,271 A | 6/1972 | McGivern | 210/128 |
| 3,706,384 A | 12/1972 | Weijman-Hane | 210/519 |
| 3,707,737 A | 1/1973 | Brower | 15/1.7 |
| 3,802,676 A | 4/1974 | Thayer | 261/122 |
| 3,820,954 A * | 6/1974 | Stonner et al. | 210/521 |
| 3,846,291 A | 11/1974 | Brucker | 210/14 |
| 3,864,441 A | 2/1975 | Sizuki | 261/DIG. 47 |
| 3,868,335 A * | 2/1975 | Stonner et al. | 210/522 |
| 3,872,960 A | 3/1975 | Gabor | 197/53 |
| 3,880,965 A | 4/1975 | Dudis et al. | 261/122 |
| 3,903,000 A | 9/1975 | Miura et al. | 210/251 |
| 3,925,205 A | 12/1975 | Sparham | 210/73 |
| 3,963,624 A | 6/1976 | Henderson et al. | 210/521 |
| 3,980,561 A | 9/1976 | Miyagi et al. | 210/151 |
| 3,985,207 A | 10/1976 | Petit | 187/213 |
| 4,002,105 A | 1/1977 | Bell et al. | 92/65 |
| 4,048,267 A | 9/1977 | Walker et al. | 261/122.1 |
| 4,071,443 A | 1/1978 | Gorski et al. | 210/7 |
| 4,090,966 A | 5/1978 | Clendenen | 210/143 |
| 4,122,016 A * | 10/1978 | Tao et al. | 210/521 |
| 4,136,012 A | 1/1979 | Louboutin et al. | 210/208 |
| 4,148,731 A | 4/1979 | Brigante | 210/223 |
| 4,193,871 A | 3/1980 | White et al. | 210/525 |
| 4,194,976 A | 3/1980 | Robinsky | 210/137 |
| 4,198,871 A | 4/1980 | Dunn et al. | 74/37 |
| 4,221,671 A | 9/1980 | Meurer | 210/522 |
| 4,245,396 A | 1/1981 | Maffet | 34/391 X |
| 4,246,102 A | 1/1981 | Hjelmner et al. | 210/704 |
| 4,294,696 A | 10/1981 | Thayer | 261/122.1 |
| 4,346,005 A | 8/1982 | Zimmerman | 210/232 |
| 4,401,335 A | 8/1983 | Godbersen | 187/213 |
| 4,401,576 A | 8/1983 | Meurer | 210/803 |
| 4,431,597 A | 2/1984 | Cramer et al. | 261/DIG. 47 |
| 4,477,939 A | 10/1984 | White et al. | 15/246.5 |
| 4,514,303 A | 4/1985 | Moore | 210/519 |
| 4,551,246 A | 11/1985 | Coffing | 210/221 |
| 4,555,340 A | 11/1985 | Boyle | 210/248 |
| 4,859,327 A | 8/1989 | Cox et al. | 210/219 |
| 4,865,753 A | 9/1989 | Meurer | 210/802 |
| 4,886,605 A | 12/1989 | Herve | 210/519 |
| 4,889,624 A | 12/1989 | Soriente et al. | 210/232 |
| 4,926,973 A | 5/1990 | Smith | 187/213 |
| 4,957,014 A | 9/1990 | Burke | 74/89.22 |
| 4,957,628 A | 9/1990 | Schulz | 210/519 |
| 4,960,546 A | 10/1990 | Tharp | 261/122 |
| 4,971,692 A * | 11/1990 | Sklokin et al. | 210/519 |
| 4,986,141 A | 1/1991 | Meurer | 74/89.22 |
| 4,988,441 A | 1/1991 | Moir | 210/522 |
| 5,013,435 A | 5/1991 | Rider et al. | 210/262 |
| 5,013,493 A | 5/1991 | Tharp | 261/122 |
| 5,018,925 A | 5/1991 | Ganser | 187/213 |
| 5,021,153 A | 6/1991 | Haws | 210/221.24 |
| 5,059,312 A | 10/1991 | Galletti | 210/540 |
| 5,087,391 A | 2/1992 | Brown | 261/122.1 |
| 5,101,849 A | 4/1992 | Richard | 137/15 |
| 5,116,443 A | 5/1992 | Meurer | 156/209 |
| 5,120,436 A | 6/1992 | Reichner | 210/207 |
| 5,125,931 A | 6/1992 | Schulz | 44/552 |
| 5,132,010 A | 7/1992 | Ossenhop | 210/522 |
| 5,143,625 A | 9/1992 | Ballard | 210/802 |
| 5,160,460 A | 11/1992 | Goetz et al. | 261/122.1 |
| 5,204,000 A | 4/1993 | Steadman et al. | 210/519 |
| 5,217,614 A | 6/1993 | Meurer | 210/521 |
| 5,223,154 A * | 6/1993 | MacPherson et al. | 210/801 |
| 5,290,487 A | 3/1994 | Ludwig | 261/122.1 |
| 5,300,232 A | 4/1994 | Barrington et al. | 210/742 |
| 5,366,638 A | 11/1994 | Moore | 210/802 |
| 5,378,378 A | 1/1995 | Meurer | 210/788 |
| 5,388,480 A | 2/1995 | Townsend | 242/388.5 |
| 5,391,306 A | 2/1995 | Meurer | 210/802 |
| 5,427,471 A | 6/1995 | Godbersen | 187/213 |
| 5,435,924 A | 7/1995 | Pentz et al. | 210/803 |
| 5,497,854 A | 3/1996 | Fang | 187/213 |
| 5,510,025 A | 4/1996 | Benesi | 210/227 |
| 5,552,050 A | 9/1996 | Valentin | 210/525 |
| 5,655,727 A | 8/1997 | Meurer | 242/388 |
| 5,692,435 A | 12/1997 | Nissen | 100/126 |
| 5,693,323 A | 12/1997 | Yamamoto | 210/540 |
| 5,804,104 A | 9/1998 | Brauch et al. | 210/220 |
| 5,830,356 A | 11/1998 | Kaupilla | 210/528 |
| 5,945,040 A | 8/1999 | Brauch et al. | 261/122.1 |
| 6,045,709 A | 4/2000 | Roberts | 210/803 |
| 6,158,142 A | 12/2000 | Brauch et al. | 34/144 |
| 6,234,323 B1 | 5/2001 | Sarroug | 210/523 |
| 6,245,243 B1 | 6/2001 | Meurer | 210/802 |
| 6,497,249 B1 | 12/2002 | Swan et al. | 210/527 |
| 6,951,620 B2 | 10/2005 | Brauch et al. | 210/803 |
| 7,021,472 B1 | 4/2006 | Meurer | 210/523 |

* cited by examiner

US 7,314,572 B1

METHODS OF AND APPARATUS FOR LOW-ANGLE-TRAY SETTLING WITH MULTI-ZONE CONFIGURATION

RELATED APPLICATION

This application is related to a co-pending patent application filed in the name of C. Lonnie Meurer on Feb. 14, 2006, and entitled METHODS OF AND COMMON GANTRY DRIVE FOR SINGLE-PASS CLEANING OF MULTIPLE STAGES OF A MATERIAL SEPARATION AND REMOVAL SYSTEM Ser. No. 11/354,352 the "co-pending application", the disclosure of which is incorporated herein by reference.

FIELD

The present invention relates to the separation of materials from fluids, and more particularly, to a multi-zone configuration of a tray settler arranged for increased settling efficiency during low-angle flow of settleable-particle-laden fluid by defining a relatively-still low-angle sludge collection zone alongside a low-angle fluid flow path of the settleable-particle-laden fluid, wherein the sludge rapidly settles into the relatively-still low-angle sludge collection zone, and by configuring the relatively-still low-angle sludge collection zone to receive a transversely-thin, transversely-movable pusher configured to push the settled particles out of the relatively-still low-angle sludge collection zone without crossing the fluid flow path.

BACKGROUND

In the processing of fluids, such as water and waste water, it is necessary to remove (or separate) materials from the fluids to render the fluids suitable for use or reuse. The materials may initially be in, or mixed with, the fluids, such as liquid or water or water-like fluids typically found in clarifiers, flocculators or other liquid treatment plants. For example, clarifiers that are referred to as settlers, promote settling of the material to the bottom of a basin. The material is first collected from the fluids by flat plates or hollow tubes of the settlers. Generally, the material to be removed includes particles that are denser than the fluid, or that are processed to become denser than the fluid. As a result of the density difference, the particles move downwardly under the force of gravity as the fluid and the particles flow. This type of material is referred to herein as "settleable-particles". The fluid with this type of material (settleable-particles) is referred to herein as "particle-laden fluid", or "settleable-particle-laden fluid". Also, references herein to "fluid" are references to such "particle-laden fluid" and "settleable-particle-laden fluid", except for "cleaner fluid", which is the "particle-laden fluid" and "settleable-particle-laden fluid" from which some of the settleable-particles have been removed (as by settling), and except for "clean fluid", which is the "particle-laden fluid" and "settleable-particle-laden fluid" from which most (if not all) of the settleable-particles have been removed (as by settling).

A simple settleable-particle removal process slowly flows the particle-laden fluid through a long basin (e.g., a 100 foot long basin). The force of gravity (FG) acts downwardly on the settleable-particles, which move toward and to the bottom of the basin through a settling distance that is generally equal to the depth of the fluid in the basin (e.g., 10 feet). The settleable-particles that are moving toward the bottom may be referred to as "settling-settleable-particles" (or "settling-particles") until they reach (i.e., settle to) the bottom of the basin. The particles at (and on or near) the bottom of the basin may be referred to as "sludge" or "settled-particles". Sludge is characterized by a greater density of the settleable-particles in a given volume than when the settleable-particles are flowing in the fluid or settling from the same given volume of the fluid. To successfully remove settleable-particles from high numbers of gallons per minute (GPM) of such flowing fluid by such settling through the exemplary ten foot settling distance, the area of the floor of such basins for fluid flow and settling must be unacceptably great (e.g., 3 square feet for 1 GPM).

In attempts to substantially reduce such area required to settle the settleable-particles from such fluids, various clarifier apparatus have been proposed for use in the basins. One type of proposed clarifier apparatus is a settler having at least two closely-spaced (e.g., 1 inch) flat thin-edge plates. The flat thin-edge plates have thin edges to allow a flow of particle-laden fluid into a narrow (e.g., 1 inch high) flow channel between the two closely-spaced flat thin-edge plates. As proposed, the flat thin-edge plates were horizontal, but as described below this proposed horizontal approach has to Applicant's knowledge never been successfully implemented even though the narrow flow channel enables a settling depth to be very short (e.g., slightly less than the narrow 1 inch height of the flow channel). As proposed, settleable-particles would settle through such settling depth onto a lower plate of the two flat thin-edge plates. Upon settling onto the lower flat thin-edge plate, the settleable-particles would form the sludge. Because the proposed flat thin-edge plate would be horizontal, there was a theoretical but unrealized benefit of somewhat shortening the length of the fluid-flow distance (e.g., horizontal) required to separate the settleable-particles from the particle-laden fluid to form the sludge on the lower flat thin-edge plate.

However, problems have arisen in attempts to make practical use of the theoretical design of these proposed closely-spaced horizontal flat thin-edge plates. For example, the flow channel between two of these proposed flat thin-edge plates is very narrow (i.e., the 1 inch). It was intended that the settleable-particles would settle onto the flat thin-edge lower plate, and would form the more dense sludge on the flat thin-edge horizontal lower plate. As a result, the intent of the proposed two closely-spaced flat horizontal thin-edge plates was to confine the ongoing flow of the fluid through the narrow flow channel in the same space (or volume) that is occupied by the sludge. This proposed ongoing fluid flow would thus have a flow rate that would increase as the thickness of the settled sludge increases. The increase in the flow rate would be in a direction of the flow (e.g., an X direction), which is undesirable because it requires more flow length (in the X direction) to settle the settleable-particles from a fluid flowing at a high flow rate as compared to fluid flowing at a lower flow rate. This requirement is due to the higher flow rate fluid carrying the sludge in the narrow flow channel above the lower flat thin-edge plate, where such carrying would be in the X direction of the fluid flow. The higher flow rate would not allow the settling to occur rapidly in the downward (or Z) direction of the force of gravity (FG). This carrying of the sludge in the X direction would offset (reduce) the benefit of attempting to shorten the settling length (in the X direction), and would make it necessary to increase the length and thus the area of these types of proposed settlers. In other words, the ongoing higher flow rate of the fluid through the same narrow flow channel space as is occupied by the sludge would tend to carry the sludge through that same space in the X direction of the fluid flow and would require more flow length in the X direction to do the same amount of settling.

There are also disadvantages of attempts to overcome these problems of the closely-spaced flat thin-edge plates of the above-described proposed horizontal settlers. For example, a standard, widely-used closely-spaced flat-and-inclined-thin-edge-plate settler orients two closely-spaced flat thin-edge plates on an incline of about fifty-five degrees with respect to the horizontal to define a steep upward flow of fluid and settleable-particles. As a result, particles that have settled onto the lower flat-and-inclined-thin-edge plate tend to be moved down the incline by a (non-vertical) component of the force of gravity FG. This component acts parallel to the steep incline, so that the settled-particles are caused to move down the steep incline and fall out from between the closely-spaced flat-and-inclined-thin-edge plates onto a bottom of the basin below the closely-spaced flat-and-inclined-thin-edge-plates. On the bottom, the settled-particles form the sludge.

Despite wide use of the closely-spaced flat-and-inclined-thin-edge-plates, and despite improvements, disadvantages remain, such that there is still a need to improve the closely-spaced flat-and-inclined-thin-edge-plate settlers. For example, an effective settling area of a settler is a horizontal area. The effective settling area of the lower inclined-and-flat-thin-edge-plate onto which the particles settle is based on less than 100% of the inclined length of that lower inclined-and thin-edge-plate because a value of this effective settling area is a function of the cosine of the incline angle (e.g., less than one). At a 55 degree incline angle, the effective settling area is about 0.5 times the inclined length. As a result, not all of the inclined length of the inclined-and-flat-thin-edge-plates contributes to the effective settling area for collection of the settled-particles (sludge). Also, as the settling-particles are moved by the component of the force of gravity FG down the incline and fall out from between the two closely-spaced inclined-and-flat-thin-edge-plates onto the bottom of the basin, the falling settling-particles cross (i.e., intersect) a typical inlet flow stream of incoming settleable-particles and fluid. Such inlet flow stream is referred to herein as "dirty-flow" and may include, for example, non-settleable particles. Such dirty-flow flows along and somewhat above the bottom of the basin. Part of this dirty-flow enters an open bottom end of a flow channel between two closely-spaced inclined-and-flat-thin-edge plates. This dirty-flow may tend to carry settling and already-settled particles upwardly between the closely-spaced inclined-and-flat-thin-edge plates, which reduces the efficiency of the settling operation.

What is needed then is a way to more efficiently separate settleable-particles from particle-laden fluid. The needed way would avoid cross flow of settling-particles and settled particles with incoming dirty-flow entering the settler. Also, the needed way would promote rapid settling of the settled-particles from the flow stream to shorten the required settling length of the settler. The needed way would also reduce a tendency of the flow of cleaner-fluid within the flow channels to carry settled-particles horizontally or upwardly along the flow channels. Further, the needed way would provide practical methods and apparatus for removing the settled-particles (sludge) from between closely-spaced plates of a settler.

SUMMARY

Briefly, embodiments of the present invention meet all of the above needs by providing more efficient ways of separating settleable-particles from particle-laden fluid. One way of increasing efficiency is by promoting rapid settling of the settled-particles from a flow channel into a relatively-still low-angle sludge collection zone having a pocket that captures the settled-particles. In this manner, it is possible to shorten the required settling length of the settler, because a continuing flow of cleaner fluid within the flow channel is less-likely to carry settled-particles from the pocket back into and along the flow channel. Another way of increasing efficiency is by a new configuration and process of the embodiments of the present invention in which cross flow of the settled-particles with incoming dirty-flow is avoided. Such configuration also provides practical methods and apparatus for removing the settled-particles from the pocket, which removal is separate from the continuing flow of cleaner fluid within the flow channel and without cross flow of the settled-particles with incoming dirty-flow.

One aspect of an embodiment of the present invention is to provide apparatus and methods including a tray for use in separating settleable-particles from a dirty flow of settleable-particles and fluid. The tray is configured with a planar central section having opposed ends and opposed sides, the planar section being configured with an entrance edge on one opposed end and an exit edge on another opposed end. The planar section is configured with opposed side edges, and with an upturned entrance lip at the entrance edge and an upturned exit lip at the exit edge. The tray is also configured with a downturned first side lip at one side edge and a downturned second side lip at the other side edge.

Another aspect of an embodiment of the present invention is to provide a settler unit for separating settleable-particles from a dirty flow of the settleable-particles and fluid. The settler unit comprises at least two of the trays, one tray being oriented as an upper tray and one tray being oriented as a lower tray. A frame is configured to support each of the upper tray and lower tray in the respective upper tray and lower tray orientations and in a mutually parallel spaced low-angle orientation for defining the settler unit so that the settler unit has a dirty flow entrance slot defined by the entrance edge of the upper tray and by the upturned lip at the entrance edge of the lower tray. A clean flow exit slot is defined by the exit edge of the upper tray and by the upturned lip at the exit edge of the lower tray. A pocket is defined between the upturned entrance lip and the upturned exit lip. The lip configurations and pocket promote rapid settling of the settleable-particles and promote rapid receiving and capturing in the pocket of settled-particles from the dirty flow while cleaner flow flows from the entrance slot to the exit slot. A sludge exit slot is defined at each side of the trays for permitting the captured settled-particles to exit the pocket. In one embodiment of the present invention each sludge exit slot is defined by one side edge of the lower tray and by one downturned lip at the corresponding side edge of the upper tray. In another embodiment of the present invention each sludge exit slot is defined by one side edge of the lower tray and by one elongated support (such as bar stock) under the corresponding side edge of the upper tray.

One further aspect of an embodiment of the present invention is to provide apparatus and methods for rapidly settling settleable-particles from a fluid in a flow stream. A flow channel may extend at a low-angle and is configured to receive the dirty-flow (fluid and the settleable-particles in the flow stream). The flow channel extends in a longitudinal direction. A pocket is configured alongside the flow channel. The pocket extends in three orthogonal directions: in the longitudinal direction, in a particle settling direction perpendicular to the longitudinal direction; and in a sludge removal direction transverse to both the longitudinal and settling directions. The pocket is configured to promote rapid settling of particles from the fluid flow stream in the settling direction, and to retain the settled-particles separately from the fluid flow stream.

A related aspect of an embodiment of the present invention is to provide apparatus and methods for rapidly settling settleable-particles from a fluid flow stream. A plurality of generally planar trays may be provided. Each tray is configured with an entrance edge and a fluid exit edge, and a lip extending along each of the entrance edge and the fluid exit edge, with each lip being generally perpendicular with respect to the planar tray. A frame is provided for supporting the trays generally horizontally in mutually-parallel spaced relationship with one tray above a next lower adjacent tray and the one tray below a next above adjacent tray to divide the fluid flow stream into a plurality of separate flow paths that flow at a low-angle generally parallel to a longitudinal axis (X) of the apparatus. The frame mounts the entrance edge and the fluid exit edge of each of the trays extending transversely (Y) with respect to the longitudinal axis (X) so that each lip extends parallel to a particle settling direction (Z) that is perpendicular to the longitudinal axis (X). The mounting of each one of the trays is effective to define an upper boundary of a respective one of the separate flow paths. The mounting of each one of the trays with the respective lips extending parallel to the settling direction (Z) results in the respective lips extending upwardly to define a respective relatively-still sludge collection zone below each respective next-above separate flow path. The respective lip that extends along each of the respective entrance edge and the respective fluid exit edge is configured to protect the respective relatively-still sludge collection zone from higher flow rates of a flow of the flow stream above the relatively-still sludge collection zone. The respective relatively-still sludge collection zones that are so protected have a lower rates of flow compared to the higher rates of flow of the flow stream that are above the relatively-still sludge collection zone. Thus, the sludge collection zones are referred to as relatively-still sludge collection zones, with the phrase "relatively-still" describing the lower flow rates that render the settling rapid and that enable shortening of the length of the settler. Further, the relatively-still sludge collection zone receives and retains settled-particles that have settled from the respective next-above separate flow path.

Another aspect of an embodiment of the present invention is to provide apparatus and methods for rapidly settling settleable-particles from a fluid flow stream. A frame is configured with a plurality of opposed and spaced pairs of angle brackets. The spacing of the brackets of one pair corresponds to a width of the fluid flow stream. The width is in a transverse direction. The angle brackets extend at a low-angle generally-in the direction of a longitudinal axis of the apparatus. The longitudinal axis is perpendicular to the transverse direction. A longitudinal length of the angle brackets in the direction of the longitudinal axis is configured with respect to (a) a particle settling distance extending in a settling direction perpendicular to the longitudinal axis, (b) the transverse width, and (c) a rate of flow of the fluid flow stream. One opposed and spaced pair of angle brackets is between a (i) next upper pair of the opposed and spaced pairs of angle brackets, and (ii) next lower pair of the opposed and spaced pairs of angle brackets. A plurality of generally planar trays may be provided. One tray is supported by and extends between the angle brackets of each one of the pairs of the angle brackets. A next upper one of the trays is supported by the next upper pair of the opposed and spaced pairs of angle brackets. A next lower one of the trays is supported by the next lower pair of the opposed and spaced pairs of angle brackets. Each tray is configured with an entrance edge and a fluid exit edge. Each of the edges is oriented in the transverse direction. Each tray is further configured with a lip extending along each of the entrance edge and the fluid exit edge, each lip being generally perpendicular with respect to the respective planar tray and extending upwardly toward but separated by a fluid flow path from the next upper tray. The next upper tray and tops of the lips of the one tray cooperate to define an entrance to the fluid flow path. The flow path extends at a low-angle generally in the direction of the longitudinal axis and generally in the longitudinal direction. The plurality of adjacent trays divides the fluid flow stream into a vertical series of the separate fluid flow paths, each separate fluid flow path having a flow path depth FD. The lips of the one tray cooperate with the respective next upper one tray to direct each respective separate fluid flow path into a settling flow zone adjacent to and along the bottom of the next upper tray. The lips of the one tray cooperate with the respective one tray to define a relatively-still sludge collection zone below the respective settling flow zone. The cooperating lips of the one tray are configured to define a depth PD of the respective relatively-still sludge collection zone in the settling direction. The total of the values of the depths FD and PD are related to the longitudinal distance required to settle the particles. With the lip configurations, the respective relatively-still sludge collection zone rapidly receives, and then retains, settled-particles that have settled from the next above settling flow path.

Another aspect of another embodiment of the present invention is to provide apparatus and methods for rapidly settling settleable-particles from a fluid flow stream. A frame is configured with a plurality of opposed and spaced pairs of supports such as bar stock members. The spacing of the supports of one pair corresponds to the width of the fluid flow stream in a transverse direction. The bar stock members extend at a low-angle generally in the direction of a longitudinal axis of the apparatus. The axis is perpendicular to the transverse direction. A longitudinal length of the bar stock members in the direction of the longitudinal axis is configured with respect to (a) a particle settling distance extending in a settling direction perpendicular to the axis, (b) the transverse width, and (c) a rate of flow of the fluid flow stream. One opposed and spaced pair of bar stock members is between a (i) next upper pair of the opposed and spaced pairs of bar stock members, and (ii) next lower pair of the opposed and spaced pairs of bar stock members. Of a plurality of generally planar trays, one tray is supported by and extends between the bar stock members of each one of the pairs of the members. A next upper one of the trays is supported by the next upper pair of the opposed and spaced pairs of members. A next lower one of the trays is supported by the next lower pair of the opposed and spaced pairs of members. Each tray is configured with an entrance edge and a fluid exit edge. Each of the edges is oriented in the transverse direction. Each tray is further configured with a lip extending along each of the entrance edge and the fluid exit edge, each lip being generally perpendicular with respect to the respective planar tray and extending upwardly toward but separated by a fluid flow path from the next upper tray. The next upper tray and tops of the lips of the one tray cooperate to define an entrance to the fluid flow path. The flow path extends at a low-angle generally in the direction of the axis and generally in the longitudinal direction. The plurality of adjacent trays divides the fluid flow stream into a vertical series of the separate fluid flow paths, each separate fluid flow path having a flow path depth FD. The lips of the one tray cooperate with the respective next upper one tray to direct each respective separate fluid flow path into a settling flow zone adjacent to and along the bottom of the next upper tray. The lips of the one tray cooperate with the respective one tray to define a relatively-still sludge collection zone below the respective settling flow zone. The cooperating lips of the one tray are configured to define a depth PD of the respective relatively-still sludge collection zone in the settling direction. The total of the values of the depths FD and PD are related to the longitudinal distance required to settle the particles. With the lip configurations, the respective relatively-still sludge collection zone rapidly receives, and then retains, settled-particles that have settled from the next above settling flow path.

Yet another aspect of an embodiment of the present invention is to provide apparatus and methods for rapidly settling settleable-particles from a fluid flow stream, wherein each tray is further configured with a sludge exit edge at a low-angle extending generally parallel to the longitudinal axis (X). Each sludge exit edge extends generally in the X direction transverse to the entrance edge and extends transversely with respect to the fluid exit edge. The frame, via supports such as the bar stock members or by the angle brackets, mounts the sludge exit edges of each of the trays to extend at a low-angle generally parallel to the longitudinal (X) axis. In one embodiment the frame is configured with a sludge removal lip corresponding to each of the sludge exit edges. This lip may be supported by the frame and be configured as one of the bar stock members or as one of the angle brackets or as an integral part of the respective tray. Each of the sludge removal lips extends along and under a respective sludge exit edge so that transversely opposed pairs of the sludge removal lips support a respective one of the trays. In various embodiments, the tray may extend in a low-angle direction generally parallel to the transverse (Y) orientation, or may extend in a low-angle direction generally parallel to the longitudinal (X) orientation, or may extend in a low-angle direction generally parallel to both the transverse (Y) and longitudinal (X) orientations.

A further aspect of an embodiment of the present invention is to provide apparatus and methods for separating-settleable particles from a fluid flow stream, wherein each of the sludge removal lips is further configured to extend from under the respective sludge exit edge of one tray. The extending sludge removal lip is (or extends) parallel to the settling direction (Z) and toward the next lower adjacent tray for a distance about equal to the height of the respective flow path for which the one tray is the upper boundary. Each sludge removal lip of a respective pair of sludge removal lips is spaced from the respective sludge exit edge of a next lower adjacent tray to define a sludge exit slot extending parallel to the longitudinal axis (X).

A still further aspect of an embodiment of the present invention is to provide apparatus and methods for rapidly settling settleable-particles from a fluid flow stream, wherein a sludge pusher is received in each of the relatively-still sludge collection zones. Each sludge pusher is configured to extend at a low-angle generally parallel to the longitudinal (X) axis and parallel to the settling direction (Z) substantially completely between the entrance edge and the fluid exit edge of a respective tray and to extend along the full extent of the depth of the respective relatively-still sludge collection zone. Each sludge pusher is movable in the transverse direction (Y) in the respective relatively-still sludge collection zone against the settled-particles (i.e., against sludge that has settled from the adjacent next-above flow path). The movement of the sludge pushers is effective to remove the sludge from the respective relatively-still sludge collection zones while the fluid continues to flow at a low-angle in the adjacent next-above flow path generally in the direction of the longitudinal axis (X).

Another aspect of an embodiment of the present invention is to provide apparatus and methods for rapidly settling settleable-particles from a fluid flow stream, wherein a gantry is configured to straddle all of the trays that are mounted at a low-angle generally horizontally in a mutually-parallel spaced relationship. The gantry slidably connects to each sludge pusher received in each respective relatively-still sludge collection zone of the apparatus. The gantry is movable in the transverse direction (Y) to move each sludge pusher in the respective relatively-still sludge collection zone against sludge that has settled from the adjacent next-above flow path. The movement of each sludge pusher is effective to remove the sludge from the respective relatively-still sludge collection zone while the cleaner fluid in the adjacent next-above flow path continues to flow in the direction (X) of the longitudinal axis.

Another aspect of an embodiment of the present invention is to provide apparatus and methods for rapidly settling settleable-particles from a fluid flow stream, wherein a sludge receiver chamber is configured to define a sludge combination zone extending vertically and adjacent to the respective sludge exit slots. The chamber is configured with an opening corresponding to each sludge exit slot to receive from the respective pocket the respective sludge (i.e., particles that were settled and retained in and removed from that respective pocket). The chamber is configured to allow the received settled-particles from all of the relatively-still sludge collection zones to fall under the force of gravity (FG) and combine separately from the respective flow paths and separately from the incoming dirty flow. The chamber is further configured with a sludge storage zone for containing the fallen and received combined settled-particles, the containing being separate from the respective flow paths and separate from the incoming dirty flow.

Yet another aspect of an embodiment of the present invention is to provide methods for rapidly settling settleable-particles from a fluid flow stream, wherein there is an operation of flowing the fluid flow stream with the particles into a flow channel that extends at a low-angle. The flow channel extends generally in a longitudinal direction (X). An operation defines a pocket alongside but protected from the flow channel. The pocket extends at the low-angle generally in the longitudinal direction (X) and in a settling direction (Z) that is perpendicular to the longitudinal direction (X). An operation controls the flow of the fluid flow stream in the flow channel to promote rapid settling of the particles in the settling direction (Z). The rapid settling is out of the fluid flow stream and into the pocket to separate the settleable-particles from the fluid flow stream.

A further aspect of an embodiment of the present invention is to provide methods for rapidly settling settleable-particles from a fluid flow stream, wherein there is an operation of transporting the settled-particles in the pocket in a Y direction transverse to both the longitudinal (X) direction and the settling (Z) direction to remove the settled-particles from the pocket without moving the removed-settled-particles into the fluid flow stream or into the incoming dirty flow.

A still further aspect of an embodiment of the present invention is to provide methods for rapidly settling settleable-particles from a fluid flow stream, wherein there is an operation of containing the removed-settled-particles in a zone that is separate from the fluid flow stream and from the incoming dirty flow.

A related aspect of an embodiment of the present invention is to provide methods for rapidly settling settleable-particles from a fluid flow stream, wherein there is an operation of collecting the cleaner-fluid of the fluid flow stream that flows past the pocket to maintain the collected-cleaner-fluid in the flow stream separate from the removed-settled-particles in the pocket.

Another aspect of an embodiment of the present invention is to provide methods for rapidly settling settleable-particles from a fluid flow stream, wherein the low-angle is within a range of from about horizontal to an angle of about twenty degrees with respect to horizontal, and the transverse direction (Y) is oriented at the low-angle. The transporting operation may comprise further operations, e.g., providing a pusher configured as an elongated rectangle that is narrow in the transverse direction (Y) and elongated in the direction of the low-angle to extend completely across the pocket and vertically in the settling direction (Z) about equal to a depth of the pocket in the settling direction. Also, there is an operation of mounting the pusher in the pocket with the elongated blade at the low-angle and generally parallel to the longitudinal direction (X) and parallel to the settling direction (Z). Also, there is an operation of driving a gantry that straddles the pusher to move the mounted pusher across the pocket at a low-angle generally in the Y direction transverse to the longitudinal X direction and push the settled-particles (sludge) out of the pocket.

A further aspect of an embodiment of the present invention is to provide methods for rapidly settling settleable-particles from a fluid flow stream, wherein a series of the pockets is defined alongside and protected from a next-above one of the flow channels, the pockets of the series of pockets extending one after another in a low-angle generally parallel to the longitudinal X direction to provide more assurance of capturing the settled-particles.

Other aspects and advantages of embodiment of the present invention will become apparent from the following detailed descriptions, taken in conjunction with the accompanying drawings, illustrating by way of example, the principles of embodiments of the present invention.

BRIEF DESCRIPTION OF THE DRAWINGS

The present invention will be readily understood by the following detailed description in conjunction with the accompanying drawings, wherein like reference numerals designate like structural elements or operations.

DETAILED DESCRIPTION OF THE PREFERRED EMBODIMENTS

Embodiments of an invention are described for providing ways of more efficiently separating settleable-particles from particle-laden fluid. By increasing efficiency by promoting rapid settling of the settled-particles from a flow channel into a relatively-still sludge collection zone having a pocket that captures the settled-particles, further flow of cleaner-fluid within the flow channel is less likely to carry the settled-particles from the pocket back into and along the flow channel. By also avoiding cross flow of settled-particles with incoming dirty flow (fluid and settleable-particles), efficiency is also improved. Methods and apparatus are also provided for removing the settled-particles from the pocket, which removal is without cross flow of the settled-particles with incoming dirty-flow. The settler may occupy substantially less floor-space than prior settlers, and there is a practical way of removing the settled particles from the settler after separation from the flow channel.

In the following description, numerous specific details are set forth in order to provide a thorough understanding of embodiments of the present invention. It will be understood, however, to one skilled in the art, that the embodiments of the present invention may be practiced without some or all of those details. In other instances, well known operations and structure have not been described in detail in order to not obscure the embodiments of the present invention.

Figure 1:
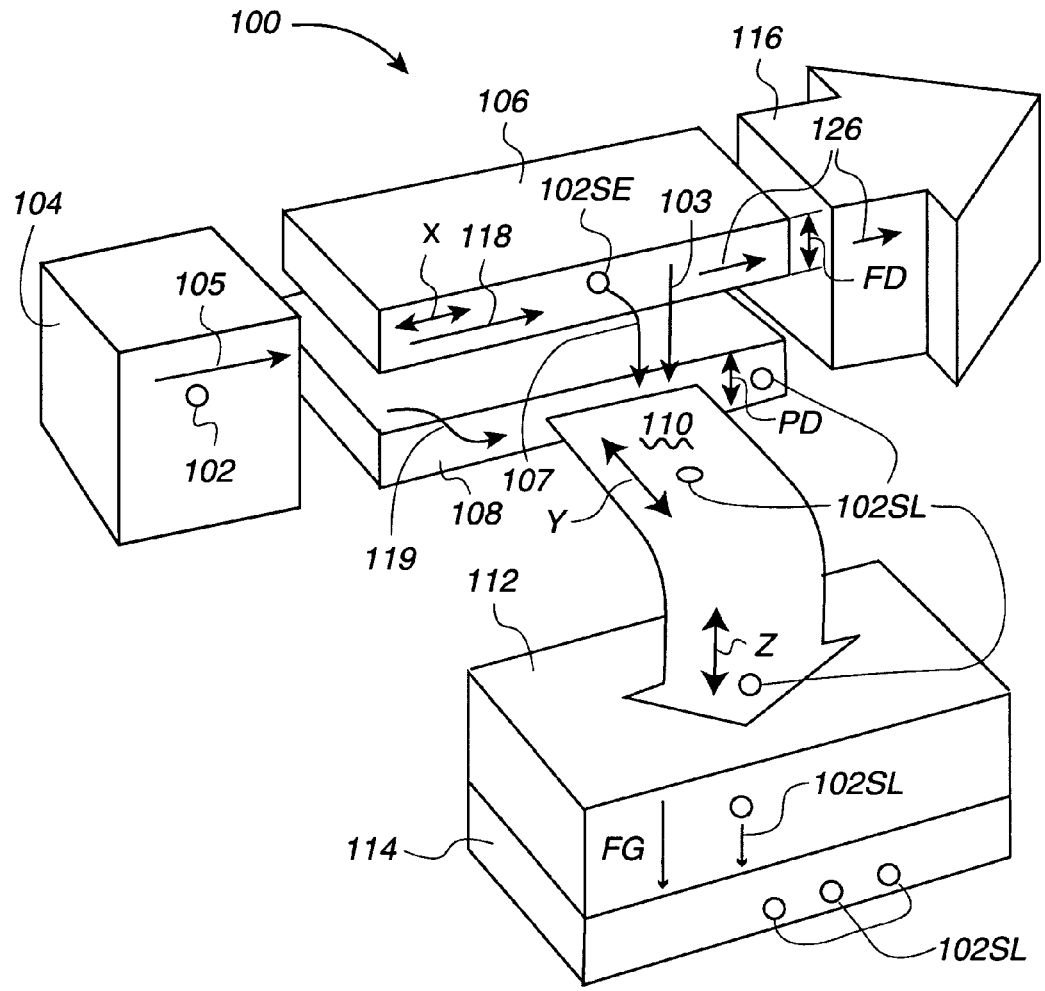
FIG. 1 schematically illustrates flow in an embodiment of a low-angle-flow, low-angle-tray settler of the present invention, with zones being defined.

Referring now to the drawings, FIG. 1 schematically illustrates flow in one embodiment of a low-angle-flow, low-angle-tray settler 100 of the present invention for separation of materials, such as settleable-particles 102, from fluids. This may be referred to as a first embodiment. For clarity of illustration and description, with respect to all of the embodiments described below, an orthogonal system is used to indicate axes and directions in which various structures may extend and events may occur. In the orthogonal system, an X axis extends in a longitudinal direction and among other things is a reference for a direction of the flow of the fluids. As described below, the X axis is horizontal. The flow of the fluids may be at a low-angle, as defined below, with respect to the X axis. A Y axis extends horizontally in a direction that is transverse to the X axis and among other things is a reference for a direction of a width W (FIG. 2B) through which the fluids flow through the settler 100, and among other things is a reference for a direction of removal of settled-settleable-particles 102. The width W may extend at a low-angle, as defined below, with respect to the Y axis. A Z axis extends in a direction that is transverse (at a right angle) to both the X axis and the Y axis, and among other things is a reference for a direction 103 of desired rapid movement of the settleable-particles 102 for settling from the fluid (e.g., under the force of gravity FG). The direction 103 is parallel to the Z axis.

In respect to the first embodiment shown in FIG. 1, settling-particles 102SE are shown moving in both the X direction and in the Z direction 103 as illustrated by a curved arrow 107. The settling-particles 102SE become settled-particles 102SL, referred to also as sludge. In respect to the first embodiment shown in FIG. 1, the Y direction is also a reference for other (e.g., sludge removal) movement of the settled-particles 102SL. This other movement of the settled-particles 102SL referenced to the Y direction may include transport of the sludge 102SL. In sum, the X, Y and Z axes are orthogonal axes of reference and are denoted using capital letters X, Y, Z, with or without parentheses. X, Y and Z are also referred to as directions, and indicate motion, for example, parallel to the respective axis. For clarity of illustration, in appropriate ones of the Figs., the fluid is indicated only by a numbered arrow.

Still referring to the first embodiment shown in FIG. 1, the settler 100 is shown configured in a multi-zone configuration (see zones 104, 106, 108, 110, 112, 114, and 116). The zones are shown schematically in FIG. 1 by boxes or arrows, wherein the boxes represent structure or volumes, for example, described below. The zone 104 is a "settler inlet zone", in which the incoming dirty fluid (i.e., fluid and settleable-particles 102) flows to the settler 100. The flow of incoming dirty fluid in zone 104 is indicated by arrow 105. The incoming dirty flow 105 is divided and is shown entering an exemplary zone 106 (which is one of many zones 106). The zone 106 is a zone through which the dirty fluid flows as the incoming dirty flow 105 becomes cleaner due to settling of the settleable-particles 102. The zone 106 is referred to as a "settling flow zone", and extends at a low-angle. As described below, the low-angle may be with respect to the X axis (FIG. 6B) or the Y axis (FIG. 6C) or both the X and Y axes (FIG. 6D), all as defined below. In the settling flow zone 106 a rate of flow (flow rate) of the incoming settleable-particles 102 is slow enough so that the settleable-particles 102 start to settle under the force of gravity (FG) in the Z direction (settling arrow 103). The incoming settleable-particles 102 are at this time referred to as the settling-particles 102SE. This settling is represented by the curved arrow 107 extending in the X and Z directions.

As the settling-particles 102SE settle, these particles leave the settling flow zone 106. The curved arrow 107 is shown terminating in the zone 108, which also extends at a low-angle. The low-angle of the zone 108 corresponds to the low-angle of the settling zone 106 (as described below). The extent of the arrow 107, and the termination of the arrow 107 in the zone 108, indicate that the settling-particles 102SE settle from the zone 106, enter the zone 108, and complete the settling by resting on the bottom of the zone 108, or resting in the zone 108 on previously-settled particles. At the completion of the settling, these particles are referred to as "settled-particles", or "sludge", 102SL.

The flow within each settling flow zone 106 is referred to as the "cleaning flow", and is identified by arrow 118 representing fluid that is becoming cleaner because of the settling of the settled-particles 102SL (depicted by the exemplary arrow 107 that extends from the settling zone 106 into the zone 108). The zone 108 is referred to as the "relatively-still sludge collection zone". The "relatively-still" phrase indicates that at times during the operation of the settler 100 there is a flow 119 of fluid and settleable-particles in the zone 108, and that this flow 119 is at flow rates substantially less (i.e., having a lower value) than higher flow rates of the cleaning flow 118 in the settling flow zone 106. The lesser flow rates of the flow 119 in the zone 108 result from the configuration of the structure that defines the zones 106 and 108, as described below. The "sludge collection" phrase indicates that the lesser (relatively-still) flow rates of the flow 119 promote faster settling in the direction 103 of the settling-particles 102SE in the zone 108 than the settling rates in the zone 106. The flow 119 is thus referred to as the "sludge collection" flow. The settling flow zone 108 and the cleaning flow 119 extend across the width W of the settler 100.

The settling flow zone 106 and the cleaning flow 118 extend across the width W of the settler 100. In the first embodiment shown in FIG. 1 the zone 106 and flow 118 are in the X direction, and have a depth FD in the Z direction. The width W may also extend at a low-angle, which is with respect to the Y axis. The zone 106 with the depth of value FD is above the relatively-still sludge collection zone 108, which has a depth of value PD in the Z direction. As so configured and shown in FIG. 1 for the first embodiment, the settling flow zone 106 and the cleaning flow 118 extend toward the zone 116. In more detail, in the first embodiment, the cleaning flow 118 in the zone 106 becomes increasingly cleaner and is referred to as the "cleaner flow" (arrow 126) as settling occurs. The cleaner flow 126 exits the zone 106 by flowing into the zone 116, which is referred to as the "clean flow" zone. The "arrow" shape of the zone 116 illustrates an X direction of flow of the cleaner flow 126.

FIG. 1 shows that the relatively-still sludge collection zone 108 is defined alongside the cleaning flow 118 in the settling flow zone 106. The relatively-still sludge collection zone 108 thus extends parallel to and below the respective settling flow zone 106. The relatively-still sludge collection zone 108 is also shown extending in the X, Y and Z axis directions and is below the cleaning flow 118 and the cleaner flow 126 of the settling flow zone 106. Thus, the settling flow zone 106 is immediately above a respective relatively-still sludge collection zone 108.

In this configuration of the zones of the first embodiment shown in FIG. 1, it may be understood that as the incoming dirty flow 105 enters the settling flow zone 106, the settleable-particles 102 initially tend to flow with the flow 118 of the settleable-particle-laden fluid in the zone 106. However, immediately upon entering the settling flow zone 106, these settleable-particles 102 in the flow 118 are acted on by the force of gravity FG, which acts in the direction 103 parallel to the Z axis. The resulting settling-particles 102SE settle in the settling flow zone 106 at initial, or first, rates (settling rates), leave the settling zone 106, and enter the sludge collection flow 119 (FIG. 3A) in the relatively-still sludge collection zone 108, which is flowing at the substantially lesser flow rates than the flow 118 in the zone 106. Because of the configuration of the settler 100 to provide that flow 119 at the lesser flow rates in the zone 108, the further settling in the zone 108 is at second, increasingly more rapid, settling rates (i.e., settling faster in the zone 108 in the Z direction than the settling in the Z direction in the settling flow zone 106). Also, this configuration is such that within the relatively-still sludge collection zone 108, the flow rate in the X direction of the flow 119 decreases as the settling-particles approach the bottom of the zone 108 (or approach settled and stopped settled-particles 102SL). As a further result of this configuration, the settling rates of the settling-particles 102SE in the Z direction increase as those particles settle in the zone 108 further and further toward the bottom of the zone 108. Because the flow rates in the X direction are less in the relatively-still sludge collection zone 108 than in the settling flow zone 106, the settling rates are greater (i.e., the particles tend to settle more rapidly) in the relatively-still sludge collection zone 108 (as compared to the settling rates in the settling flow zone 106). In summary, the flow rate of the flow 118 in the X direction decreases as the settling-particles 102SE become lower and lower in the settling zone 106 and enter the flow 119 in the relatively-still sludge collection zone 108. The settling rates (in the Z direction) increase as the settling-particles 102SE settle from the zone 106 and these settling rates increase further as the settling-particles 102SE settle in and toward the bottom of the zone 108. As a result, there are the above-described increasingly more "rapid" settling rates and reception of the settling-particles in the relatively-still sludge collection zone 108. In the following descriptions, these increasingly more rapid settling rates in the zone 108 are referred to as "rapid settling rates" or "rapid settling".

An exemplary settled-particle 102SL is shown in FIG. 1 captured in the relatively-still sludge collection zone 108 by being retained at the right and low in the relatively-still sludge collection zone 108. Another exemplary captured settled-particle 102SL is shown being removed from the zone 108. Such removal is by being pushed (or moved) in the Y direction across the zone 108 (see large arrow 110 that curves from the Y direction to the Z direction). The push moves the captured settled-particle 102SL out of the relatively-still sludge collection zone 108 (in the Y direction) without crossing the cleaning flow 118 or the cleaner flow 126. Such push positions this captured settled-particle 102SL to fall (in the Z direction) under the force of gravity FG into a combining zone 112, and then into a sludge storage zone 114. Again, such fall occurs without the sludge 102SL crossing the cleaning flow 118 or the cleaner flow 126. The sludge 102SL thus may be contained and accumulate in the zone 114 for removal from the settler 100, as indicated by three exemplary accumulated particles 102SL in the zone 114. The accumulated particles 102SL are separate from the cleaner fluid 126 that is in the zone 116, and are separate from the incoming dirty fluid flow 105 in and from the zone 104.

In the above description of the first embodiment shown in FIG. 1, the settling flow zone 106 was said to extend at a "low-angle". The relatively-still sludge collection zone 108 was said to extend at a corresponding "low-angle". The width W was also said to extend at a "low-angle" with respect to the Y axis. As described below, such low-angle may be defined with respect to either the X axis or the Y axis, or with respect to both the X and Y axes, as appropriate, and each such X and Y axis is horizontal. In a general sense, this low-angle is an angle between the respective zone 106, or zone 108, or width W, and the respective axis X or Y, or both such axes. In the first embodiment, which is a preferred embodiment, the low-angle is zero degrees, such that the zone 106, or the zone 108, or the width W, is also horizontal, and is thus parallel to the respective X or Y axis.

In other embodiments shown in FIGS. 6A, 6B, 6C, and 6D, for example, the low-angle has values other than zero degrees, and the low-angles are indicated by an angle A. In these Figs., for ease of illustration, the values depicted for particular angles A do not correspond to the exemplary values that are specified below for the angles A. Also, although the angles A may be with respect to either or both of the X and Y axes, the width W is with respect to the Y axis.

In more preferred embodiments, the low-angle A has a low value other than zero degrees. Considering a more preferred embodiment referred to as a second embodiment, such a low-angle A is with respect to the X axis, and the low value of A is defined as that positive value of the angle A (FIG. 6B, between the relatively-still sludge collection zone 108 and the X axis) at which the sludge 102SL will not readily move in the zone 108 generally in the X direction under the force of gravity FG. It may be understood that the second embodiment shown in FIG. 6B corresponds to this more preferred embodiment, as described below. Such a low-angle A may have a maximum value of about thirty degrees, for example.

Another of the more preferred embodiments also has the low-angle A having a low value other than zero degrees. Considering a more preferred embodiment referred to as a third embodiment, such a low-angle A is with respect to the Y axis. The low value is defined as that positive value of an angle A (FIG. 6A, or FIG. 6C between the relatively-still sludge collection zone 108 and the Y axis) at which the sludge 102SL will not readily move in the zone 108 generally in the Y direction under the force of gravity FG. It may be understood that the third embodiment shown in FIG. 6C corresponds to this more preferred embodiment, as described below. Such a low-angle A may have a maximum value of about thirty degrees, for example.

Figure 6A:
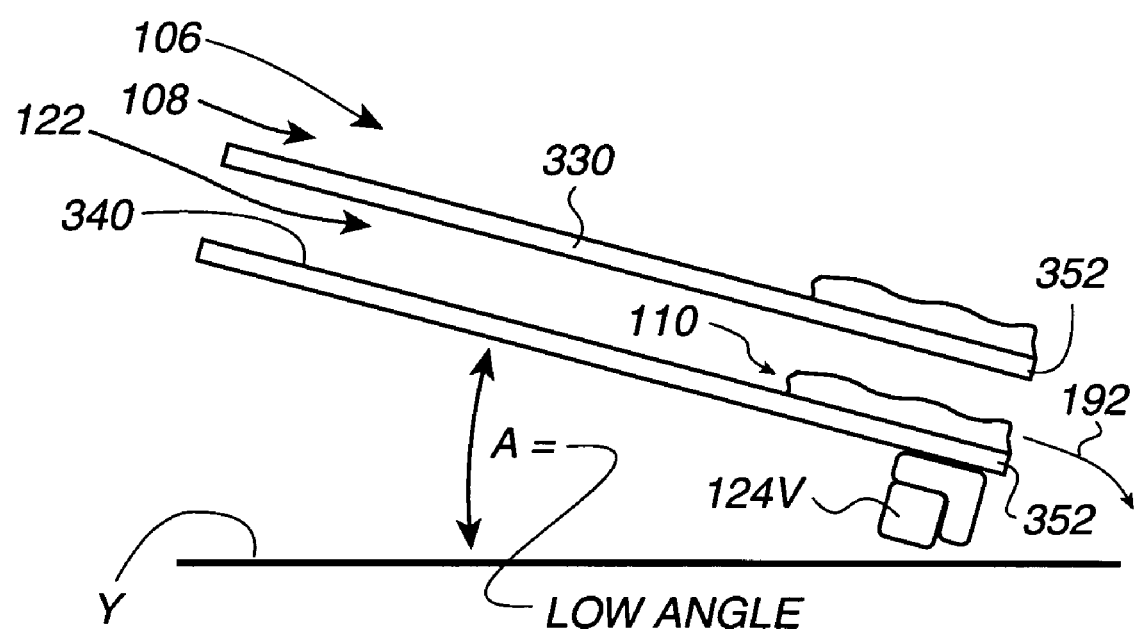
FIG. 6A is an elevational view of one low-angle embodiment of the present invention in which the low-angle is defined relative to the transverse Y axis.
Figure 6B:
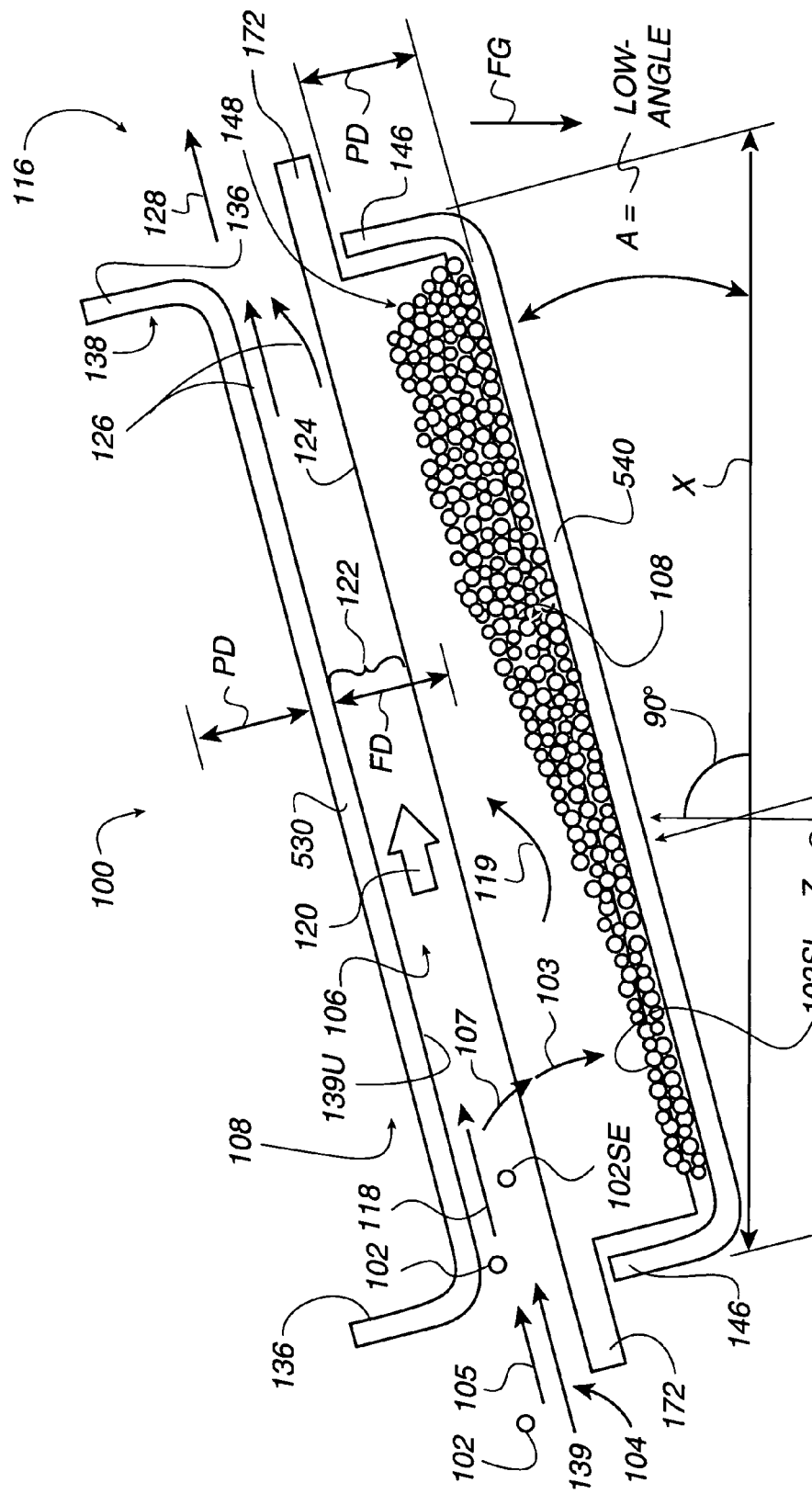
FIG. 6B is an elevational view of another low-angle embodiment of the present invention in which the low-angle is defined relative to the horizontal X axis and one embodiment of the pusher is shown.

In one of still more preferred embodiments, described as a fourth embodiment, the low-angle A also has a low value other than zero degrees, and the low-value is within a range of from about just more than zero degrees with respect to the horizontal X axis to about twenty degrees with respect to the horizontal X axis. FIG. 6B also illustrates this fourth embodiment. For example, a value of from seven to ten degrees may be preferred in this range.

Figure 6C:
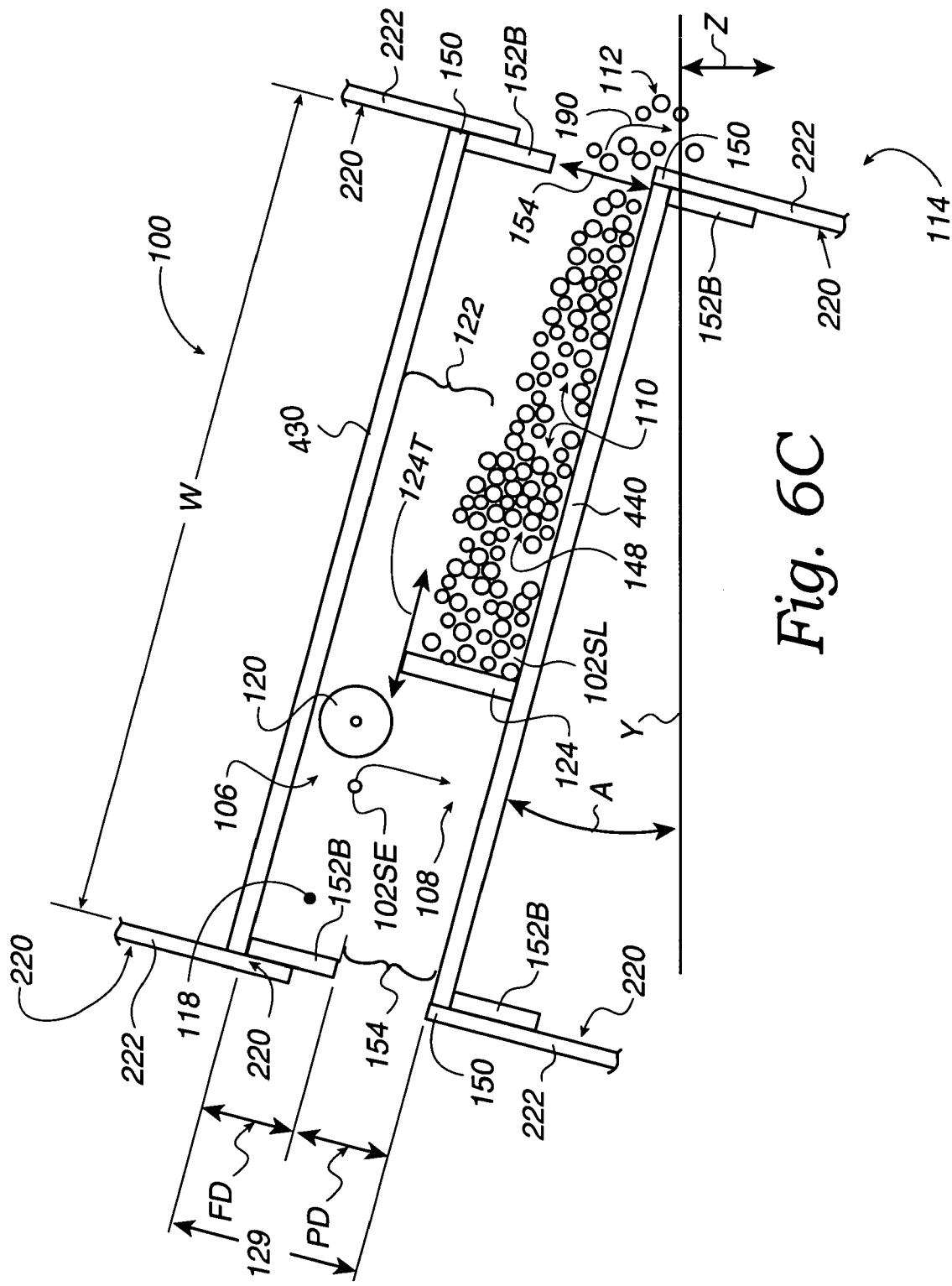
FIG. 6C is an elevational view of yet another low-angle embodiment of the present invention in which the low-angle is defined relative to the Y axis and another embodiment of the pusher is shown.

In another one of the still more preferred embodiments, described as a fifth embodiment, the low-angle A has a low value other than zero degrees, and the low-value is within a range of from about just more than zero degrees with respect to the horizontal Y axis to about twenty degrees with respect to the horizontal Y axis. FIGS. 6A and 6C also illustrate versions of this fifth embodiment. For example, a value of from seven to ten degrees may be preferred in this range.

In one of most preferred embodiments, referred to as a sixth embodiment, the low-angle A may have a low value other than zero degrees, and the low-value is about five degrees with respect to the horizontal X axis. FIG. 6B also illustrates this sixth embodiment.

In another one of the most preferred embodiments, referred to as a seventh embodiment, the low-angle A may have a low value other than zero degrees, and the low-value is about five degrees with respect to the horizontal Y axis. FIGS. 6A and 6C also illustrate versions of this seventh embodiment.

Figure 6D:
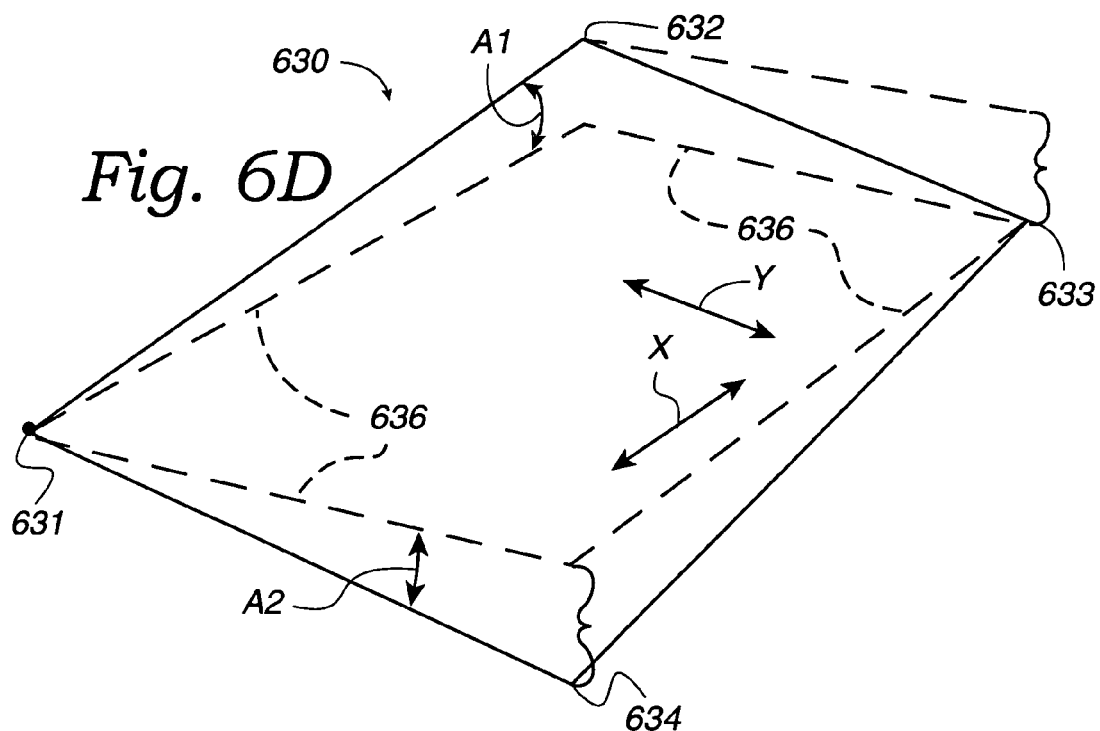
FIG. 6D is a schematic perspective view of still another low-angle embodiment of a tray of the present invention in which the low-angle is defined relative to both the horizontal X axis and the Y axis.

In another one of the most preferred embodiments, referred to as an eighth embodiment, the low-angle A may have a low value other than zero degrees, and the low-value is about five degrees with respect to both the horizontal X axis and the horizontal Y axis. FIG. 6D illustrates this eighth embodiment.

With respect to all of these first through eighth embodiments, the "low" aspect of the above-described "low-angles A" may also be understood by reference to the above-described standard, widely-used closely-spaced flat-and-inclined-thin-edge-plate settler (the "inclined-plate settler"). That inclined-plate settler was said to orient two closely-spaced flat thin-edge plates on an incline of about fifty-five degrees with respect to the horizontal. Such exemplary incline of about fifty-five degrees with respect to the horizontal defines a "high", or "steep", angle of the described upward flow of fluid and settleable-particles. That high (or steep) angle is sufficient to enable sludge to readily move between the two closely-spaced flat thin-edge plates under the force of gravity FG. Generally, from about 45 degrees to about 75 degrees is the range of such steep incline relative to the X axis that will enable the sludge to readily move between the two closely-spaced flat thin-edge plates of the inclined-plate settler under the force of gravity FG. Thus, the values of above-described ranges of the low-angle A of from about zero degrees with respect to the horizontal to maximum of about thirty degrees with respect to the horizontal, and the most-preferred five degree low angle A, are 15 to 40 degrees less than (which is substantially less than) the values of the range of the high or steep angle of the closely-spaced flat-and-inclined-thin-edge-plates.

Figure 2A:
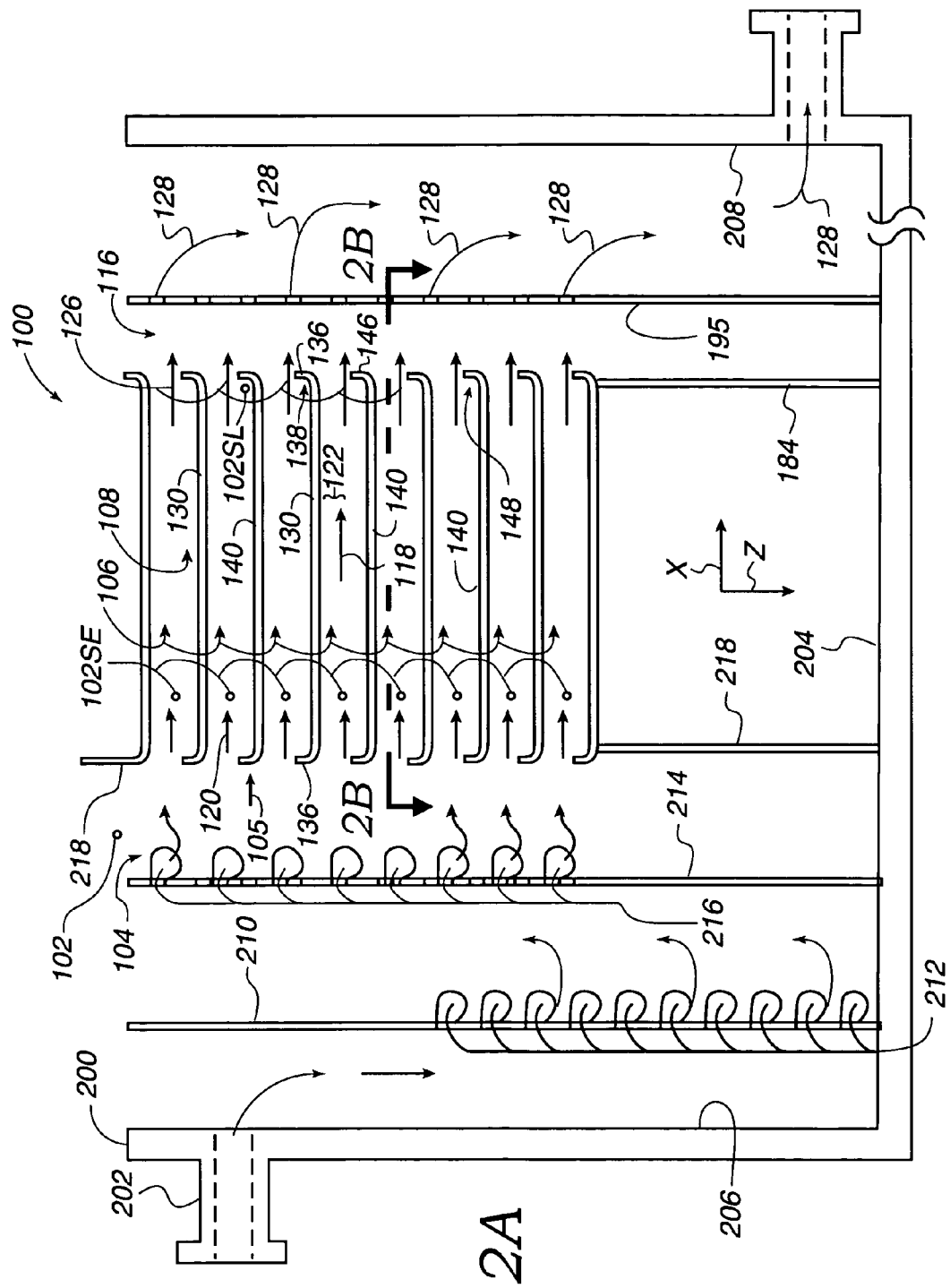
FIG. 2A is a side elevational view of the settler, in which the zones are depicted for rapid settling of settleable-particles and removal of sludge from the settler.

FIG. 2A illustrates structure of the first embodiment of the settler 100 shown in FIG. 1 for defining the zones 104, 106, 108, and 116, and achieving the above-described rapid settling of the settleable-particles 102. FIG. 2A shows a plurality of trays, such as 130 and 140, arranged one above the other in a vertical stack. Although as many as 250 trays may be in the vertical stack (as described below), for clarity of description an exemplary fewer pairs of the trays are shown. For more clarity, only two trays 130 & 140 are shown in FIG. 3A. The trays are identified either as 130 or 140 according to whether a lower tray (130) or an upper tray (140) is being described with respect to a pair of the trays. The trays may also be identified as 130/140 when the description applies to both trays. Each tray 130/140 is configured with opposed first lips, one at the left near the zone 104 (referred to as an entrance lip or upturned lip or pocket lip) and one at the right near the zone 116 (referred to as an exit lip or upturned lip or pocket lip). As an example, one exemplary tray 130 is shown provided with first lips 136, and another exemplary tray 140 is provided with first lips 146 (FIG. 2B), all of which may be referred to as upturned lips. Each lip 136 and 146 is generally perpendicular with respect to the respective tray 130/140. In one embodiment, the first (upturned) lips 136 and 146 may be integral with the trays 130/140. In another embodiment, the first (upturned) lips 136 and 146 may be separate from the trays 130/140 and fastened to the trays 130/140, for example.

Figure 3A:
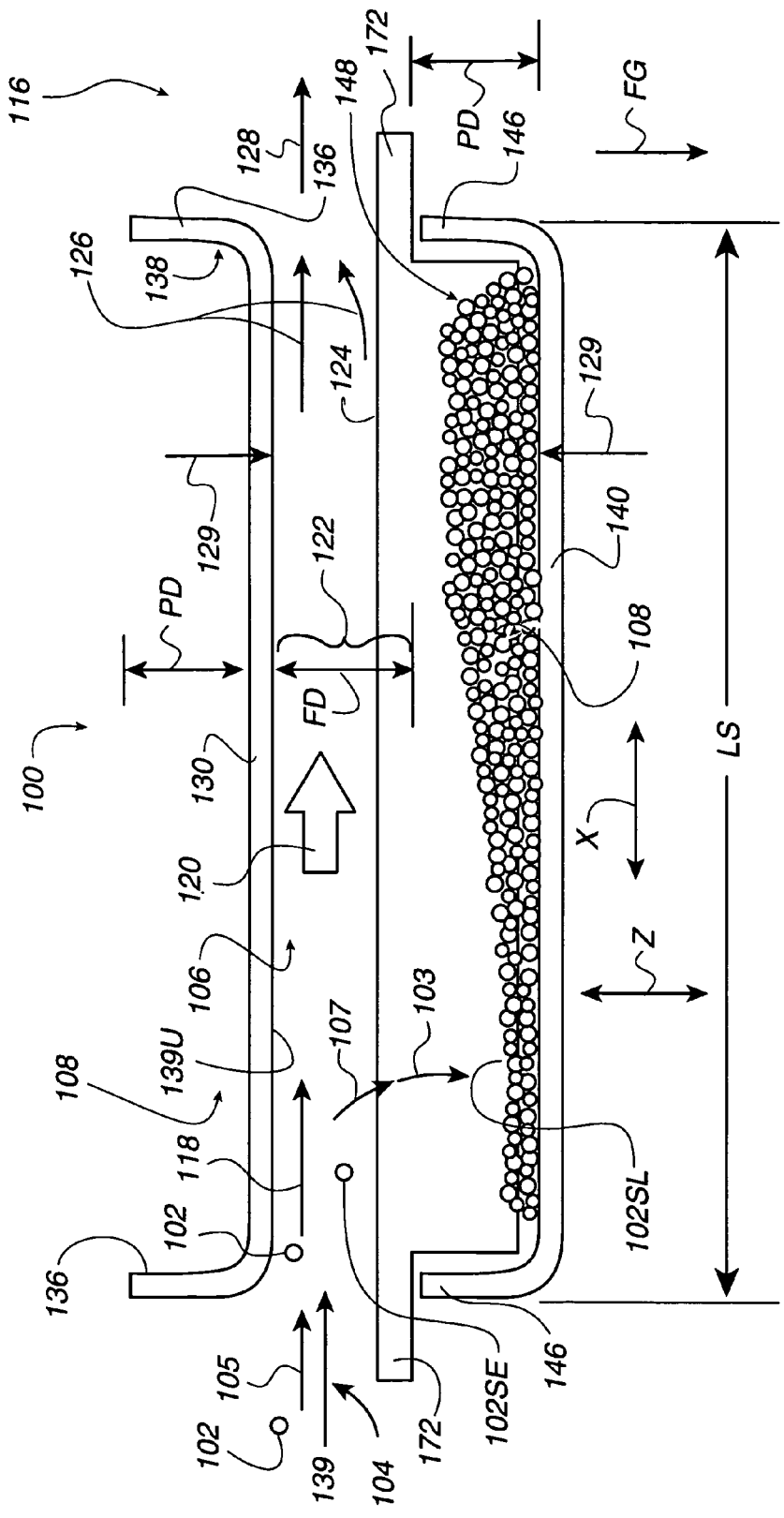
FIG. 3A is an enlarged side elevational view of two trays showing that a settling-particle that rapidly leaves a flow path becomes a settled-particle in a protected relatively-still sludge collection zone.
Figure 3B:
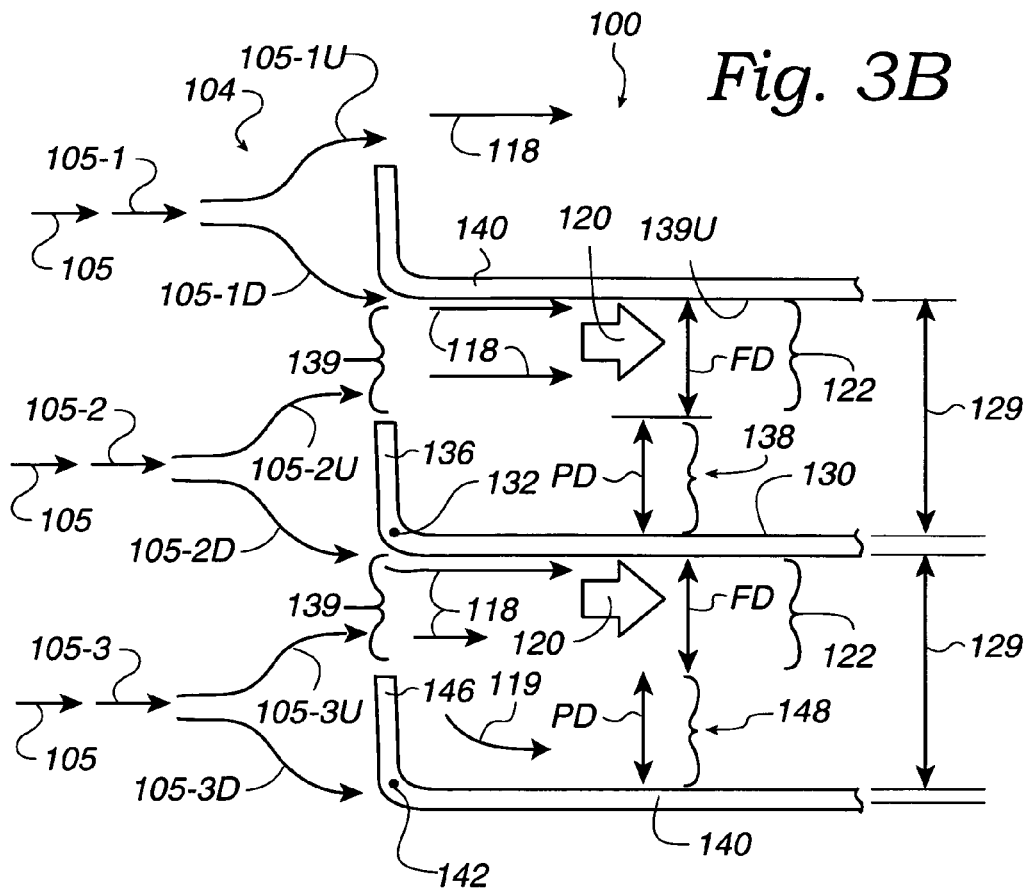
FIG. 3B is an enlarged side elevational view in which each tray is shown configured with a fluid entrance edge.
Figure 3C:
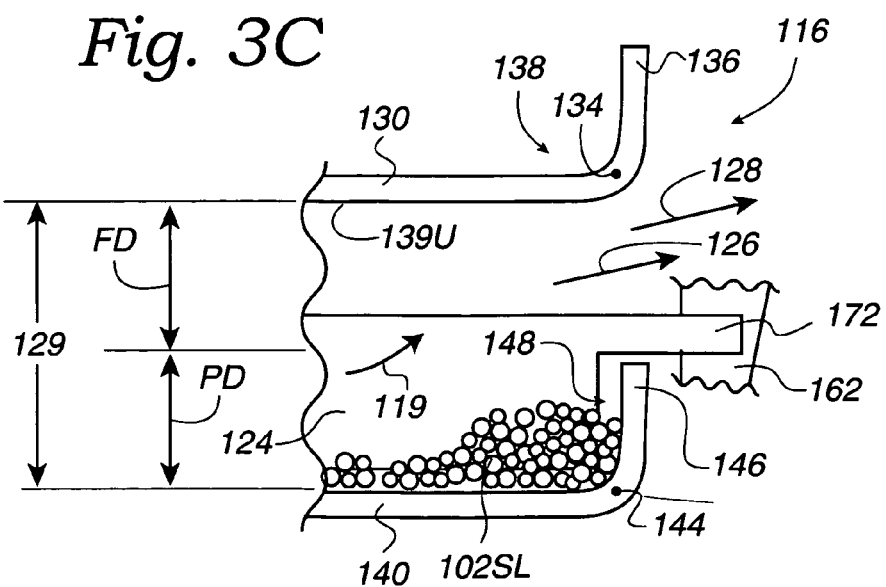
FIG. 3C is an enlarged side elevational view in which each tray is shown also configured with a fluid exit edge and receiving a pusher.

In each particular embodiment (integral lip and separate lip), FIGS. 3B and 3C show the respective entrance lips 136 and exit lips 136 cooperating at opposite entrance and exit edges 132 and 134 of the tray 130. Similarly, in each particular embodiment (integral lip and separate lip), FIGS. 3B and 3C also show the respective entrance lips 146 and exit lips 146 cooperating at opposite entrance and exit edges 142 and 144 of the tray 140. In each case, such cooperation of the respective entrance and exit lips is to define a pocket, pocket 138 defined by the lips 136 and pocket 148 defined by the lips 146. Each pocket 138/148 extends at the low-angle A between the respective lips, and for the first embodiment the low-angle A is horizontal. Each pocket 138/148 of all embodiments has the width W, has the depth PD, and corresponds to the relatively-still sludge collection zone 108, which the pocket 138/148 defines. Thus, in each pocket 138/148, there may be the above-described sludge-collection flow 119 of fluid and settleable-particles 102SE at the flow rates that are substantially less than the higher flow rates of the cleaning flow 118 in the settling zone 106.

In the vertical stack of the first embodiment shown in FIG. 2A, the trays 130/140 are supported at the horizontal low-angle A and in mutually-parallel spaced relationship as described below. It may be understood that except at the top of the vertical stack of trays, the one tray 130 of a pair is not only above the tray 140 but is below a next above adjacent tray 140. Each tray 130/140, with the lips 136/146, may be fabricated from sheet stock, such as 24 gauge (i.e., 0.024 inch) stainless steel or 0.040 inch thick aluminum. For this horizontal, mutually-parallel spaced relationship of the first embodiment of the settler 100 shown in FIG. 1, FIGS. 2A and 3A generally show those trays 130/140 configured to divide the incoming dirty flow 105 in settler inlet zone 104 into one of a plurality of separate horizontal flow paths (see arrow 120 identifying an exemplary path). In a general sense, this division occurs at the left end of the trays 130/140 and more specifically between the upper tray 130 and the top of each first (entrance) lip 146 of the lower tray 140. This division defines a flow channel (identified by a bracket 122 above one exemplary lower tray 140). The flow channel 122 is immediately below the upper tray 130. The above-described cleaning flow 118 flows in the flow path 120 in the flow channel 122. The configuration of the trays 130/140 with the upturned entrance lips 136 and 146 divides the incoming dirty flow 105 in the settler inlet zone 104, provides the higher flow rates of the flow 118 in the flow path 120, and protects the lesser flow rates of the sludge-collection flow 119 in the respective relatively-still sludge collection zone 108 and pocket 138/148. This protection is from the flow 118 in the next-above flow path 120, which is at those higher flow rates. In the first embodiment, each flow path 120 is shown above the first entrance lip 146, and in the flow channel 122 generally horizontally and parallel to the longitudinal X axis. As described above, these lower values of flow rates of the sludge-collections flows 119 in the zones 108 foster the rapid settling of the settling-particles 102SE in the zones 108 and in the pockets 138/148.

FIG. 3B shows enlarged portions of the first embodiment of the settler 100 shown in FIGS. 1, 2A, and 3A including the settler inlet zone 104 supplying the incoming dirty flow 105 horizontally to the settler 100. The incoming dirty flow 105 from the zone 104 is shown in more detail in FIG. 3B as including three exemplary incoming dirty flows 105, an upper flow being referred to as 105-1, a middle flow being referred to as 105-2, and a lower flow being referred to as 105-3. Each such flow 105 is diverted upwardly and downwardly, around the respective trays 130/140. For example, from the upper incoming dirty flow 105-1, a diverted flow 105-1D is diverted down toward the first (entrance) lip 136 of the first tray 130 and into an inlet (or entrance slot) 139 that is above the top of the lip 136. The slot 139 may thus be referred to as a dirty flow entrance slot. The illustrated middle incoming dirty flow 105-2 from the zone 104 is also diverted upwardly and downwardly by the first (entrance) lip 136. Referring to a space 129 between the trays 130 and 140 as an example, the configuration of the upper first tray 130 with the first entrance lip 136 causes a portion 105-2U of the middle incoming dirty flow 105-2 to flow upwardly, and this portion 105-2U flows up and around that lip 136 of the upper first tray 130 and into the same inlet (or entrance slot) 139 that is above the top of the lip 136. These two diverted flows 105-1D and 105-2U join, flow through that entrance slot 139 above the lip 136, flow in the flow path 120 of the flow channel 122 above the exemplary upper tray 130, and flow as the cleaning flow 118. This flow channel 122 is also immediately below the next-upper tray, which tray is configured with an underside 139U. The one flow path 120 flows in the flow channel 122 generally horizontally and parallel to the longitudinal X axis.

It may be understood that a similar situation occurs between the upper tray 130 and the lower tray 140. Thus, the upturned entrance lip 136 of the upper tray 130 causes another portion 105-2D of the middle incoming dirty flow 105-2 to flow downwardly, and this portion 105-2D flows down around that entrance lip 136 of the upper first tray 130 and into a next-lower inlet (or entrance slot) 139 that is above the top of the entrance upturned lip 146. The configuration of the lower second tray 140 with the first entrance lip 146 causes a portion 105-3U of the lower incoming dirty flow 105-3 to flow upwardly, and this portion 105-3U flows up and around that entrance lip 146 of the lower second tray 140 and into the same inlet (or dirty flow entrance slot) 139 that is above the top of the lip 146. Similar joining of the portions 105-3U and 105-2D occurs.

By this action of the exemplary two entrance (upturned) lips 136 and 146 acting on the exemplary incoming dirty flows 105-1, 105-2, and 105-3, causing the diverted incoming dirty flows 105U and 105D which join in this manner, these resulting diverted and joined dirty flows 105D and 105U flow through the respective entrance slots 139 and flow alongside the undersides 139U of the respective trays 130/140. For ease of description, these combined flows 105U and 105D are said to result in one of the cleaning flows 118 that flow in one of the flow channels 122. Each of these resulting cleaning flows 118 has the depth FD that is immediately below the underside 139U of the respective next-upper tray 130/140. With the upturned entrance lips 136/146 diverting the incoming dirty flows 105 around the trays 130/140, the depth PD is provided for each of the pockets 138/148 and the respective relatively-still sludge collection zone 108. The value of the depth FD of the flow 118 and of the zone 106 is based on the value of the height of the dirty flow entrance slot 139. The value of the depth PD of the zones 108 and pockets 138/148 is based on the value of the height of the top of the entrance lips 136/146 above the respective trays 130/140.

With respect to the flow rates of the flow 118 in the cleaning zone 106, the above description of the lips 136/148, for example, compared flow rates of the flow 119 of fluid and settleable-particles in the zone 108, to the higher flow rates of the cleaning flow 118 in the settling flow zone 106. These comparative flow rates may be understood by considering an exemplary situation that starts before any sludge 102SL has settled into the zone 108. In this situation, as the flow 118 moves to the right in FIG. 3B through the zone 106, for example, the flow 119 also moves to the right through the zone 108 and through the pockets 138/148. The flow 119 is protected by the entrance lips 136/146, and flows at the lesser flow rates that become less and less as the flow 119 is closer to the bottom of the pockets 138/148. These lesser flow rates of the flow 119 may vary as a function of a number of variables. These variables may include (a) a settling characteristic of the settleable-particle in the fluid (expressed in terms of a settling rate), (b) the distance from the entrance slot 139 to a point at which the flow rate is to be measured, (c) the flow rates of the particle-laden fluid of the cleaning flow 118 in the flow channel 122, (d) the flow rates of the flow 119 of particle-laden fluid in the relatively-still sludge collection zone 108 upstream of the point at which the flow rate is to be measured, and (e) the depth of the sludge 102SL received in the pocket 138/148 in the relatively-still sludge collection zone 108 at that point.

Still considering the exemplary situation that starts before any sludge 102SL has settled into the zone 108, the tray configuration is provided by the upturned entrance and exit lips 136, which define an exemplary one pocket 138 and protect the flow 119 in one exemplary relatively-still sludge collection zone 108 and the exemplary pocket 138 from the direct incoming flow 105. This configuration limits an initial tendency of the settling-particles 102SE of the flow 119 in that exemplary pocket 138 to flow in the X direction with the flow 118 of the zone 106. The tray configuration also provides that after the flow 118 initially flows through the slot 139 the flow rates of the flow 118 of the settling-particles 102SE in the X direction (horizontally as in FIG. 1) are higher near the top of the settling zone 106. With the entrance and exit lips 136 protecting the relatively-still sludge collection zone 108 and exemplary pocket 138 from the direct incoming flow 105, toward and in the protected zone 108 and in the exemplary pocket 138 these flow rates of the sludge-collection flow 119 in the X direction are reduced as described above, and are less and less as the settling-particles 102SE approach the bottom of the exemplary protected zone 108 and protected pocket 138. Thus, at the lower extent of the depth PD, the flow rates of the flow 119 have decreased to a minimum adjacent to the settled sludge 102SL in the relatively-still sludge collection zone 108 and exemplary pocket 138. Also, at the lower extent of the depth PD in the relatively-still sludge collection zones 108 and exemplary pocket 138, the settling rate is most rapid in the Z direction.

Still considering the exemplary situation that starts before any sludge 102SL has settled into the zone 108, and considering a pair of trays 130/140, the space 129 between the trays may be in an exemplary range of from about one inch to about two inches, and there may be about a one-to-one ratio of FD to PD within the space 129. In this manner, between the trays 130 and 140 there is adequate height for the cleaning flow 118 and the cleaner flow 126, and for reception of the sludge 102SL within the pocket 138 and zone 108. Thus, following (i.e., after) this exemplary situation that starts before any sludge 102SL has settled into the zone 108, as the depth of the sludge 102SL increases in the relatively-still sludge collection zone 108 and in the respective exemplary pocket 138, there is less of the space 129 between the trays 130 and 140 for the flows 118, 126 and 119, and less of the depth PD in the zone 108 and in the respective exemplary pocket 138 for the flow 119. Depending on a rate of sludge removal from the pocket 138 (described below), the depth of sludge 102SL in the pocket 138 and zone 108 may gradually increase and become equal to the depth PD. At this time, the incoming flow 105 (that forms the settling flow 118 and the sludge-collection flow 119) will tend to be limited to the flow 118 in the depth FD of the zone 106. This limiting of the incoming flow 105 to the flow 118 at the depth FD may result from the entrance lip 136 still providing the above-referenced protection. Such protection is of the exemplary pocket 138 and zone 108, and of the sludge 102SL in such pocket and zone, from the incoming dirty flow 118 and from the cleaner flow 126. As a result, the entrance lip 136 and the sludge 102SL in the zone 108 and exemplary pocket 138 at the depth PD tend to maintain the flows 118 and 126 in the zone 106 at the depth FD. Also, with the entrance slot 139 configured for admitting the flow 118 at a flow rate suitable for flow through the zone 106 without any flow 119 in the zone 108 or pocket 138, and with the entrance lip 136 continuing to protect the exemplary pocket 138 and the sludge settled in the pocket 138, the continuing flow 126 of the cleaner fluid within the flow channel 122 of the zone 106 is less-likely to carry the settled-particles 102SL from the exemplary pocket 138 back into and along the flow channel 122.

Figure 2B:
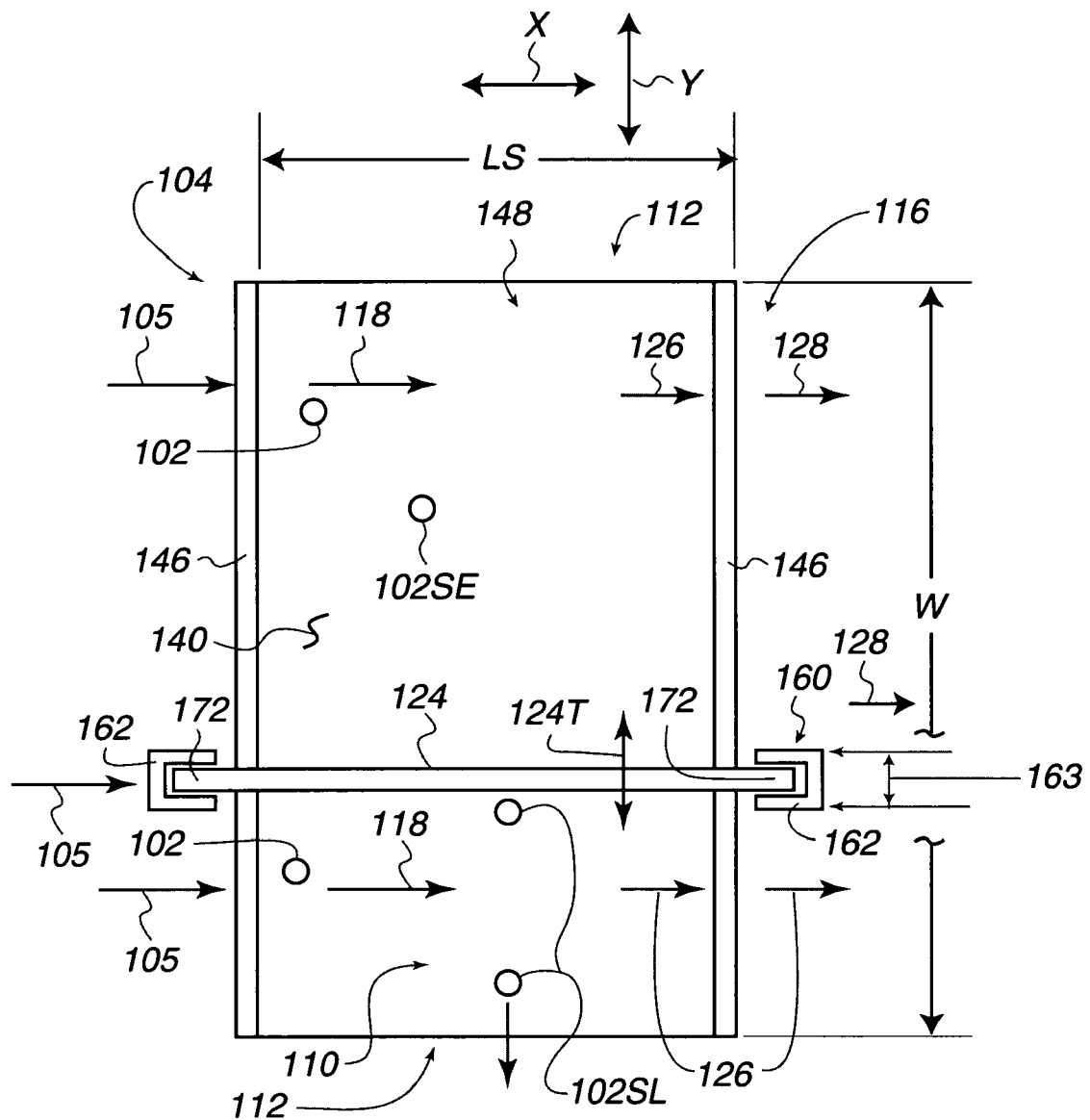
FIG. 2B is a plan view taken on line 2B-2B in FIG. 2A, showing one exemplary tray extending across a width of the settler.

FIG. 2B is a plan view showing one exemplary tray 140 extending across the width W of the first embodiment of the settler 100 shown in FIG. 1, the width W being parallel to the Y axis. FIGS. 2A, 2B, and FIGS. 3A-3C, together show that in this embodiment each lip 136 and 146 extends parallel to the particle settling direction (Z axis) that is perpendicular to the longitudinal (X) axis. With the trays 130/140 so mounted with the respective lips 136 or 146 extending parallel to the settling direction (Z axis), the lips 136 or 146 extend upwardly (FIGS. 2A and 3A) to define one of the pockets 138/148 and the respective relatively-still sludge collection zones 108. With respect to each relatively-still sludge collection zone and pocket 138/148, the two respective upturned lips (e.g., 136 or 146, FIGS. 2A and 3A) of each tray 130 or 140 are configured to define the pocket extending along the length LS of the tray 130 in the X direction (between the upturned lips 136 or 146) and across the width W (FIGS. 2B and 3D) of the tray. An exemplary pocket 148 (FIGS. 3A & 3C) of the respective relatively-still sludge collection zone 108 is also shown extending in the settling direction (Z) between the upturned entrance and exit lips 146. This pocket 148 and the respective relatively-still sludge collection zone 108, each having that depth PD, are shown in FIG. 3A below the respective next-above separate flow path 120 and the cleaning flow 118 therein. As described above, the relatively-still sludge collection zone 108 and the pocket 148 rapidly receive the settled-particles 102SL that have settled from that respective next-above separate flow path 120.

Figure 2C:
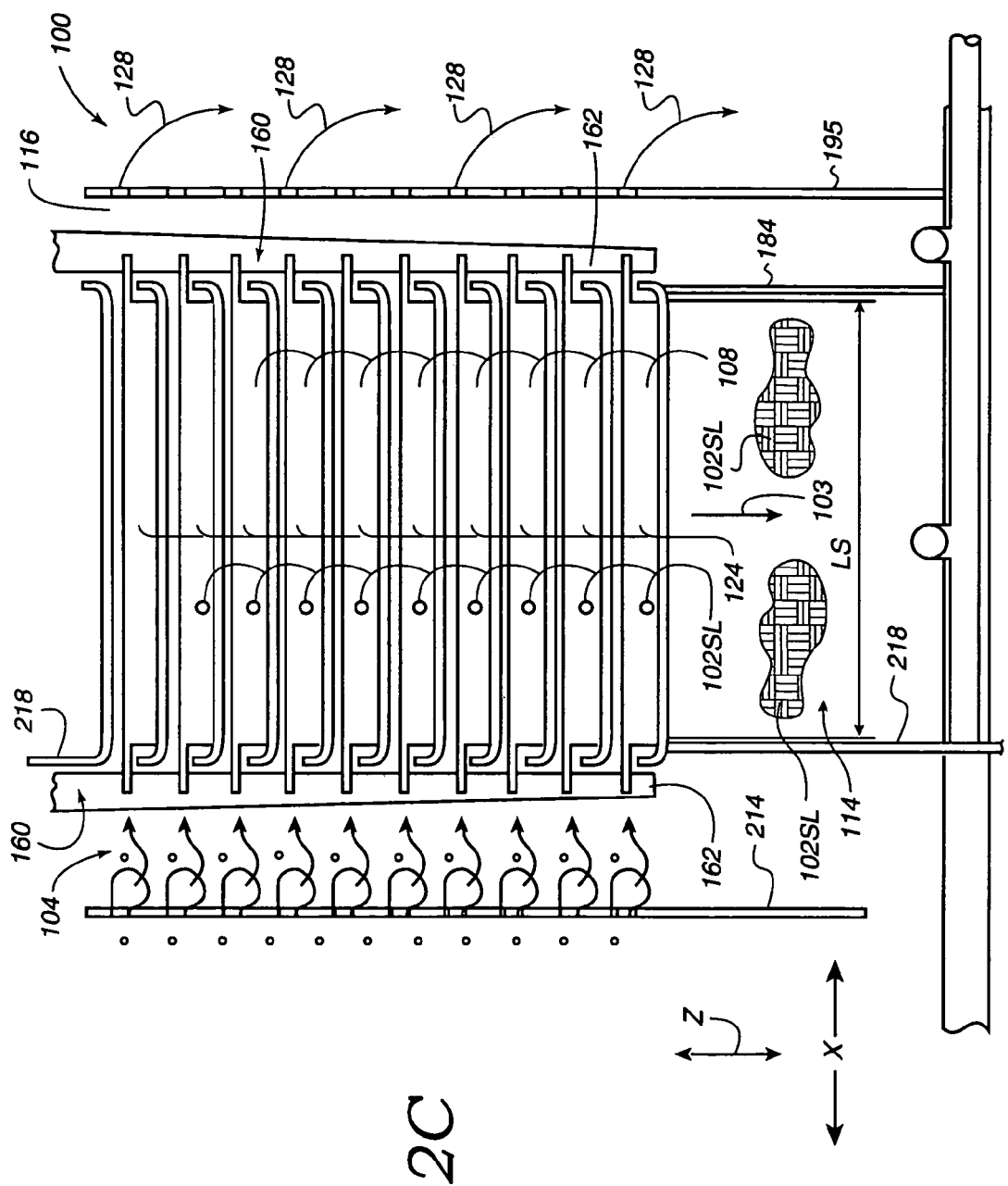
FIG. 2C is another side elevational view showing that, for removal of the sludge from each pocket of a tray, the settler is configured with a pusher.
Figure 3D:
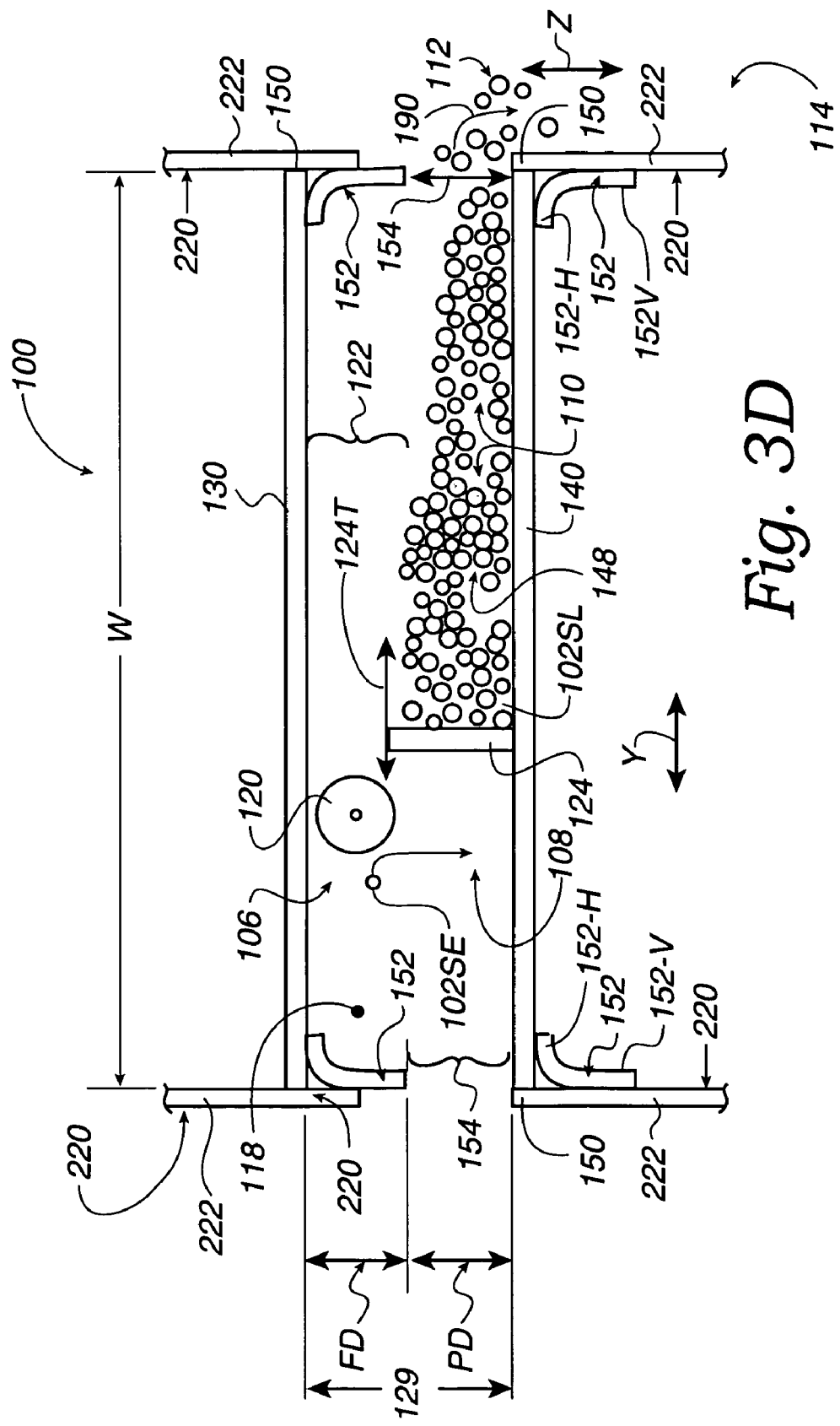
FIGS. 3D and 3E are enlarged end elevational views of tray structure for removal of an accumulation of sludge from a relatively-still sludge collection zone, illustrating the sludge pusher.
Figure 3E:
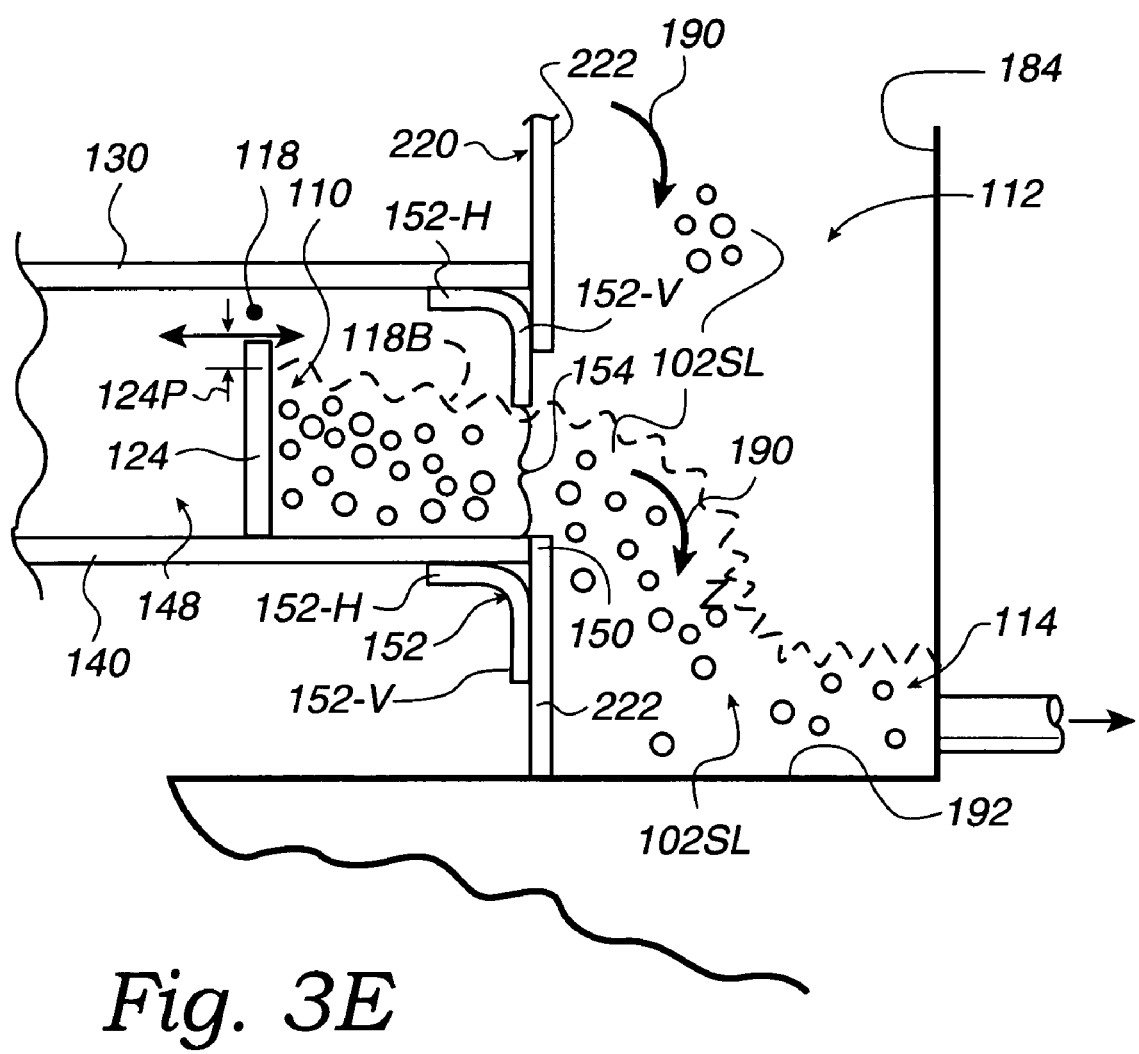

The first embodiment of the settler 100 shown in FIG. 1 is further configured for removal of the sludge 102SL from each pocket 138/148 and each relatively-still sludge collection zone 108. Such configuration is shown in FIGS. 2B and 2C, in conjunction with the enlarged partial views shown in FIGS. 3C-3E. For such sludge removal, that first embodiment of the settler 100 is configured with pushers 124. Each pusher 124 extends (FIG. 2B) in the X axis direction across a length LS of the settler 100. Each pusher 124 is also configured with tabs 172 that extend in the X direction beyond the respective lips 136/146. The pushers 124 are configured to be transversely-thin (i.e., to have a thin dimension 163 in the direction of the Y axis, FIG. 2B) to present a thin profile to a planar region at which the relatively-still sludge collection zone 108 may meet the cleaning flow 118 that is flowing in the X axis direction (which is into the paper in FIGS. 3D & 3E). FIGS. 2B, 3D, & 3E also show the pusher 124 being transversely-movable, i.e., movable in the Y axis direction (see arrow 124T), which is side-to-side and perpendicular to the X direction of the cleaning flow 118. In this manner, each pusher 124 is configured for pushing the sludge 102SL out of the respective pocket 138/148 and out of the respective relatively-still sludge collection zone 108 (FIGS. 3D & 3E, arrows 190). Also, each pusher 124 is configured with a height just exceeding the depth PD of the pockets 138/148. Such height enables the tabs 172 (FIG. 2B) of the pushers 124 to extend in the X direction over the tops of the lips 136 and 146 (FIGS. 2C & 3A) and into the respective zones 104 and 116 for connection with a gantry drive as described below. Such extension of the tabs 172 is referred to as a short height of the tabs 172. In this manner, with each pusher 124 configured so that only the transversely thin profile is presented to the cleaning flow 118 of the fluid flow path 120, and with only the short height extending into the flow channel 122 (FIG.3A), and with the tabs 172 in the zones 104 and 116 and not in the zones 106 and 108, the pusher 124 minimally interferes with the cleaning flow 118 and the sludge collection flow 119. Also in this manner, the pushed sludge 102SL does not enter or cross the settler inlet zone 104 (in which the incoming dirty flow 105 flows), and does not cross the clean fluid 128 in the zone 116. Such pusher configuration thus provides a practical, commercially-acceptable method for removing the sludge 102SL from the pockets and the relatively-still sludge collection zones 108.

With regard to each pusher 124 configured for pushing the sludge 102SL out of the respective pockets and the relatively-still sludge collection zone 108, a further aspect of the first embodiment shown in FIGS. 2B, 3D, and 3E is shown by the zone 110, which is a transport zone. The zone 110 is the portion of the pocket and respective relatively-still sludge collection zone 108 that is in "front" of the pusher 124 as the pusher moves in the Y direction while pushing the sludge 102SL out of the pocket and respective relatively-still sludge collection zone 108. The pusher is also shown extending along the full extent of the depth PD of the pocket and respective relatively-still sludge collection zone. As viewed in FIGS. 3D & 3E, with most of the exemplary sludge 102SL shown as being to the right of the pusher 124, it may be understood that the exemplary pushing is rightward, and the transport zone 110 is shown to the right of the pusher 124 in these views. As viewed in FIG. 3C, with the sludge 102SL shown facing the viewer (in front of the pusher 124), it may be understood that the pushing is toward the viewer. FIGS. 3D & 3E show the pusher 124 in one exemplary pocket 148 (and in the respective relatively-still sludge collection zone 108) moving to the right and making the transport zone 110 smaller and smaller as the sludge 102SL is pushed off the exemplary lower tray 140 through a sludge exit slot, or sludge removal slot, 154 and into the combining zone 112 for flow (arrow 190) under the force of gravity FG into the sludge storage zone 114. While this pushing occurs, the adjacent next-above flow path continues to flow in the X direction above the respective pocket 148 and above the respective lower relatively-still sludge collection zone 108 from which the sludge is being removed.

Once the respective pusher 124 has moved to one side of the respective tray, the direction of Y axis movement reverses and the next-settled-sludge 102SL is transported to the other side of the respective tray 130/140. A combining zone 112 is shown in FIG. 2B on each side of the trays 130/140. Each zone 112 combines the sludge 102SL received from the vertical stack of relatively-still sludge collection zones 108 and transport zones 110 during the respective one of the side-to-side Y direction traverses of the pushers 124. Sludge storage zone 114 is also shown in FIG. 2C for storing the combined sludge 102SL.

In review, the above-described sludge removal operation is characterized by neither the pusher 124 nor the sludge 102SL (that is pushed in the pocket and the respective relatively-still sludge collection zone 108 and in the transport zone 110) entering or crossing the settler inlet zone 104 in which dirty incoming fluid flows. Thus, both such zones 112 and 114 that receive the sludge 102SL are separate from all of the settler inlet zone 104, the settling zone 106, and the clean flow zone 116. As a result, for example, clean fluid 128 (FIGS. 2B and 3C) flowing out of the clean fluid zone 116 may exit from the settler 100 without being combined with particle-laden fluid or with sludge 102SL. Additionally, a sludge removal rate may be selected to further minimize pusher 124 interference, for example, with the cleaning flow 118 in the flow path 120 above the pocket and the relatively-still sludge collection zone 108, and to minimize combination of the settled-sludge 102SL with such settling flow 118 or with the sludge collection flow 119. The sludge removal rate is the rate at which one of the pushers 124 is moved at the low-angle A of and across the respective relatively-still sludge collection zone 108 and respective pocket 138/148 for sludge removal. In one embodiment, such rate may be in the range of from about one to about twelve inches per minute, for example. In a more preferred embodiment, such rate may be in the range of from about three to about nine inches per minute, for example. In a most preferred embodiment, such rate may be in the range of from about four to about eight inches per minute, for example. In each such embodiment, the sludge removal rate is selected so that the depth of the sludge 102SL in the zone 108 generally does not exceed about 0.5 inches, for example, when the space 129 between the trays 130/140 is a total of about 1.0 inch, for example. These exemplary sludge removal rates are applicable to the second through ninth embodiments described herein. This rate of the most preferred embodiment compares to an exemplary rate of about eighteen inches per minute of traverse of sludge removal equipment (not shown) that may operate below a typical inclined-plate settler to remove all settled sludge from under all of the inclined plates.

Referring again to FIG. 3B, in the first embodiment of the settler 100 shown in FIG. 1, each tray is shown configured with the entrance edge, with tray 130 having the entrance edge 132 and tray 140 having the entrance edge 142. FIG. 3C shows that each tray 130/140 is also configured with a fluid exit edge, with tray 130 having the fluid exit edge 134 and tray 140 having the fluid exit edge 144. Between the entrance edges 132 and the exit edges 134 the tray 130 is configured with a planar central section. The upturned entrance and exit lips 136 and 146 extend along the respective entrance edges 132 and 142, and the respective fluid exit edges 134 and 144. FIG. 3B shows that the dirty flow entrance slots 139 are defined between each entrance edge 132 or 142 and the respective next lower upturned lip 136 or 146. FIG. 3C shows that the fluid exit edge 134 and the top of the upturned lower lip 146 define a slot that is opposite to the dirty flow entrance slot 139. This opposite slot may be referred to as a clean flow exit slot in that the cleaner flow 126 is shown flowing between the fluid exit edge 134 and the top of the upturned lower lip 146. The cleaner flow 126 is referred to as the clean flow 128 in the clean flow zone 116.

The elevational views of FIGS. 3D and 3E show a frame 220 for supporting the trays 130/140 at the low-angle, which in this first embodiment is zero degrees so that the trays are horizontal in the mutually-parallel spaced relationship with one tray above a next lower adjacent tray and the one tray below a next above adjacent tray to divide the fluid flow stream 105 into the plurality of separate flow paths 120. The frame 220 mounts the entrance edges 132/142 and the fluid exit edges 134/144 of each of these trays extending horizontally and transversely (Y axis) with respect to the longitudinal X axis. Each lip 136/146 thus extends parallel to the particle settling direction 103 of the Z axis. This mounting of each one of the trays is effective to define an upper boundary of a respective one of the separate flow paths 120, which boundary is the underside 139U of each tray. The frame 220 mounting each one of the trays 130/140 results in the respective upturned lips extending upwardly to define the respective relatively-still sludge collection zone 108 and pocket 138/148 below each respective next-above separate flow path 120. In FIGS. 3B and 3D two trays 130 and 140 are shown as being spaced by the distance 129, composed of the height FD of the settling flow zone 106 plus the depth PD of the pocket 138/148 and the relatively-still sludge collection zone 108.

In more detail, structure for removal of the accumulation of sludge 102SL in the relatively-still sludge collection zone 108 is shown in the end elevational views of FIGS. 3D and 3E, which structure is another aspect of the first embodiment of the settler 100 shown in FIG. 1. Opposed (first and second) sludge exit (or removal) edges, or side edges, 150 of each tray 130/140 extend in the longitudinal, or X axis horizontal (flow) direction, transversely with respect to the respective entrance edges 132 and 142 (FIG. 3B) and transversely with respect to the respective fluid exit edges 134 and 144. The reference to "sludge exit" or to "sludge removal" edge indicates that the sludge 102SL is caused to be removed (or exit) from the pockets 138/148 past that "edge". The planar central section of the trays 130 and 140 also extends between the opposite side edges 150. Referring to FIG. 3D, the frame 220 supports each of two second (or exit or side) brackets, which may be referred to as downturned lips 152. The downturned lips 152 are shown immediately under the respective lower tray 140 and upper tray 130, for example, and are shown extending under the sludge exit edges 150 and may extend completely between the upturned entrance and exit edges 132 and 134. This aspect of the first embodiment preferably has downturned lips 152 integral with the trays 130/140, which is not shown in FIGS. 3D and 3E. For example, a first of the integral downturned lips 152 may be configured at one side edge 150 and a second of the integral downturned edges 150 may be configured at the opposite side edge 150 in a manner similar to the integral aspect of the entrance and exit lips 136/146.

In a variation of this aspect of the first embodiment, FIGS. 3D and 3E show that the downturned lips 152 may more preferably be curved members separate from the trays 130/140 and fastened to the trays 130/140, for example, at the respective side edges. In a further variation of this aspect of the first embodiment, FIG. 6C also shows that the downturned lips 152 may most preferably be separate members made from bar stock 152B (such as stock having a cross section of about 0.5 inches by about 1.0 inch made from stainless steel). The bar stock 152B may be mounted with the 0.5 inch dimension extending vertically and secured to the members 222. To illustrate an entire width of the trays in FIGS. 3D and 3E, these Figs. do not show actual proportions of the structure. For example, in FIGS. 3D and 6C, if the value of the space 129 is an exemplary one inch, only the 0.5 inch dimension of bar stock 152B is shown in proportion, it being understood that the width W (FIGS. 3D & 6C), for example, would be significantly greater than shown (as described below). The bar stock 152B is located under the side edge of the tray and may be fastened, as by welding, to the trays 130/140.

It may be understood that a reference herein to any of these described second lips (or brackets) may be made using the reference number 152, so that "152" applies whether these second lips are integral or separate. Each such second lip 152 may be referred to as a "downturned" lip because such second lip extends away from the planar central section of the tray and extends toward the next-lower tray, as described below. Further, each such second lip 152 may be referred to as a side edge support, and such side edge support is shown extending along substantially the entire extent of the distance between the opposite upturned lips 136/146, and extending under each sludge exit edge 150. For example, upon connection of such second lip (side edge support) to the members 222, the side edge support may provide support for the planar central section. Moreover, with the configurations of these lips, each such side edge support is said to have a sludge exit lip extending in a downturned configuration having an extent about equal to the upturned extent (PD) of each entrance lip 136/148.

Exemplary second separate downturned lips 152 are shown in FIGS. 3D and 3E configured with a portion 152-H extending under the respective sludge exit edge 150 to support the tray 140. Exemplary second separate second lips 152 are also shown configured with downturned portion 152-V extending in the Z axis direction.

The described integral lips, and the second separate lips 152 (FIGS. 3D and 3E), and the opposed separate bar stock lips 152B (FIG. 6C), cooperate to further define the width W of the cleaning flow 118 within the flow path 120 in the flow channel 122 that is immediately under the exemplary tray 140. In FIGS. 3D and 6C that flow path 120 is shown as two concentric circles to indicate that the arrow 120 shown in FIG. 3B extends into the paper in FIGS. 3D and 6C, as does the cleaning flow 118. The depth FD is shown in FIGS. 3D and 6C corresponding to the height of the respective second lips 152 and 152B, and as described above is initially defined by the height FD of the respective dirty flow entrance slot 139 (FIG. 3B).

In each case of the opposite second lips 152, the cooperation limits the cleaning flow 118 in the flow channel 122 to flow in the longitudinal direction of the X axis (into the paper) within the width W (shown in FIGS. 3D and 6C). FIGS. 3D and 3E also show that the second lips 152 of an exemplary first (upper) tray 130 are configured to cooperate with an exemplary second tray 140, which is below that upper tray 130 in the Z axis direction. Similarly, FIG. 6C shows that the opposed bar stocks 152B for supporting an exemplary first (upper) tray 130 are configured to cooperate with the exemplary second tray 140 below that upper tray 130 in the Z axis direction. FIG. 3E shows that the downturned portion 152-V that is immediately under the upper tray 130 is configured to terminate above the second tray 140 to define the sludge removal slot 154, as does the bar stock 152B (FIG. 6C). In each case, the sludge removal slot 154 extends along the outer part of the width W under the sludge exit edge 150 of the upper tray 130. In the separate lip embodiment of FIGS. 3D and 3E, the sludge removal slot 154 is below the termination of the downturned portion 152-V and above the second tray 140, and in the separate bar stock embodiment, the sludge removal slot 154 is below the lower termination of the bar stock 152B and above the second tray (see tray 440, FIG. 6C). In each such case, and in the integral second lip aspect of the first embodiment, the slot 154 permits the above-described movement of the retained sludge 102SL transversely off the exemplary second tray (e.g., 140 or 440) and into the combining zone 112. Thus, in each second (downturned) lip embodiment (whether the integral lip or separate embodiment), the sludge exit slot 154 is defined at each side 150 of the trays for permitting the captured settled-particles 102SL to exit the pocket. Each sludge exit slot 154 is defined by one side edge 150 of the lower tray and one second downturned lip under and supporting the corresponding side edge of the upper tray 130 (FIG. 3E, or 430, FIG. 6C). Thus, in the case of the second downturned lips 152 (FIGS. 3D and 3E) of the upper (or first tray) tray 130, the lips 152 are configured to extend from under the upper tray 130 parallel to the Z settling direction and toward the next-lower tray 140. These downturned lips 152 are configured to cooperate with the first upturned lips 146 of the lower tray 140 and with the lower tray 140 to limit the fluid flow stream 122 to flow at the low-angle, which in the first embodiment is parallel to the longitudinal X direction.

It may be understood that for the first embodiment of the settler 100 shown in FIG. 1, FIGS. 2A-2C show the settler 100 configured with the vertical stack of the trays 130/140 so that within the settler there are many of the horizontal flow paths 120 and flow channels 122 arranged vertically one above the other. In this vertical stack configuration, between each pair of the trays 130/140 the above-described settling flow zone 106 (with corresponding flow 118 in each flow path 120 and each flow channel 122), and relatively-still sludge collection zone 108 and pocket 138/148 (with flow 119 and related transport zone 110) are provided to cooperate with the clean flow zone 116, and the combination zone 112, for example, in the manner described above.

Figure 5A:
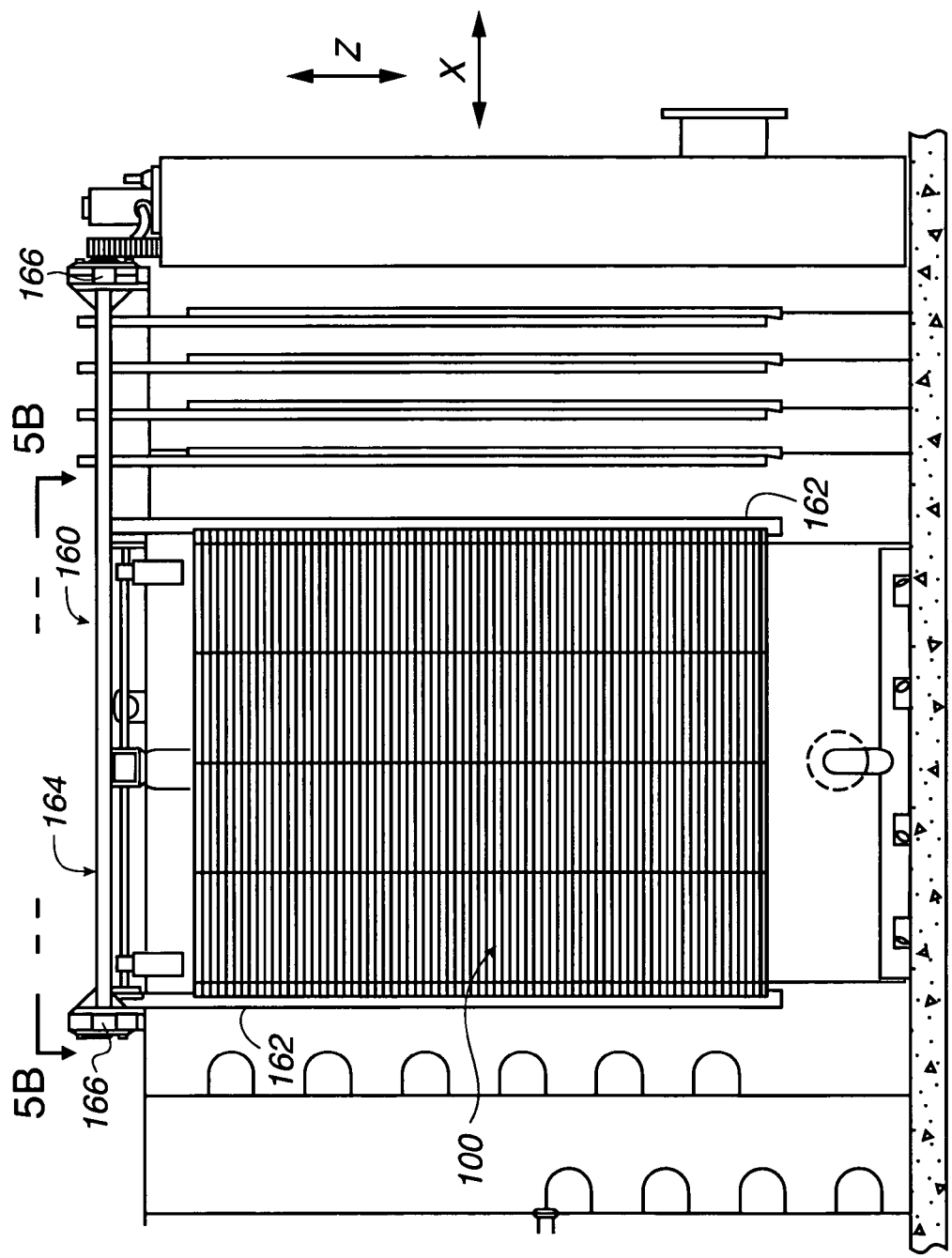
FIG. 5A is a side elevational view of a gantry drive configured with a pair of channels that straddle the settler to simultaneously push the sludge from all of the protected relatively-still sludge collection zones.
Figure 5B:
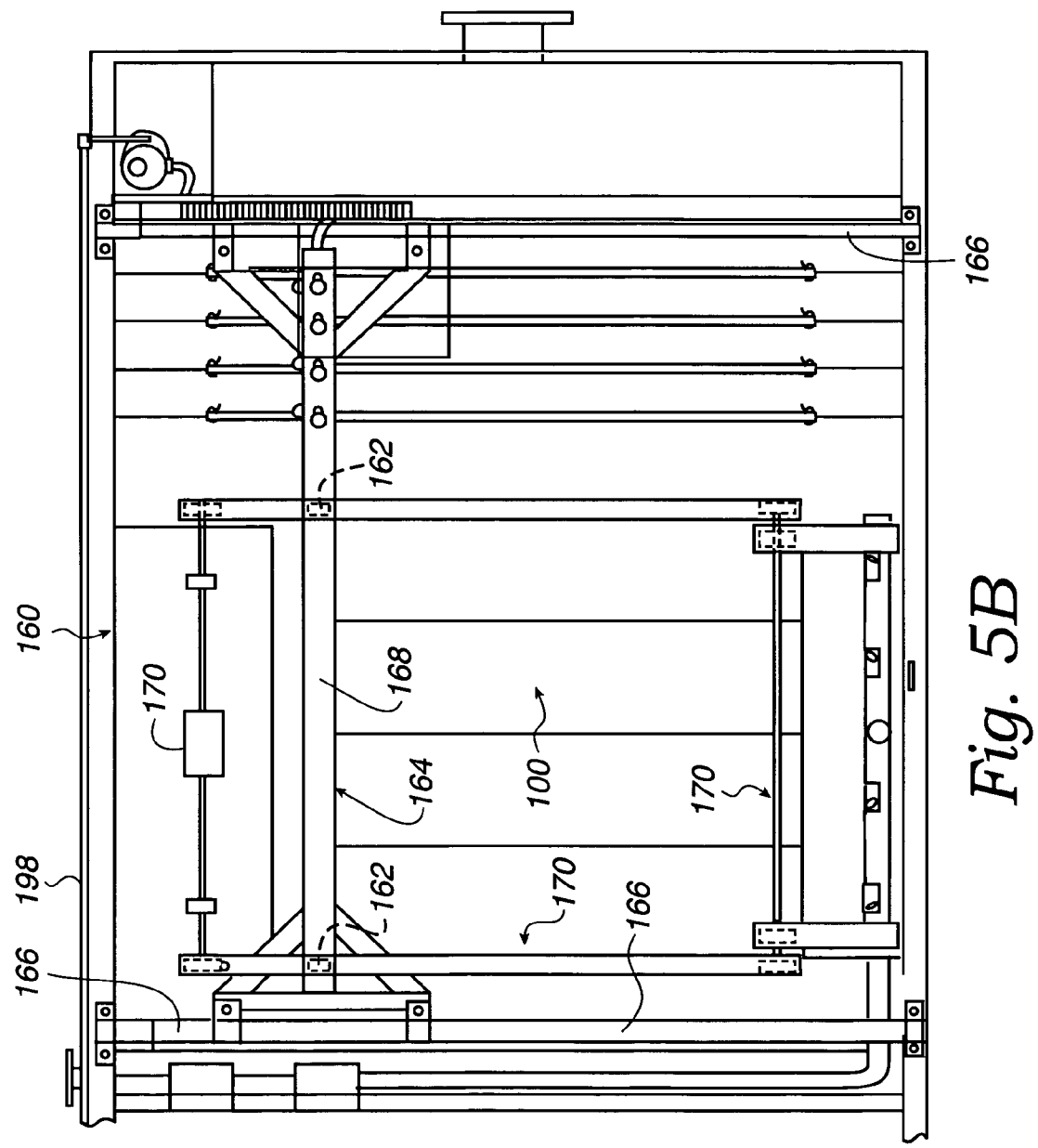
FIG. 5B is a plan view of the gantry drive and the pair of channels, showing rails on which a bridge rides to move the pair of channels.

In the first embodiment of the settler 100 shown in FIG. 1, each of the pushers 124 is moved by the gantry drive 160 shown in FIGS. 2B, 2C, 5A, and 5B. The gantry drive 160 is configured with a pair of spaced channels 162. The channels 162 extend vertically (in the Z direction, FIGS. 2C & 5A) and are spaced in the X direction (FIGS. 2B and 5A) to straddle all of the trays 130 and 140. Each of the channels 162 is also configured with the narrow dimension 163 (FIG. 2B) that extends in the Y direction. The narrow dimension 163 presents the thin-profile to the incoming dirty flow 105 in the zone, which flows in the X axis direction against a face of the channels 162. The narrow dimension 163 significantly limits interference of the channels 162 with the incoming dirty flow 105 in the zone 104. A bridge structure 164 shown in FIGS. 5A and 5B moves both of the channels 162 at the same time and in the same direction in the direction of the Y axis. FIGS. 5A and 5B show the bridge structure 164 including spaced rails 166 that are spaced in the X direction and are above the settler 100. The rails 166 span the basin in the Y direction (FIG.5B) and support rollers secured to the bridge structure 164 that spans the settler 100 in the X direction. An end and intermediate part of a bridge 168 (FIG. 5B) of the bridge structure 164 carry the channels 162, which extend in the above-described vertical orientation, straddling the respective entrance and exit edges of the trays 130 and 140. The bridge 168 is driven by a chain drive 170 so as to ride and traverse on the rails 166. The drive 170 advances the bridge 168 toward one sludge removal edge 150 (FIG. 3E). The drive 170 reverses and the bridge 168 is advanced toward the opposite sludge removal edge 150 (FIG. 3D). In the example of FIGS. 2B and 3D (with respect to one pair of trays 130 and 140) the bridge structure 164 of FIG. 5A, with the bridge 168, move the spaced channels 162 as follows. Channel movement in FIGS. 2B and 5B is across the width W of the settler 100. Such movement is in the Y direction, so that the channels 162 engage each tab 172 at an opposite end of each pusher 124. Such engagement is by one channel 162 in the zone 104 and by the other channel 162 in the zone 116. The engaged tabs 172 cause each of the pushers 124 to move simultaneously with the other pushers and in the Y direction, and to simultaneously move the sludge 102SL in each of the transport zones 110 in the Y direction through the respective sludge removal slots 154 and into the combination zone 112 (FIG. 3E). When the direction of bridge movement is reversed, the bridge 168 may cause opposite channel movement in the Y direction to cause the pushers 124 to move the sludge 102SL in the various transport zones 110, through an opposite sludge removal slot 154 (FIG. 3D) and into the combination zone 112. In terms of the Y direction shown in FIG. 3D, this Y direction movement of the channels 162 and of the pushers 124 is illustrated as right to left. As the sludge depth varies in the pockets 138/148 in the relatively-still sludge collection zones 108 (see zone 108 in FIG. 3D), the configurations of the channels 162 (and the tabs 172, FIG. 2B) allow the tabs 172 and the pushers 124 to move vertically (FIG. 2C) to avoid binding and to accommodate any non-horizontal low-angle A (e.g., FIGS. 6A and 6C) in the transverse Y direction at which the trays 130 and 140 may be oriented. The gantry drive 160 is further described in the above-identified co-pending application.

In FIG. 3E one exemplary combination zone 112 is shown configured as a hollow sludge collection and storage chamber 184. The chamber 184 is configured to extend in the Z axis direction (vertically) to allow the sludge 102SL removed from the transport zone 110 to flow under the force of gravity FG (see arrow 190) separate from all of the incoming dirty flow 105, the cleaning flow 118, the clean flow 126, and the accumulation of the sludge 102SL in the pockets 138/148 that define the relatively-still sludge collection zones 108. The sludge 102SL from the transport zone 110 flows under the force of gravity FG to a bottom 192 of the chamber 184 to the sludge storage zone 114. The chamber 184 is configured with openings aligned with each slot 154 to receive the pushed sludge 102SL removed from each transport zone 110. Except for such openings, the chamber 184 is closed so that the combined sludge 102SL from the respective transport zones 110 can only flow to the sludge storage zone 114 for later removal from the bottom 192, which removal is separate from the cleaning flow 118 and cleaner flow 126 in the settler 100, and from the incoming dirty fluid flow 105.

Another aspect of all of the embodiments of the settler 100 is shown in FIG. 2A. The fluid and settleable-particles 102 enter a basin 200 through an inlet pipe 202. The basin 200 has a bottom 204, an entrance end wall 206, and an exit end wall 208. A first baffle 210 extends fully across the basin 200 and causes the incoming dirty fluid (fluid with settleable-particles 102) to flow in the Z axis direction toward the bottom 204. An array of helical flow inlets 212 is spaced across the width of the basin 200 and along the baffle 210 in the Z axis direction. Each helical flow inlet 212 may be made according to the teachings of U.S. Pat. No. 5,378,378, issued Jan. 3, 1995, entitled Method Of and Apparatus For Helical Inlet Flow, the disclosure of which is incorporated herein by reference. The helical flow inlets 212 spread the incoming dirty fluid across the width of the basin 200 and across the height in which the array of inlets 212 is located. A second baffle 214 also extends fully across the width of the basin 200 and turns the spread incoming dirty fluid upwardly in the Z axis direction. From a mid-point to the top of the second baffle 214, a second array of helical flow inlets 216 is provided. This second array of inlets 216 may be similar to the first inlets 212, and completes the spreading of the incoming dirty fluid across the width of the basin 200 and across a settler height of the settler 100. The incoming dirty flow 105 exits the second array of helical flow inlets 216. A third baffle 218 surrounds a perimeter of the settler 100 and limits the incoming dirty flow 105 to flow into the inlet zone 104 of the settler 100. The incoming dirty flow 105 in the inlet zone 104 flows through the entrance slots 139 (FIGS. 3A & 3B) as described above. At the other end of the settler 100, the cleaner flow 126 flows horizontally over the exit lips 136 and 146 into the clean flow zone 116 as the clean flow 128. The ongoing cleaner flow 126 flows horizontally over and past the accumulation of sludge 102SL, which accumulation is retained by the above-described many aspects of the configuration of the settler 100, e.g., by the upturned exit lips 136/146. The cleaner flow 126 flows from the clean zone 116 into a clean flow chamber 195 (FIG. 2A). The clean flow chamber 195 extends from side to side of the basin 200 and to the wall 208. The clean flow chamber 195 is configured with openings that allow receipt of the cleaner flow 126 from each flow channel 122 so that the clean flow 128 is maintained separate from the sludge collection and storage chamber 184 during further processing before exiting the basin (FIG. 2A). That further processing is described in the co-pending application identified in above.

In all of the described embodiments shown in FIGS. 1 and 2A, 2C, and 6A-6D, for example, a plurality of the generally planar trays 130 and 140 may be provided. In the above description, one tray was referred to as a first tray 130 and another tray was referred to as a second tray 140, with the first tray being above the second tray 140. However, the trays 130 and 140 of all embodiments of the settler 100 are the same except for the relative above and below relationship, and except for the value of the low-angle A and the configuration of the pockets 138/148 (see description below of FIGS. 4A-4C). Considering this above & below relationship in more detail, and referring to FIG. 3D, the frame 220 is provided for supporting the trays. The frame 220 and the trays 130 and 140 of a vertical stack may define one integral unit of the settler 100, for example, and many such integral units may be placed side-by-side across a width of the basin. In describing the frame 220, all of the trays are referred to below as the tray 130 except when referencing the above and below relationship of the trays. In this first embodiment, the trays 130 are at the low-angle, which in this case is zero degrees with respect to the horizontal X axis. The trays 130 are in the mutually-parallel spaced relationship with one tray 130 above a next lower adjacent tray 140 and the one tray 130 below a next above adjacent tray 140 to divide the fluid flow 105 from the settler inlet zone 104 into the plurality of separate cleaning flows 118 in flow paths 120 in the flow channels 122 that in this first embodiment are horizontal and parallel to the longitudinal (or X axis) of the apparatus 100. The frame 220 is configured with vertical members 222 secured to the brackets, referred to as the lips 152. In this embodiment, the members 222 hold the lips 152 extending in a horizontal orientation so that the trays 130 are horizontal, and so as to mount the entrance edge 132 (FIG. 3B) and the fluid flow exit edge 134 of each of the trays 130 extending horizontally and transversely (in the Y direction) with respect to the longitudinal axis X. In this manner, in the first embodiment each first lip 136 (or 146) extends parallel to the particle settling direction Z that is perpendicular to the horizontal longitudinal axis X. This mounting of each one of the trays 130 is effective to have the underside 139U of the trays 130 define an upper boundary of a respective one of the separate flow paths 120. The mounting of each one of the trays 130/140 with the respective first lips 136/146 extending upwardly, parallel to the settling direction Z, results in the respective lips 136/146 defining one of the pockets 138/148 and one of the respective relatively-still sludge collection zones 108 below each respective next-above separate flow path 120. With respect to each such pocket and relatively-still sludge collection zone 108, the respective lip 136/146 that extends along each of the respective entrance edge 132 and the respective fluid exit edge 134 is configured to define the depth PD of the respective pocket 138/148 of the respective relatively-still sludge collection zone 108. The depth PD is in the settling direction Z. As described above, the pocket 138/148 and the respective relatively-still sludge collection zone 108 having that depth PD rapidly receive and retain sludge 102SL that has settled from the respective next above separate flow path 120.

Figure 4A:
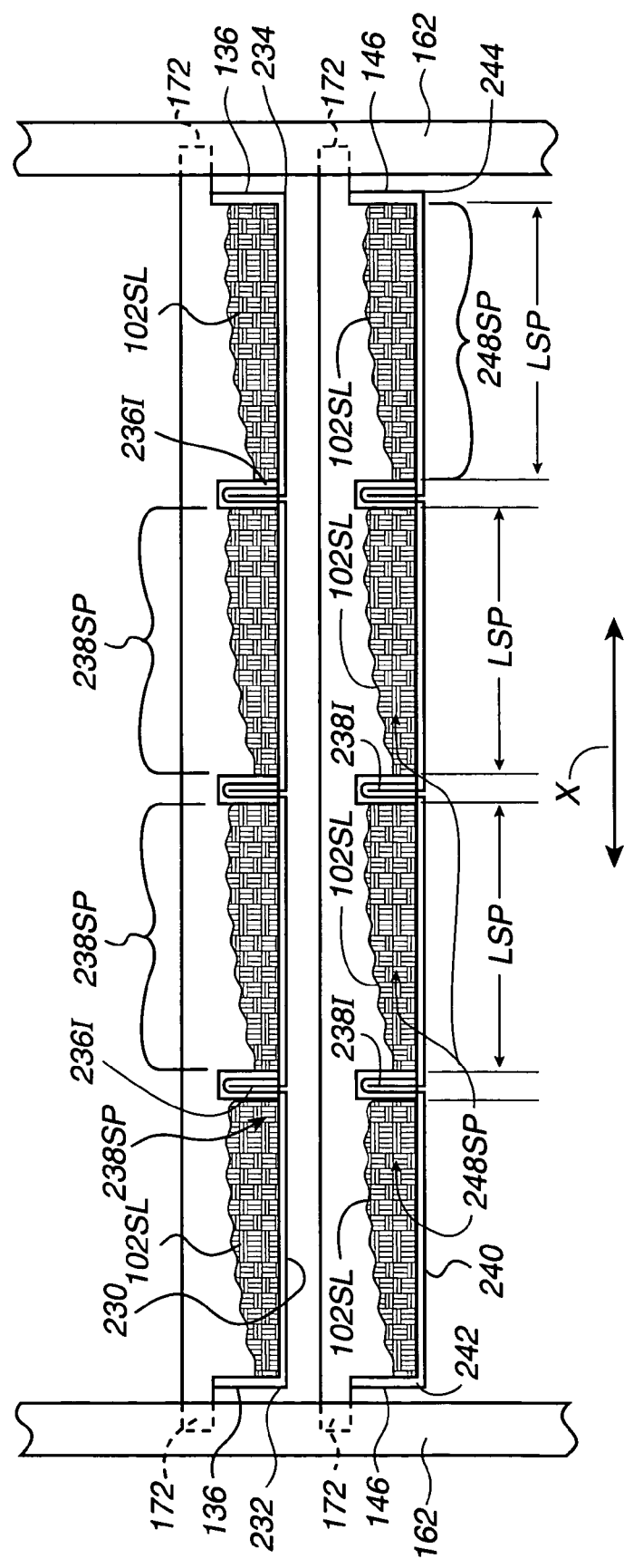
FIGS. 4A, 4B, and 4C are views of another embodiment of the trays and sludge pusher, each configured for providing more assurance that the sludge will be captured in the pockets of the trays.

With respect to the configuration of the trays, a more preferred (ninth) embodiment of the present invention is shown in FIG. 4A, which is an elevational schematic side view similar to FIG. 3A. The ninth embodiment is applicable to each of the first through eighth embodiments. As an example, in review, as described above with respect to the first embodiment shown in FIGS. 1 and 3C, for example, the cleaner flow 126 flows horizontally over the exit lips 136 and 146 into the clean flow zone 116 as the clean flow 128. The ongoing cleaner flow 126 flows horizontally over and past the accumulation of sludge 102SL, which accumulation is retained by the above-described many aspects of the configuration of the settler 100, e.g., by the upturned exit lips 136/146. FIG. 4A depicts the ninth embodiment, and is illustrated with respect to exemplary two trays 230 and 240 shown mounted in the horizontal orientation similar to that of the first embodiment shown in FIGS. 1 and 2A. However, these two trays 230/240 of the ninth embodiment may be oriented as described with respect to any of FIGS. 6A, 6B, 6C, or 6D. Also, independent of whether the embodiment has zero degree low-angle A or a positive non-zero low-angle A, the trays 230/240 of the ninth embodiment are further configured to provide additional structure for retaining the settled sludge 102SL in the pockets and in the relatively-still sludge collection zone 108.

In this ninth embodiment, the trays 230 and 240 are configured with respective pockets 238SP and 248SP that divide the one pocket 138/148, and the respective one relatively-still sludge collection zone 108, into sections. This tray configuration includes the entrance and exit lips 136 of the upper tray 130 and the entrance and exit lips 146 of the lower tray 140. Also, this tray configuration includes a plurality of cooperating divider lips 236I and 238I that are intermediate with respect to the respective entrance and exit edges 232 and 234 of tray 230, for example. Considering the intermediate divider lips 236I and 238I shown in FIG. 4B for either the tray 230 or 240, these divider lips are configured with a first section 236-1 extending in the Z direction from the tray 230. The first section 236-1 extends up, turns and hangs downwardly over an adjacent upwardly-extending section 236-2 of the divider lip 238I. The cooperating sections 236-1 and 236-2 define a series of the sub-pockets 238SP. This series extends in the longitudinal direction X across the relatively-still sludge collection zone 108. Each divider lip 236I and 238I also extends in the transverse direction Y perpendicular with respect to the longitudinal direction X to define the sub-pockets 238SP as being elongated and extending across the full width W. The sub-pockets 248SP of each tray 230 and 240 are configured in a similar manner so that the relatively-still sludge collection zone 108 of the trays is divided into sections, and may be referred to as the sectional relatively-still sludge collection zone.

Each sub-pocket 238SP and 248SP is configured under and alongside the next-above flow channel 122. Each of the sub-pockets 238SP and 248SP is configured to extend in the settling direction Z to rapidly receive settleable-particles 102SE that are settling from the fluid flow stream 122 and to provide more assurance of completely retaining the sludge 102SL on the tray. In more detail, this more assurance of completely retaining may be appreciated by comparing the sub-pockets 238SP to the pockets 138 or 148 (FIG. 3A). Exemplary of all of the first through eighth low-angle embodiments in which low-angle A may be from zero to thirty degrees, one exemplary pocket 148 shown in FIG. 3A illustrates an exemplary accumulation of the sludge 102SL, with deeper sludge 102SL at the right (down stream) end of that pocket 148 in the relatively-still sludge collection zone 108. This exemplary pocket 148 has a length equal to the length LS of the entire settler 100. As a result, the cleaning flow 118 and the cleaner flow 126 may flow the entire length LS of the relatively-still sludge collection zone 108, and such flow 126 reaches, and is acted on, by the upturned exit lip 146 that extends along the exit edge 144 (FIG. 3C). As described above, that upturned exit lip 146 contributes to defining the pocket 138/148 and to retaining the accumulated sludge 102SL in the pocket and relatively-still sludge collection zone 108 by guiding and forcing the cleaner flow 126 upwardly toward the right end of underside 139U.

Still exemplary of the first through eighth embodiments, in the ninth embodiment with the sub-pockets 238SP, FIG. 4A illustrates an exemplary accumulation of the sludge 102SL in each of the sub-pockets 238SP. This accumulation is deeper toward the right (down stream) end of each of the sub-pockets 238SP of the sectional relatively-still sludge collection zone 108. Each sub-pocket 238SP is configured with a length LSP between the spaced and cooperating intermediate divider lips 236I and 238I. The lengths LSP provide a shorter distance between two exemplary closely-spaced intermediate divider lips 238I and 238I than the length LS between the entrance and exit lips 148, for example. As shown in FIG. 4A with respect to the exemplary first (horizontal-tray) embodiment, and regardless of which of the first through eighth embodiments the ninth embodiment is applied to, each shorter distance of LSP is a shorter distance than the length LS. Thus, in this ninth embodiment, the closely-spaced intermediate lips 236I act on the flows 118 and 119 more frequently than the exit lip 148. Also, the closely-spaced intermediate lips 236I assist in retaining the accumulated sludge 102SL in the respective sub-pockets 238SP of the now-sectional relatively-still sludge collection zone 108. Thus, at each of these more closely-spaced locations of the lips 236I, each lip 236I acts to guide and force the cleaner flow 126 upwardly toward the underside of the trays 230 and 240, and helps to maintain that flow 126 in the flow channel 122, away from the sectional relatively-still sludge collection zone 108 and from the sludge 102SL. The cleaner flow 126 thus flows over each of these successive lips 236I and is more frequently urged to stay up in the flow channel 122, above the respective sludge 102SL in the respective relatively-still sludge collection zone 108, and then flows over and past the accumulation of sludge 102SL in the last sub-pocket 236SP of the series, over the exit lip 146, and out of the flow channel 122 into the clean flow zone 116 (FIG. 3A).

Referring to the above description of flow rates in the zones 106 and 108, the configuration of the trays 130/140 with the upturned entrance and exit lips 136 and 146 was said to protect the lesser flow rates of the flow 119 in the respective relatively-still sludge collection zone 108 from the higher flow rates of the flow 118 in the flow path 120. It may be understood that because the sections of the relatively-still sludge collection zones 108 (resulting from the sub-pockets 238SP and 248SP) are provided with the shorter lengths LSP, the values of the lesser flow rates in these sections of the relatively-still sludge collection zones 108 (e.g., of FIG. 3A) may be lower than the values of the lesser flow rates in the one longer, non-sectionalized relatively-still sludge collection zones 108. As a result, these sections of the sectional relatively-still sludge collection zones 108 resulting from the sub-pockets 238SP and 248SP foster more rapid settling of the settling-particles 102SE in the sectionalized zone 108, and more assurance of retaining the sludge 102SL (than the settling and retaining by the non-sectionalized zones 108).

Figure 4B:
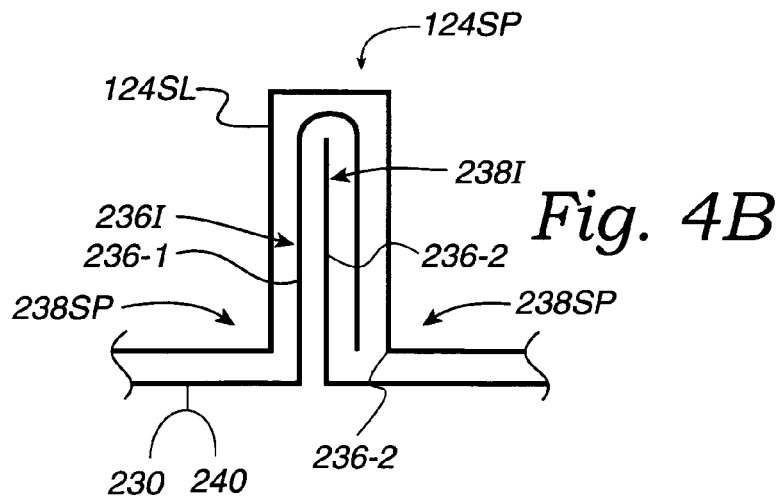
Figure 4C:
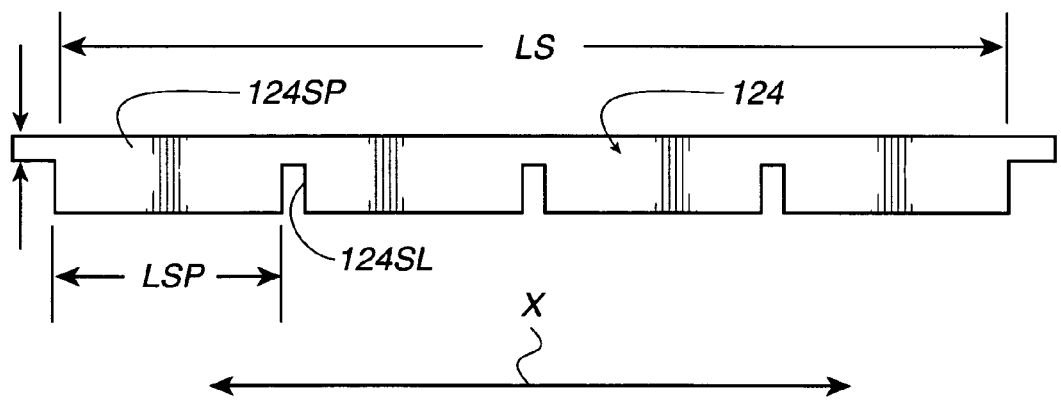

Another aspect of this modified pocket configuration of the ninth embodiment of FIG. 4A is shown in FIG. 4C. This aspect also applies regardless of which of the second through eighth embodiments is used. Each of the pushers is configured to cooperate with the intermediate lips 236I and 238I. For this purpose, each modified pusher (referred to as pusher 124SP) is configured with a slot 124SL at each location that corresponds to the intermediate lips 236I and 238I. The pushers 124SP also extend in the X axis direction across the length LS of the settler 100, and are otherwise configured the same as the pushers 124, e.g., with the transversely-thin profile, and being transversely-movable under the force of the channels 162 of the gantry drive 160. In this manner, each pusher 124SP is configured for extending into each sub-pocket 238SP and for pushing the sludge 102SL out of the sub-pocket 236SP of the sectional relatively-still sludge collection zone 108. Thus, with the sub-pockets 238SP providing the increased assurance of retaining the sludge 102SL in such zone 108 (and pocket) before such removing occurs, the pushers 124SP are configured to cooperate with the modified intermediate lips 236I and 238I to provide a practical, commercially-acceptable method for removing the sludge 102SL from each sub-pocket 238SP of the sectionalized relatively-still sludge collection zone 108.

In the above description of the first through ninth embodiments, the series of trays 130/140, and 230/240, were described, with each of the trays being positioned at a "low-angle" with respect to horizontal. In review, the first embodiment has a low-angle of zero degrees relative to the horizontal (X and Y axes) as shown in FIGS. 1, 2A-2C, 3A-3D, and 4A-4C. One version of the third, fifth, and seventh low-angle embodiments of the present invention is shown in FIG. 6A, in which two exemplary trays 330 and 340 are shown. These trays 330 and 340 are the same as the trays 130 and 140 shown in FIG. 3B, except as follows. A first exception is that the exit lips 152 of FIG. 3B are modified and are shown as exit lips 352 in FIG. 6A. A second exception is that the trays 330/340 may also be similar to the trays 230/240, except for the exit lips 352. A third exception is that the exit lips 352 are secured to the frame 220 so that the trays 330 and 340 have a non-zero degree value of the low-angle A with respect to the Y direction (horizontal). As described above, this non-zero value of low-angle A may be that of the above-described third embodiment in which the low-angle A has a low value other than zero and up to about thirty degrees. Alternatively, this value of the low-angle A may be that of the above-described fifth embodiment in which the low-angle A has a value other than zero and the low-value of angle A may be within the range of from about just more than zero degrees with respect to the horizontal Y axis to about twenty degrees with respect to the horizontal Y axis. Still alternatively, this low-angle A may be that of the above-described seventh embodiment in which the low-angle A has a low value other than zero, and the low-value is about five degrees with respect to the horizontal Y axis. In more detail, whichever of these embodiments is used, viewing FIG. 6A in the same manner as the first embodiment is viewed in FIG. 3D, the left end of the flow channel 122 is higher than the right side of the flow channel 122, such that the left side of the settling zone 106 is higher than the right side of the settling zone 106. Also, the left side of the pockets 138/148 and of the relatively-still sludge collection zone 108 is higher than the right side of the pocket and relatively-still sludge collection zone 108, and the left side of the transport zone 110 is higher than the right side of the transport zone 110. Further, as shown in FIG. 6A the pusher 124 may be configured as a vibration unit 124V secured to the settler 100 adjacent to the second lip 352. In this manner, although the angle A is a low-angle other than zero and is not sufficient to enable the force of gravity FG, on its own, to cause the sludge 102SL to move off the lower tray 330 or 440 into the combination zone 112, the vibration of the unit 124V, along with the trays 330 and 340 at the low-angle A other than zero, cause the sludge 102SL to move to the exemplary right in FIG. 6A and fall (arrow 192) into the chamber 184 (FIG. 3E) of the combination zone 112. As a result, the pusher 124V need not be driven by the gantry drive 160, and instead the pusher 124V occupies a small elongated volume extending in the X direction. In an exemplary configuration, the pusher 124V may extend under the right, lower second lip 352 to apply vibration to the exemplary tray 340 sufficient to cause the sludge 102SL to move to the right in FIG. 9A and off the exemplary tray 340 into the chamber 184. A further advantage of this embodiment of FIG. 9A is that the elongated vibratory pushers 124V are provided at an extreme edge of each of the two trays 330 and 340 (near the second lips 352) which further reduces (to a minimum) any interference of the pushers 124V with the flow 118 and the settling action in the respective relatively-still sludge collection zone 108.

In more detail, another version of the third, fifth, and seventh low-angle embodiments of the present invention is shown in FIG. 6C, in which the two exemplary trays 430 and 440 are shown. These trays 430 and 440 are shown the same as the trays 130 and 140 shown in FIG. 3B, except as follows. The trays 430/440 are supported at the low-angle A having a value other than zero degrees with respect to the Y axis, as described above with respect to the third, fifth, and seventh low-angle embodiments. Although the trays 430/ 440 are shown in FIG. 6C similar to that in FIG. 3A without the intermediate sections 238SP, the trays 430/440 may be configured similar to the trays 230/240, except for the support at the low-angle A other than zero with respect to the Y axis. The support at a low-angle A having a value other than zero degrees with respect to the Y axis may be provided by the above-described second lips that are integral with these trays 430/440, or by the above-described lips 152 or 152B that are separate from the trays and that are fastened to the trays 430/440, for example, at the respective side edges in the manner of the described bar stock 152B, for example. In each case, the lips 152 or bar stock 152B are secured to the members 222 so that the planar central sections of the trays are supported by the respective lips 152 or bar stock 152B at the low-angle A having a value other than zero degrees with respect to the Y axis. In more detail, whichever embodiment of lips 152 or 152B is used, as shown in FIG. 6C, the left side of the settling zone 106 is higher than the right side of the settling zone 106. Also, the left side of the relatively-still sludge collection zone 108 is higher than the right side of the relatively-still sludge collection zone 108. Also, because the transport zone 110 is at the same low-angle A, although each pusher 124 receives horizontal forces from the channels 162 (FIG. 2C) as the channels move in the Y direction, the configuration of the channels 162 allow the path taken by the pusher 124 to follow the low-angle A of the tray 440 shown in FIG. 6C. As a result, as the channels 162 move in the Y direction (e.g., to the right as viewed in FIG. 6C), each pusher 124 moves to the right with the channels 162 and downwardly in the channels 162, following the surface of the lower tray 440. Each pusher 124 thus remains in the pocket 138/148 and in the zone 108 and pushes the sludge 102SL to the exemplary right and through the right side sludge exit slot 154 and into the zone 112 in a manner similar to that described above with respect to FIGS. 3D & 3E. When the gantry reverses, the pusher 124 also remains in the zone 108 and pushes the sludge 102SL to the exemplary left (uphill in this case) and through the left side sludge exit slot 154 and into the opposite zone 112 in a manner similar to that described above with respect to FIGS. 3D & 3E.

Another benefit of the configurations of the embodiments shown in FIGS. 6A and 6C relates to the need from time to time to drain the fluid from the basin 200. With the exemplary trays 430 and 440 at the low-angle A having a value other than zero degrees, as the basin 200 is drained and the fluid flows or is pumped out of the basin, the low-angle A other than zero degrees enables the force of gravity FG to cause the fluid on the trays to flow off the trays, removing most, if not all, of the sludge 102SL from the trays 430 and 440 so that the weight of the sludge 102SL does not deform the trays.

Versions of the second, fourth, and sixth low-angle embodiments of the present invention are shown in FIG. 6B, in which two exemplary trays 530 and 540 are shown. These trays 530 and 540 are shown the same as the trays 130 and 140 shown in FIG. 3B, except as follows. The trays 530/540 are supported at the low-angle A having a value other than zero degrees with respect to the X axis, as described above with respect to the second, fourth, and sixth low-angle embodiments. In comparison, reference may be made, for example, to the first embodiment shown in FIG. 3A in which the low-angle A has a value of zero degrees with respect to the X axis. The trays 530/540 may be similar to the trays 230/240 (e.g., having subpockets 238SP and pushers 124P), except for the support at the low-angle A having a value other than zero degrees with respect to the X axis. The support at the low-angle A other than zero degrees with respect to the X axis may be provided by the above-described second lips that are integral with these trays 530/540, or by the above-described lips 152 or bar stock 152B that are separate from the trays 530/540 and fastened to the trays 530/540, for example, at the respective side edges, e.g., in the manner of the described bar stock 152B, and at the low-angle A having a value other than zero degrees. Thus, in each case, the integral lips or separate lips 152 or bar stock 152B are secured to the members 222 so that the planar central sections of the trays are supported by the respective lips or bar stock at the low-angle A having a value other than zero with respect to the X axis. In more detail, whichever embodiment of lips is used, as shown in FIG. 6B in respect to one exemplary pair of trays 530/540, the left (incoming) side of the flow channel 122 is supported lower than the right side of the flow channel 122, such that the left (incoming) side of the settling zone 106 is lower than the right side of the settling zone 106. Also, the left side of the pocket 148 and of the relatively-still sludge collection zone 108 is supported lower than the right side of the pocket and relatively-still sludge collection zone. Also, although the transport zone 110 is oriented at the same low-angle A, and although the configuration of the channels 162 and the tabs 172 allow the pusher 124 to be oriented at the low-angle A, it is to be understood that when the tray 540 is parallel to the Y axis the path taken by the pusher 124 when the pusher is pushed for sludge removal is a horizontal path parallel to the Y axis. With the relatively-still sludge collection zone 108 and the pusher 124 shown in FIG. 6B at the low-angle A, the pusher 124 is thus received in the pocket 148 and the zone 108 in position to push the sludge 102SL. The sludge is pushed horizontally toward the viewer as viewed in FIG. 6B. It may be understood that with the low-angle A having a value other than zero degrees as defined above for the second, fourth, and sixth low-angle embodiments, the frame 220 may mount each one of the trays 530/540 (FIG. 6B) with the entrance edge and the fluid flow exit edge of each of the trays extending at a first low-angle of zero degrees with respect to the transverse axis and so that each upturned lip 136 and 146 extending generally in the depth direction. The term "generally" indicates that the lips 136 and 146 (FIG. 6B) are tipped with respect to vertical only by a small amount (e.g., corresponding to the angle A). Also, FIG. 6C shows that each of the sludge removal lips (e.g., 152B and 152B) extends along and under a respective sludge exit edge so that pairs of the sludge removal lips (e.g., 152B and 152B) are opposed generally in the direction of the transverse (Y) axis and support a respective one of the trays (e.g., 440) at the second low-angle (shown as A in FIG. 6C). Still further, the pocket 148 is shown in FIG. 6C alongside the flow channel 122, the pocket 148 extending at the low-angle A and having a depth that is generally perpendicular to the longitudinal X direction. The term "generally" again indicates that the depth PD is tipped with respect to vertical only by a small amount (e.g., corresponding to the angle A).

It may be understood that with the second, fourth, and sixth low-angle embodiments at the low-angle A other than zero degrees, the fluid exit lips 136 and 146 of the respective trays 530 and 540 are located above the respective entrance lips 136 and 146. Because of this relative location, there is a tendency for the fluid exits lips 136 and 146, and of the rightward intermediate lips 236I & 238I, to more assuredly and efficiently capture the sludge 102SL and retain the captured sludge 102SL in the respective subpockets 138SP and 148SP. As described below, because of the configuration of the tabs 172 slidably received in the channels 162 (FIGS. 3A and 3C) to allow the pushers 124SP to be received in the pockets 148 and in the zones 108 that are at the low-angles A other than zero degrees, the low-angle orientations of the trays 530 and 540 do not interfere with the sludge removal action of the pushers 124SP (as described above).

When the ninth embodiment of FIGS. 4A-4C is combined with any of the second, fourth, and sixth low-angle embodiments at the low-angle A other than zero degrees, the low-angle orientations of the trays also do not interfere with the sludge removal action of the pushers 124SP with respect to the subpockets.

FIG. 6D illustrates a portion of the eighth embodiment, which combines the advantages of the respective sixth and seventh embodiments described with respect to FIGS. 6B and 6C. For clarity of illustration, FIG. 6D only shows an orientation of one exemplary tray 630, and omits the supporting lips 152 and bar stock 152B, but also represents the orientation of an adjacent tray (e.g., an upper or lower tray) in the manner in which trays 130 and 140 are arranged and supported one above or below the other (as described above). The exemplary tray 630 is shown having four corner 631, 632, 633, and 634, and is oriented relative to a horizontal plane (indicated by dashed lines 636) in which the X and Y axes are located. FIG. 6D shows that in the eighth embodiment the one corner 631 is in the plane 636, whereas the corner 632 is above the plane 636. The tray 630 is thus oriented upwardly (generally in the X direction) from corner 631 to corner 632 (in the manner of the tray 530 in FIG. 6B). This upward orientation is at a low-angle having a value other than zero degrees, as defined above, which value is relative to the X axis. This low-angle is shown as A1 and has a positive value. The tray 630 is also oriented downwardly from the corner 631 to corner 634 (generally in the Y direction) in the manner of the tray 440 in FIG. 6C, such that a low-angle A2 has a negative value. It may be understood that from corner 632 to corner 633 the tray 630 is also oriented downwardly at the low-angle A2, with corner 633 being in the plane 636. It may be understood that from corner 633 to corner 634 the tray 630 is also oriented downwardly at the low-angle A1, with corner 634 being below the plane 636. As a result, the tray 630 is oriented upwardly (generally in the X direction) from both corner 631 to corner 632 and from corner 634 to corner 633. Because of this orientation, there is a tendency for the fluid exits lips 138 and 148 (which are associated with the tray 630 but not shown) to more assuredly and efficiently capture the sludge 102SL and retain the captured sludge 102SL in the respective pockets 138 and 148 (in a manner similar to that described above with respect to FIG. 6B).

The exemplary tray 630 of FIG. 6D may also be configured according to the ninth embodiment (FIGS. 4A-4B), and the pusher 124 used with such tray 630 may be as shown in FIG. 4C. As described in the next-previous paragraph, the benefits of more assuredly and efficiently capturing and retaining may thus be realized in combining the eighth and ninth embodiments.

As another result, the tray 630 is oriented downwardly (generally in the Y direction) from both corner 632 to corner 633 and from corner 631 to corner 634. Because of this orientation, in the eighth embodiment, as the basin 200 is drained and the fluid flows out of the basin, the low-angle2 A1 & A2 other than zero degrees enable the force of gravity FG to cause the fluid on the tray 630 to flow off the tray 630, removing most, if not all, of the sludge 102SL from the tray 630 so that the weight of the sludge 102SL does not deform the tray. Also, with the tray 630 provided with a pusher 124 of the type described above, and because of the configuration of the tabs 172 slidably received in the channels 162 (FIGS. 3A and 3C) to allow the pushers 124 to be received in the zones 108 that are at these low-angles A1 and A2, these low-angle orientations of the trays 530 and 540 do not interfere with the sludge removal action of the pushers 124 (as described above). This self-draining benefit is also achieved by the above-described combination of the eighth and ninth embodiments. Thus, the subpocket and pusher configurations of these two embodiments may be realized even though the low-angle may be with respect to the X axis, or the Y axis, or both X and Y axes at the same time.

Figure 7:
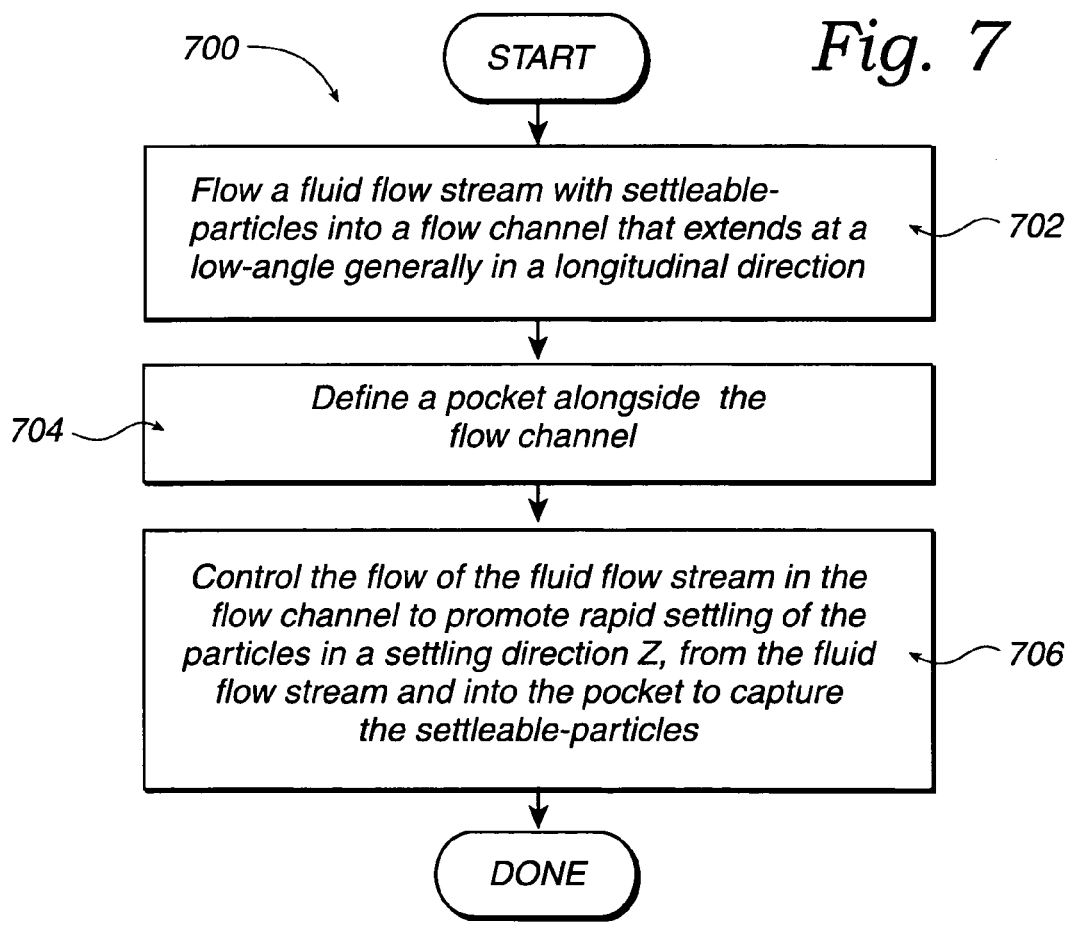
FIGS. 7, 8 and 9 are flow charts depicting operations of methods of embodiments of the present invention.

Referring now to FIG. 7 of the drawings, there is depicted an embodiment of a method performed by the low-angle-flow, low-angle-tray settler 100 of an embodiment of the present invention. The method is shown in a flow chart 700 and starts by moving to an operation 702 of flowing a fluid flow stream with settleable-particles into a flow channel that extends at a low-angle and in the longitudinal direction X. An exemplary flow channel is 122 shown in FIG. 3A in which there is settling flow 118, where the low-angle A has a value of zero degrees in the first embodiment. Any other low-angle A may be used, as described above with respect to the second through eighth embodiments.

The method moves to an operation 704 to define a pocket alongside the flow channel. This pocket may be an exemplary pocket 148 shown in FIG. 3A as defining the relatively-still sludge collection zone 108. The pocket 148 extends in the longitudinal direction X, in the settling direction Z that is perpendicular to the longitudinal direction X, and has the depth PD in the Z direction. The method concludes by moving to an operation 706 of controlling the flow of the fluid flow stream in the flow channel to promote rapid settling of the settleable-particles in the settling direction Z, from the fluid flow stream and rapidly into the pocket to capture the settleable-particles. Such controlling may be as described above with respect to FIGS. 3A-3E in which flow controlling is performed by the entrance lips 136. For example, the space 129 may be defined, and the dimensions of the entrance lips 136 and 146 at the respective entrance edges 132 and 142 may be selected, resulting in the height FD of the entrance slot 139. The values of the space 129 and of the depths FD and PD aid in controlling the flow rates of the (dirty) cleaning flow 118 in the zone 106, and the configuring of the entrance and exit lips 136 and 146 promote the rapid particle settling action via the lesser flow rates of the flow 119 in the pockets 138/148 and the relatively-still sludge collection zone 108. The settleable-particles 102SE rapidly settle from the (dirty) cleaning flow 118 into the pocket 148. This rapid particle settling action occurs in each pair of the trays 130/140.

As an example of operation 706, the control may use the first embodiment of the settler 100 configured with the trays 130 and 140 extending in the X direction with a length LS in a range of from about ten inches to about 120 inches. This control may also be by providing the trays 130 and 140 in a range of from about ten trays to about 250 trays, according to the GPM of the incoming dirty flow 105. This control may also be provided by the trays 130 and 140 extending in the Y direction with a width W in a range of from about twenty-four inches to about 120 inches. This control may also be provided by the trays 130 and 140 configured to be spaced by the space of from about one to two inches, and with the lips 136 and 146 extending in the Z direction in a range of from about 0.5 inch (corresponding to the 1 inch space 129) to about 1 inch (corresponding to the two inch space 129). The entrance slot 139 may have a value in a range of from about 0.5 inch (corresponding to the 1 inch space 129) to about 1 inch (corresponding to the two inch space 129). The exit slot 154 may have a value in a range of from about 0.5 inch to about 1.0 inch. This control may include a flow rate of each cleaning flow 118 controlled to be in a range of about one GPM to about ten GPM per zone 106. Also, the rate of travel of the pusher 124 or 124SP may be controlled to be in one of the above-described ranges. An expected amount of settleable-particles 102 (in terms of parts per million by weight) may be about five to 1000.

As another example of operation 706, the control may be provided by using the ninth embodiment to configure the trays 230 and 240 (FIGS. 4A-4C) to extend in the X direction with a length LS in a range of from about ten to 120 inches. The control may also be by configuring the trays 230 and 240 to extend in the Y direction with a width W in a range of from about twenty-four to about 120 inches, and lengths LSP in a range of from about six inches to about 60 inches depending on the length LS. This would provide the relatively-still sludge collection zone 108 with about from two to twenty subsections (or subpockets 238SP) for receiving and retaining the sludge 102SL. The other control aspects of the ninth embodiment would be as described above for the first embodiment. This control may also be provided by configuring the trays 230 and 240 with similar values of the space 129, and of the lips 136 and 146 extending in the Z direction and the entrance slot 139 and the exit slot 154 as described above.

Figure 8:
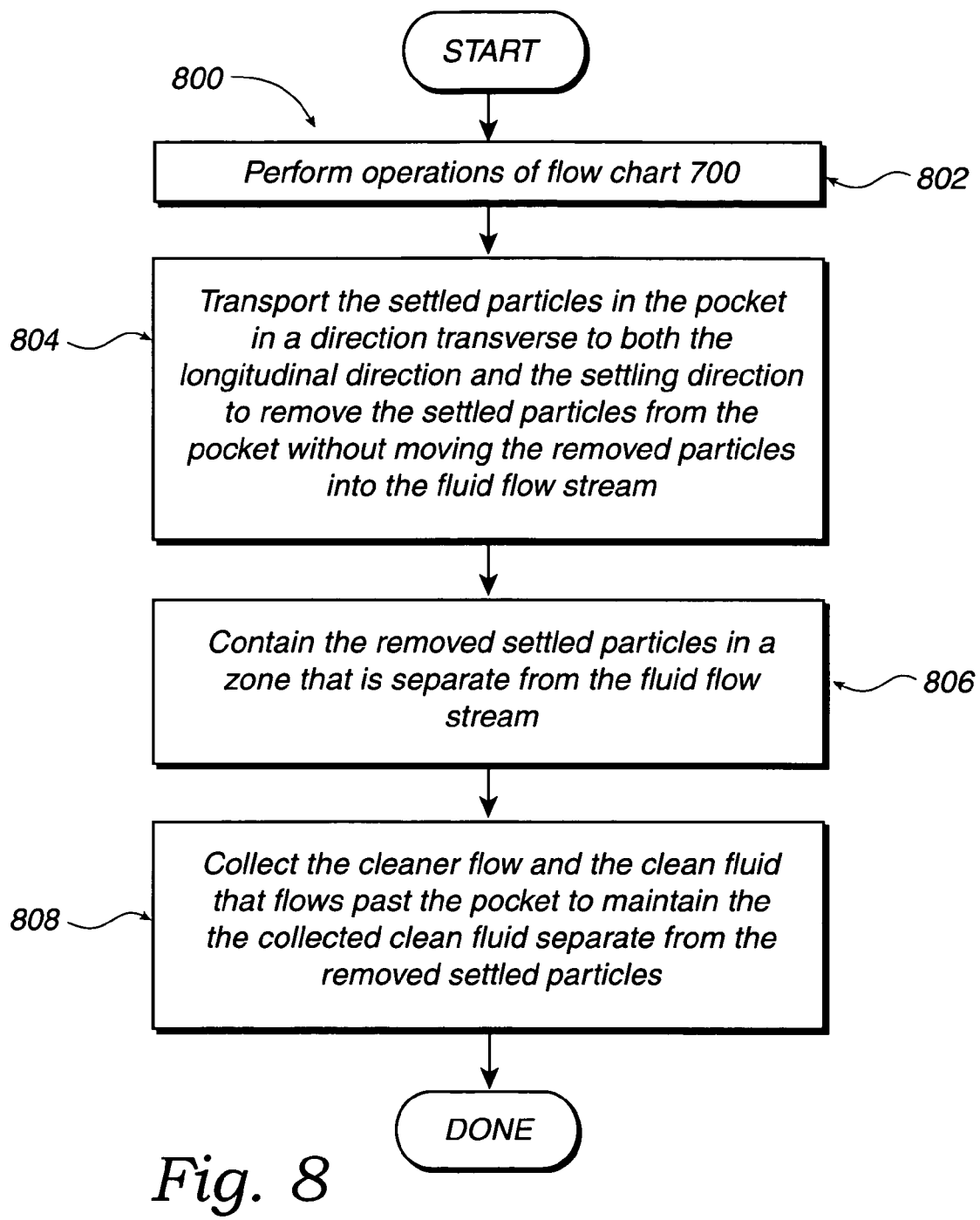

Referring now to FIG. 8 of the drawings, there is depicted another embodiment of the method performed by the present invention. The method is shown in a flow chart 800, and moves to an operation 802, which is performance of the operations of the flow chart 700. The method moves to an operation 804. In operation 804, there is transporting of settled particles in the pocket in the direction Y transverse to both the longitudinal direction X and the settling direction Z to remove the settled particles (sludge 102SL) from the pocket without moving the removed particles into the fluid flow stream. Such transporting may be said to be "generally" in the Y direction, to include horizontal (FIG. 3D) and low-angle A (FIG. 6C). Operation 804 may be performed, for example, by the pusher 124 pushing the sludge 102SL generally in the direction of the Y axis perpendicularly to the direction of the X axis for removal of the retained sludge 102SL from the pocket 138 through the sludge removal slot 154 (i.e., as shown in FIGS. 3D and 6C). Such removal of the retained sludge 102SL is separate from the cleaning flow 118 of the flow path 120 in the flow channel 122. As the sludge 102SL is so removed, the cleaning flow 118 in the flow path 120 continues longitudinally in the flow channel 122 (in the X axis direction). Such sludge removal may be achieved by use of the pusher 124 that is moved in the relatively-still sludge collection zone 108 (separate from the flow channel 122), and the pusher 124 may be thin in the Y direction (across the flow path 120) to minimize interference with the cleaning flow 118 in the flow path 120. Alternately, and more preferably, the pusher 124SP may be moved in the sectionalized relatively-still sludge collection zone 108 shown in FIGS. 4A-4C.

After such removal, the method moves to operation 806, in which there is containing of the removed sludge in a zone separate from the fluid flow stream and separate from the pocket or pockets. The containing may result from the above-described exemplary movement of the bridge 168 and channels 162 (e.g., to the left and right in FIGS. 3D and 6C) to cause the pusher 124 to move the sludge 102SL in the transport zone 110, through the sludge removal slots 154 and into the combination zone 112. As described above, FIG. 3E shows the combination zone 112 defined by the hollow chamber 184 extending in the Z axis direction (vertically) to allow the sludge 102SL from the transport zone 110 to fall under the force of gravity FG separate from the incoming dirty flow 105 and separate from the cleaning flow 118 and from the flow 119 and from the cleaner flow 126 and from the clean flow 128 and separate from the accumulation of sludge in the relatively-still sludge collection zone 108 and pocket 138/148. The sludge 102SL is contained in the combination zone 112. For example, by the configuration of the chamber 184 defining the zone 112, and by the above-described sludge removal from the pockets 138/148, the contained sludge 102SL is separate from the fluid flow stream 122 and from the pockets 138 and 148, or from the sub-pockets 238SP and 248SP. Further, the contained sludge 102SL is separate from the incoming dirty flow 105, separate from the clean flow zone 116, separate from the flow 119, and separate from the cleaner flow 126 and from the clean flow 128. In each case of such separation in the chamber 184, the sludge 102SL cannot flow from the chamber 184 to other than the sludge removal zone 114 that is at the bottom of the chamber 184. After such containing, the method moves to operation 808, in which there is collecting of the cleaner flow 126 and the clean fluid 128 from the settler 100 to maintain the collected clean fluid 128 separate from the removed sludge 102SL.

Figure 9:
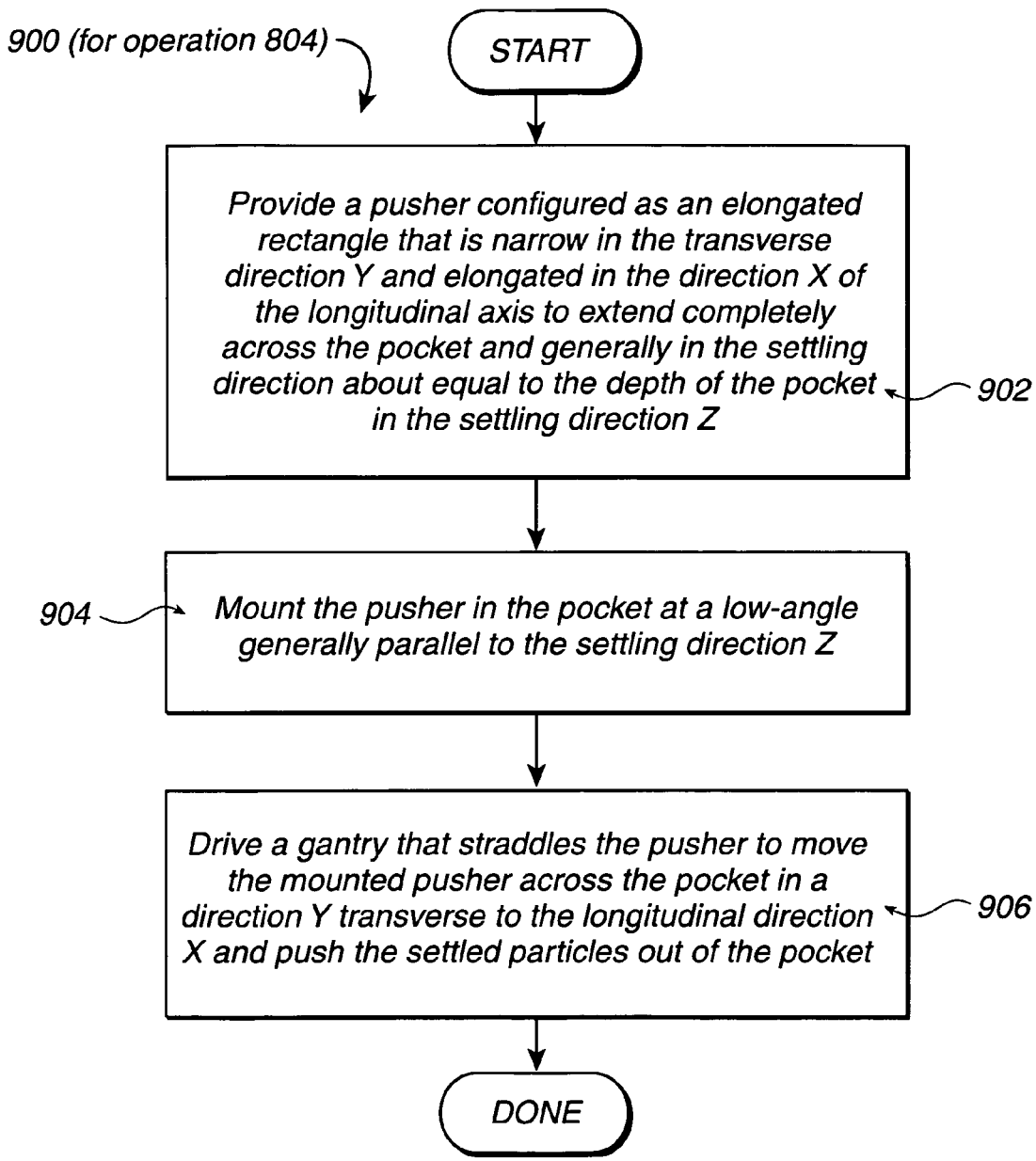

In more detail, FIG. 9 shows another aspect of the method, illustrating a flow chart 900 describing operation 804 in more detail. Operation 904 may also comprise an operation 902 of providing a pusher configured as an elongated rectangle that is narrow in the transverse direction Y and elongated in the direction X of the longitudinal axis to extend completely across the pocket and generally in the settling direction about equal to the depth PD of the pocket in the settling direction Z. This pusher may, for example, be the pusher 124 described above with respect to the pockets 138 and 148, or may be the pusher 124SP. The method moves to an operation 904 of mounting the pusher in the pocket at a low-angle generally parallel to the settling direction Z. This mounting may, for example, be as described above with respect to FIGS. 3D and 3E with the value of the low-angle A equal to zero degrees. Alternatively, the value of the low-angle A may be as described above in respect to the second through eighth embodiments. The method moves to an operation 906 of driving a gantry that straddles the pusher to move the mounted pusher across the pocket in the direction Y transverse to the longitudinal direction X and push the settled sludge out of the pocket. Operation 904 may, for example, include first defining the pocket 138 as a series of the pockets (e.g., the sub-pockets 238SP) alongside the flow channel 122, the sub-pockets 238SP of the series of pockets extending one after another in the longitudinal direction X. In operation 904, the gantry operation may be as described above in respect to the low-angle A having a value other than zero degrees, or as described above when low-angle A equals zero degrees (FIGS. 3D and 3E).

In view of the foregoing descriptions of the embodiments of the apparatus and method of the present invention, it is to be understood that these embodiments meet all of the above needs by providing ways of separating settleable-particles 102 from particle-laden fluid more efficiently than the prior settlers described above, for example. One way of increasing such efficiency is by rapidly settling the settling particles 102SE from the flow channel 122 (e.g., from the settling flows 118) and more rapidly from the flow 119 as sludge 102SL more rapidly settled into the relatively-still sludge collection zones 108 and respective pockets 138/148. A further way of increasing such efficiency is by the capturing of the settled sludge 102SL so that the cleaning flow 118 and the cleaner flow 126 are less likely to carry sludge 102SL along the flow channels 122 into the clean flow zone 116, for example. In all of the embodiments of the new configurations and processes, cross flow of settled particles (sludge 102SL) with the flow 105 of incoming fluid and settleable-particles is avoided. Also avoided is cross flow of the settled-particles 102SL with the cleaner flow 126 or the clean flow 128 or the sludge-collection flow 119. Such configurations also provide the pushers 124, 124SP, and 124V, for example, as practical methods and apparatus for removing the sludge 102SL from between the embodiments of the closely-spaced trays (the trays 130 and 140, for example), of the settler 100.

Although the foregoing has been described in some detail for purposes of clarity or understanding, it will be appreciated that certain changes and modifications may be practiced within the scope of the appended claims. For example, the structures that define the lips (such as the lips 136 and 146) may be varied to configure the pockets 138 and 148 according to characteristics of the settleable-particles 102. Also, the pushers may have configurations (other than the configurations of pushers 124, 124SP, and 124V) so that the sludge 102SL in the relatively-still sludge collection zone 108 and pockets 138/148 is removed into the combination zone 112 in a manner suited to a range of special characteristics of the settleable-particles 102, for example. Accordingly, the present embodiments are to be considered as illustrative and not restrictive, and the embodiments of the present invention are not to be limited to the details given herein, but may be modified within the scope and equivalents of the appended claims.

What is claimed is:

1. A settler unit for separating settleable-particles from a dirty flow of the settleable-particles and fluid, the settler unit comprising:

a first tray and a second tray;

each of the trays comprising a planar central section configured with opposed ends and opposed sides, the planar section being configured with an entrance edge on one opposed end and an exit edge on another opposed end, the planar section being configured with side edges that are opposed to each other, the tray being configured with an upturned entrance lip at the entrance edge and an upturned exit lip at the exit edge, the upturned entrance lip being opposite to the respective upturned exit lip, the upturned entrance lip and the upturned exit lip each being configured to extend away from the planar central section by a pocket depth amount, the upturned entrance lip and the upturned exit lip cooperating with each other to define a sludge collection pocket, each respective tray being configured to be supported at each side edge in an orientation to receive the settleable-particles from the dirty flow of settleable-particles and fluid;

the first tray being oriented as an upper tray;

the second tray being oriented as a lower tray with respect to the upper tray;

a frame configured to support each respective opposed side edge of the upper tray and of the lower tray so that the respective upper tray and lower tray are mounted in a mutually parallel spaced orientation at a low-angle for defining the settler unit configured with the sludge collection pocket of the lower tray oriented to receive the settleable-particles from the dirty flow of settleable-particles and fluid;

wherein the upturned entrance lip and upturned exit lip are spaced from each other by a first distance;

a dirty flow entrance slot defined between the entrance edge of the upper tray and the upturned entrance lip at the entrance edge of the lower tray; and a clean flow exit slot defined between the exit edge of the upper tray and the upturned exit lip at the exit edge of the lower tray;

the configuration of the frame to support each respective opposed side edge comprises a side edge support extending along substantially the entire extent of the first distance adjacent to each opposed side edge, each side edge support being configured with a downturned sludge exit lip extending from the planar central section to define a fluid flow depth about equal to the pocket depth; and the frame being further configured to mount the upper and lower trays in the mutually parallel spaced orientation at the low-angle and define a depth of the dirty flow entrance slot about equal to the fluid flow depth to admit the dirty flow between the upper tray and the lower tray for flow above and in the pocket of the lower tray.

2. A settler unit as recited in claim 1, wherein the first distance of the lower tray is configured so that in the first distance of the sludge collection pocket between the upturned entrance lip and the upturned exit lip the sludge collection pocket is adapted to receive and capture settleable-particles from the dirty flow of settleable-particles while cleaner flow flows to the clean flow exit slot.

3. A settler unit for separating settleable-particles from a dirty flow of the settleable-particles and fluid, the settler unit comprising:

a first tray, the first tray being oriented as an upper tray;

a second tray, the second tray being oriented as a lower tray with respect to the upper tray;

each of the first and second trays comprising a planar central section configured with opposed ends and opposed sides, the planar section being configured with an entrance edge on one opposed end and an exit edge on another opposed end, the planar section being configured with side edges that are opposed to each other, the tray being configured with an upturned entrance lip at the entrance edge and an upturned exit lip at the exit edge, the upturned entrance lip being opposite to the respective upturned exit lip, the upturned entrance lip and the upturned exit lip each being configured to extend away from the planar central section by a pocket depth amount, the upturned entrance lip and the upturned exit lip cooperating with each other to define a sludge collection pocket, the tray being configured to be supported at each side edge in an orientation to receive the settleable-particles from the dirty flow of settleable-particles and fluid, and a side edge support extending along substantially the entire extent of the first distance adjacent to each opposed side edge, each side edge support being configured with a downturned sludge exit lip extending from each side edge of the planar central section to define a fluid flow depth about equal to the pocket depth; and a frame configured to support each respective opposed side edge of the upper tray and of the lower tray to mount the respective upper tray and lower tray in a mutually parallel spaced orientation at a low-angle for defining the settler unit configured with a respective downturned sludge exit lip under the upper tray oriented facing and spaced from the respective opposed side edge of the lower tray.

4. A settler unit as recited in claim 3, the settler unit further comprising:

a sludge exit slot defined between the respective downturned sludge exit lip of the upper tray and the respective opposed side edge of the lower tray, and the frame being further configured to mount the upper and lower trays in the mutually parallel spaced orientation at the low-angle so that a height of the sludge exit slot is about equal to the pocket depth of the lower tray to allow removal of settleable-particles that have settled from the dirty flow into the pocket of the lower tray, the removal being by movement through the sludge exit slot.

5. A settler unit as recited in claim 4, the settler unit further comprising:
   a sludge pusher configured to extend between the upturned entrance lip and the upturned exit lip of the lower tray and in the pocket of the lower tray, the sludge pusher being configured to move across the respective planar central section of the lower tray and against the settleable-particles that have settled into the pocket of the lower tray, the pusher being configured to move the settled-particles from the pocket through the sludge exit slot.

6. Apparatus for separating settleable-particles from a fluid flow stream, the apparatus comprising:
   a flow channel extending at a low-angle and configured to receive the fluid flow stream with the settleable-particles;
   a pocket configured alongside and below the flow channel, the pocket extending at the low-angle and parallel to the flow channel and in a particle settling direction that is perpendicular to a longitudinal direction, the pocket having a width extending in a direction transverse to both the longitudinal and particle settling directions, the pocket being configured to receive settleable-particles that settle from the fluid flow stream, the pocket being further configured to retain the settled-particles, the configuration of the pocket comprising:
      a first tray having an entrance edge and a fluid exit edge, each edge extending at a low-angle relative to the transverse direction; and
      a first lip configured to extend along each of the entrance edge and the fluid exit edge, each first lip extending toward the flow channel, the first lips cooperating with the first tray to define the pocket;
      a side extending completely between the first lips; and
   a sludge pusher configured to extend completely across the pocket between the lips and to extend in the particle settling direction, the sludge pusher being configured to move in the pocket in the transverse direction, the sludge pusher being further configured to push against the retained-settled-particles in the pocket to move the retained-settled-particles transversely past the side of the pocket and out of the pocket while the fluid flow stream flows at the low-angle and above the pocket without the retained-settled-particles.

7. Apparatus for separating settleable-particles from a fluid flow stream, the apparatus comprising:
   a flow channel extending at a low-angle and configured to receive the fluid flow stream with the settleable-particles;
   a pocket configured alongside and below the flow channel, the pocket extending at the low-angle and parallel to the flow channel and in a particle settling direction that is perpendicular to a longitudinal direction, the pocket having a width extending in a direction transverse to both the longitudinal and particle settling directions, the pocket being configured to receive settleable-particles that settle from the fluid flow stream, the pocket being further configured to retain the settled-particles, the configuration of the pocket comprising:
      a first tray having an entrance edge and a fluid exit edge, each edge extending at a low-angle relative to the transverse direction; and
      a first lip configured to extend along each of the entrance edge and the fluid exit edge, each first lip extending toward the flow channel, the first lips cooperating with the first tray to define the pocket;
   a second tray spaced from and located above and parallel to the first tray, the second tray being configured with a sludge removal edge extending at the low-angle relative to the longitudinal direction and transversely with respect to the entrance edge and transversely with respect to the fluid exit edge; and
   a sludge removal lip configured to extend under the sludge removal edge to support the second tray.

8. Apparatus as recited in claim 7, wherein the sludge removal lip is configured to extend from under the second tray parallel to the particle-settling direction and toward the first tray, the sludge removal lip being configured to cooperate with the second tray to limit the fluid flow stream to flow at the low-angle relative to the longitudinal direction.

9. Apparatus as recited in claim 7, wherein the sludge removal lip is configured to cooperate with the first tray to define a sludge removal slot to permit movement of the retained settled-particles along the first tray transversely with respect to the longitudinal direction for removal of the retained-settled particles from the pocket through the sludge removal slot.

10. Apparatus for separating settleable-particles from a fluid flow stream the apparatus comprising:
   a flow channel extending at a low-angle and configured to receive the fluid flow stream with the settleable-particles;
   a pocket configured alongside and below the flow channel, the pocket extending at the low-angle and parallel to the flow channel and in a particle settling direction that is perpendicular to a longitudinal direction, the pocket having a width extending in a direction transverse to both the longitudinal and particle settling directions, the pocket being configured to receive settleable-particles that settle from the fluid flow stream, the pocket being further configured to retain the settled-particles, the configuration of the pocket further comprising a plurality of divider lips separating the pocket into a series of sub-pockets, the series extending at the low-angle relative to the longitudinal direction, each divider lip extending in a transverse direction perpendicular with respect to the longitudinal direction, each sub-pocket being configured alongside the flow channel, each of the sub-pockets being configured to extend in the settling direction to receive settleable-particles that settle from the fluid flow stream, each sub-pocket being configured to retain the settled-particles, each respective sub-pocket being configured with a sludge removal edge extending in the longitudinal direction;
   a first tray having an entrance edge and a fluid exit edge, each edge extending at a low-angle relative to the transverse direction;
   a first lip configured to extend along each of the entrance edge and the fluid exit edge, each first lip extending toward the flow channel, the first lips cooperating with the first tray to define the pocket;
   the first tray being configured with the plurality of divider lips located between the first lips so that the sub-pockets are between the first lips;
   a second tray spaced from and located above and parallel to the first tray, the second tray being configured with a second edge extending transversely with respect to the entrance edge and transversely with respect to the fluid exit edge, the second edge extending at a low-angle relative to the longitudinal direction; and a second lip configured to extend under the second edge to support the second tray, the second lip being further configured to extend from the second tray toward the divider lips of the sub-pockets, the configuration of the second lip being to limit the fluid flow stream to flow at the low-angle relative to the longitudinal direction.

11. Apparatus as recited in claim 10, wherein the second lip is further configured to terminate spaced from the first tray to define a series of sludge removal slots extending at the low-angle relative to the longitudinal direction so that the sub-pockets are open in the transverse direction to permit removal of the settled-particles from the sub-pockets.

12. Apparatus for separating settleable-particles from a fluid flow stream, the apparatus comprising:
a flow channel extending at a low-angle and configured to receive the fluid flow stream with the settleable-particles;
a pocket configured alongside and below the flow channel, the pocket extending at the low-angle and parallel to the flow channel and in a particle settling direction that is perpendicular to a longitudinal direction, the pocket having a width extending in a direction transverse to both the longitudinal and particle settling directions, the pocket being configured to receive settleable-particles that settle from the fluid flow stream, the pocket being further configured to retain the settled-particles; and
a sludge pusher configured to extend in the longitudinal direction and in the settling direction and being received in the pocket, the sludge pusher being configured to move in the pocket transversely with respect to the longitudinal direction, the sludge pusher movement being against the retained-settled-particles in the pocket to move the retained-settled-particles transversely through the pocket and from the pocket while the fluid flow stream flows in the longitudinal direction above the pocket.

13. Apparatus for separating settleable-particles from a fluid flow stream, the apparatus comprising:
a flow channel extending at a low-angle and configured to receive the fluid flow stream with the settleable-particles;
a pocket configured alongside and below the flow channel, the pocket extending at the low-angle and parallel to the flow channel and in a particle settling direction that is perpendicular to a longitudinal direction, the pocket having a width extending in a direction transverse to both the longitudinal and particle settling directions, the pocket being configured to receive settleable-particles that settle from the fluid flow stream, the pocket being further configured to retain the settled-particles, the configuration of the pocket to retain the settled-particle retains the settled-particle against flow in the longitudinal direction and comprises a sludge removal slot permitting movement of settled-particles in the pocket transversely with respect to the longitudinal direction;
a clean flow chamber separate from the pocket and configured to receive clean flow from the flow channel after settling of settleable-particles into the pocket;
a sludge pusher configured to extend in the longitudinal direction and in the settling direction, the sludge pusher being configured to move in the pocket transversely with respect to the longitudinal direction, the sludge pusher having a thin profile in the transverse direction, the sludge pusher configuration to move being further configured to push against the retained-settled-particles in the pocket and move the retained-settled-particles transversely through the sludge removal slot and from the pocket while the fluid flow stream continues to flow in the longitudinal direction above from the pocket and into the clean flow zone; and
a sludge storage chamber configured to receive the retained-settled-particles from the sludge removal slot separately from the clean flow and from the clean flow chamber.

14. Apparatus for separating settleable-particles from a fluid flow stream, the apparatus comprising:
a flow channel extending at a low-angle and configured to receive the fluid flow stream with the settleable-particles; and
a pocket configured alongside and below the flow channel, the pocket extending at the low-angle and parallel to the flow channel and in a particle settling direction that is perpendicular to a longitudinal direction, the pocket having a width extending in a direction transverse to both the longitudinal and particle settling directions, the pocket being configured to receive settleable-particles that settle from the fluid flow stream, the pocket being further configured to retain the settled-particles;
wherein the flow channel and the pocket are a respective first flow channel and first pocket, and the first pocket is further configured with a sludge removal slot extending parallel to the first flow channel;
a plurality of other flow channels and respective other pockets arranged below the respective first flow channel and first pocket to form a vertical series of one flow channel above a next-below pocket and a next-below flow channel above a next-below pocket, each of the next-below pockets also being configured with a sludge removal slot extending parallel to the first flow channel;
a pusher received in each of the first pockets and next-below pockets, the pusher being configured to push the received and settled particles through each respective sludge removal slot; and
a sludge receiver chamber configured to extend vertically and adjacent to each of the respective sludge exit slots, the sludge receiver chamber being configured with an opening corresponding to each sludge removal slot to receive from the respective pocket the respective particles that were settled and retained and removed.

15. Apparatus as recited in claim 14, wherein the flow channel is configured with a dirty flow inlet end and a clean flow exit end; the apparatus further comprising:
a clean flow chamber separate from the dirty flow inlet end of each flow channel for receiving the clean flow from each clean fluid flow exit end, the clean flow chamber being configured separately from the sludge receiving chamber.

16. Apparatus as recited in claim 14, further comprising:
a frame for supporting the flow channels and the pockets at the low-angle, the low-angle being an angle of zero degrees to thirty degrees taken from the group consisting of:
an angle measured with respect to the longitudinal direction;
an angle measured with respect to the transverse direction; and
an angle measured with respect to the longitudinal direction and an angle measured with respect to the transverse direction.

17. Apparatus for separating settleable particles from a dirty fluid flow stream, the apparatus comprising:
- a plurality of trays, each tray being configured with a planar central section, an entrance edge at one end of the section and a fluid exit edge at another end of the section, each tray being further configured with an upturned lip extending along each of the entrance edge and the fluid exit edge, each upturned lip being generally perpendicular with respect to the planar central section;
- a frame defining an orthogonal axis system comprising orthogonal longitudinal, transverse and depth axes, the frame supporting the trays in mutually-parallel spaced relationship with one tray in a direction of the depth axis above a next-lower adjacent tray and the one tray in the depth axis direction below a next-above adjacent tray to divide the fluid flow stream into a plurality of individual flow paths;
- the frame mounting each one of the trays with the entrance edge and the fluid flow exit edge of each of the trays extending at a first low-angle with respect to the transverse axis so that each upturned lip extends generally in the depth direction;
- the mounting of each one of the trays being effective to define an upper boundary in the direction of the depth axis, the upper boundary being of a respective one of the individual flow paths with the upper boundary extending at a second low-angle with respect to the longitudinal axis;
- the mounting of each one of the trays being effective to mount the respective tray with the respective upturned lips extending generally in the depth axis direction to define a respective relatively-still sludge collection zone between the upturned lips and below each respective next-above individual flow path and above the respective one of the trays;
- the respective upturned lip that extends along each of the respective entrance edge and the respective fluid exit edge being configured to define a depth of the respective relatively-still sludge collection zone generally in the depth direction so that the respective relatively-still sludge collection zone is configured to receive and retain settled-particles that have settled from the respective next-above individual flow path;
- wherein each of the first and second low-angles is in a range of from zero degrees to thirty degrees, and in the range with respect to one or both of the longitudinal or the transverse axis;
- wherein each planar central section of each tray is further configured with sludge exit edges extending transversely with respect to the entrance edge and to the fluid exit edge;
- wherein the frame mounts the sludge exit edges of each of the trays to extend at the second low-angle with respect to the longitudinal axis; and
- a sludge removal lip corresponding to each of the sludge exit edges, each of the sludge removal lips extending along and under a respective sludge exit edge so that pairs of the sludge removal lips are opposed generally in the direction of the transverse axis and support a respective one of the trays at the second low-angle.

18. Apparatus as recited in claim 17, wherein:
- each of the sludge removal lips is further configured to extend from under the respective sludge exit edge of one tray generally parallel to the depth axis and toward the next lower adjacent tray for a distance about equal to the height of the respective separate flow path for which the one tray is the upper boundary;
- each sludge removal lip of a respective pair of sludge removal lips is spaced from the respective sludge exit edge of a next lower adjacent tray to define a sludge removal slot extending at the low-angle.

19. Apparatus as recited in claim 17, wherein each sludge removal lip of a respective pair of sludge removal lips is spaced from the respective sludge exit edge of a next-lower adjacent tray to define a sludge exit slot extending along the respective sludge exit edge of a next-lower adjacent tray, the apparatus further comprising:
- a sludge pusher received in each of the relatively-still sludge collection zones, each sludge pusher being configured to extend at the second low-angle and to extend substantially completely between the respective entrance edge and the respective fluid exit edge of a respective tray and to extend along the full extent of the depth of the respective relatively-still sludge collection zone;
- a gantry configured to straddle the trays that are mounted generally in the mutually-parallel spaced relationship, the gantry being configured to slidably connect to each sludge pusher received in each respective relatively-still sludge collection zone; and
- a gantry drive for causing the gantry to simultaneously move each sludge pusher in the respective relatively-still sludge collection zone against particles that have settled from the adjacent next-above flow path so that the settled-particles move through the respective sludge exit slots and out of the respective relatively-still sludge collection zones.

20. Apparatus as recited in claim 19, the apparatus further comprising:
- a sludge receiver chamber configured to define a sludge combination zone extending vertically and adjacent to each of the respective sludge exit slots;
- the sludge receiver chamber being configured with an opening corresponding to each sludge exit slot to receive from the respective relatively-still sludge collection zone the respective particles that were settled and retained in and removed from that relatively-still sludge collection zone; and
- the sludge receiver chamber being configured to allow the received settled particles from all of the relatively-still sludge collection zones to combine separately from the respective individual flow paths.

21. Apparatus as recited in claim 20, wherein the sludge receiver chamber is further configured with a sludge storage zone for containing the received combined settled particles, the containing being separate from the respective individual flow paths.

22. Apparatus for separating settleable particles from a dirty fluid flow stream, the apparatus comprising:
- a plurality of trays, each tray being configured with a planar central section, an entrance edge at one end of the section and a fluid exit edge at another end of the section, each tray being further configured with an upturned lip extending along each of the entrance edge and the fluid exit edge, each upturned lip being generally perpendicular with respect to the planar central section;
- a frame defining an orthogonal axis system comprising orthogonal longitudinal, transverse and depth axes, the frame supporting the trays in mutually-parallel spaced relationship with one tray in a direction of the depth axis above a next-lower adjacent tray and the one tray in the depth axis direction below a next-above adjacent tray to divide the fluid flow stream into a plurality of individual flow paths;

the frame mounting each one of the trays with the entrance edge and the fluid flow exit edge of each of the trays extending at a first low-angle with respect to the transverse axis so that each upturned lip extends generally in the depth direction;

the mounting of each one of the trays being effective to define an upper boundary in the direction of the depth axis, the upper boundary being of a respective one of the individual flow paths with the upper boundary extending at a second low-angle with respect to the longitudinal axis;

the mounting of each one of the trays being effective to mount the respective tray with the respective upturned lips extending generally in the depth axis direction to define a respective relatively-still sludge collection zone between the upturned lips and below each respective next-above individual flow path and above the respective one of the trays;

the respective upturned lip that extends along each of the respective entrance edge and the respective fluid exit edge being configured to define a depth of the respective relatively-still sludge collection zone generally in the depth direction so that the respective relatively-still sludge collection zone is configured to receive and retain settled-particles that have settled from the respective next-above individual flow path;

wherein each of the first and second low-angles is in a range of from zero degrees to thirty degrees, and in the range with respect to one or both of the longitudinal or the transverse axis; and a sludge pusher received in each of the relatively-still sludge collection zones, each sludge pusher being configured to extend substantially completely between the entrance edge and the fluid exit edge of a respective tray and to extend along the full extent of the depth of the respective relatively-still sludge collection zone, each sludge pusher being movable generally parallel to the transverse axis in the respective relatively-still sludge collection zone against particles that have settled from the adjacent next above-flow path, the movement of the sludge pushers being effective to remove the settled-particles from the respective relatively-still sludge collection zones while each of the adjacent next-above flow paths continues to flow at the low-angle above the respective lower relatively-still sludge collection zone.

23. Apparatus for separating settleable particles from a dirty fluid flow stream, the apparatus comprising:

a plurality of trays, each tray being configured with a planar central section, an entrance edge at one end of the section and a fluid exit edge at another end of the section, each tray being further configured with an upturned lip extending along each of the entrance edge and the fluid exit edge, each upturned lip being generally perpendicular with respect to the planar central section;

a frame defining an orthogonal axis system comprising orthogonal longitudinal, transverse and depth axes, the frame supporting the trays in mutually-parallel spaced relationship with one tray in a direction of the depth axis above a next-lower adjacent tray and the one tray in the depth axis direction below a next-above adjacent tray to divide the fluid flow stream into a plurality of individual flow paths;

the frame mounting each one of the trays with the entrance edge and the fluid flow exit edge of each of the trays extending at a first low-angle with respect to the transverse axis so that each upturned lip extends generally in the depth direction;

the mounting of each one of the trays being effective to define an upper boundary in the direction of the depth axis, the upper boundary being of a respective one of the individual flow paths with the upper boundary extending at a second low-angle with respect to the longitudinal axis;

the mounting of each one of the trays being effective to mount the respective tray with the respective upturned lips extending generally in the depth axis direction to define a respective relatively-still sludge collection zone between the upturned lips and below each respective next-above individual flow path and above the respective one of the trays;

the respective upturned lip that extends along each of the respective entrance edge and the respective fluid exit edge being configured to define a depth of the respective relatively-still sludge collection zone generally in the depth direction so that the respective relatively-still sludge collection zone is configured to receive and retain settled-particles that have settled from the respective next-above individual flow path;

wherein each of the first and second low-angles is in a range of from zero degrees to thirty degrees, and in the range with respect to one or both of the longitudinal or the transverse axis;

a sludge pusher received in each of the relatively-still sludge collection zones;

a gantry configured to straddle the trays that are mounted generally horizontally in the mutually-parallel spaced relationship, the gantry being configured to slidably connect to each sludge pusher received in each respective relatively-still sludge collection zone of the apparatus; and a gantry drive movable parallel to the transverse axis to cause the gantry to simultaneously move each sludge pusher in the respective relatively-still sludge collection zone against particles that have settled from the adjacent next-above flow path;

the movement of the sludge pushers being effective to remove the settled particles from the respective relatively-still sludge collection zones while each of the adjacent next above flow paths continues to flow at the low-angle above the respective flow path.

24. Apparatus for separating settleable particles from a dirty fluid flow stream, the apparatus comprising:

a plurality of trays, each tray being configured with a planar central section, an entrance edge at one end of the section and a fluid exit edge at another end of the section, each tray being further configured with an upturned lip extending along each of the entrance edge and the fluid exit edge, each upturned lip being generally perpendicular with respect to the planar central section; and a frame defining an orthogonal axis system comprising orthogonal longitudinal, transverse and depth axes, the frame supporting the trays in mutually-parallel spaced relationship with one tray in a direction of the depth axis above a next-lower adjacent tray and the one tray in the depth axis direction below a next-above adjacent tray to divide the fluid flow stream into a plurality of individual flow paths;

the frame mounting each one of the trays with the entrance edge and the fluid flow exit edge of each of the trays extending at a first low-angle with respect to the transverse axis so that each upturned lip extends generally in the depth direction;

the mounting of each one of the trays being effective to define an upper boundary in the direction of the depth axis, the upper boundary being of a respective one of the individual flow paths with the upper boundary extending at a second low-angle with respect to the longitudinal axis;

the mounting of each one of the trays being effective to mount the respective tray with the respective upturned lips extending generally in the depth axis direction to define a respective relatively-still sludge collection zone between the upturned lips and below each respective next-above individual flow path and above the respective one of the trays;

the respective upturned lip that extends along each of the respective entrance edge and the respective fluid exit edge being configured to define a depth of the respective relatively-still sludge collection zone generally in the depth direction so that the respective relatively-still sludge collection zone is configured to receive and retain settled-particles that have settled from the respective next-above individual flow path;

wherein each of the first and second low-angles is in a range of from zero degrees to thirty degrees, and in the range with respect to one or both of the longitudinal or the transverse axis;

each of the respective upturned lips terminates at a distance above the respective tray, the respective upturned lip and the next-above adjacent tray defining a depth of a dirty flow entrance slot that admits the dirty flow stream to one of the individual flow paths;

each respective upturned lip that extends along each of the respective entrance edges being effective to protect the relatively-still sludge collection zone from the dirty flow stream admitted to the respective individual flow path to promote settling of settleable-particles from flow stream, the promoted settling being into the relatively-still sludge collection zone;

wherein each relatively-still sludge collection zone is configured with open sides extending between the respective lips; and a sludge pusher received in each of the relatively-still sludge collection zones, each sludge pusher being configured to move across the respective tray generally parallel to the transverse axis against particles that have settled from the next-above adjacent particle-settling flow path so that the settled particles are pushed from the relatively-still sludge collection zone through the respective open side of the respective relatively-still sludge collection zone.

25. Apparatus for separating settleable particles from a fluid flow stream, the apparatus comprising:

a frame configured with a plurality of opposed and spaced pairs of brackets, the spacing of the brackets of one pair corresponding to a width of the fluid flow stream, the width being in a transverse direction, the brackets extending at a low-angle with respect to a fluid flow axis of the apparatus, the fluid flow axis being perpendicular to the transverse direction, a length of the brackets in the direction of the low-angle being configured with respect to a particle settling distance extending in a settling direction that is perpendicular to the fluid flow axis and with respect to a rate of flow of the fluid flow stream, one opposed and spaced pair of brackets being between a next-upper pair of the opposed and spaced pairs of brackets a next-lower pair of the opposed and spaced pairs of brackets; and a plurality of generally planar trays, a first of the trays being supported by the one opposed and spaced pair of brackets, a next-upper one of the trays being supported by the next-upper pair of the opposed and spaced pairs of brackets, a next-lower one of the trays being supported by the next-lower pair of the opposed and spaced pairs of brackets;

wherein:

each tray is configured with an entrance edge and a fluid exit edge, each of the edges is oriented in the transverse direction, each tray is further configured with a pocket lip, one of the pocket lips extending along a respective one of the entrance edges and one of the pocket lips extending along a respective one of the fluid exit edges, each pocket lip extends toward a respective one of the next-upper respective planar tray and upwardly to a top and toward but separated by a flow space from the next-upper tray;

the next-upper tray and the tops of the pocket lips of the first tray cooperate to define a fluid flow path extending at a low-angle with respect to the fluid flow axis and in the transverse direction so that the plurality of adjacent trays divides the fluid flow stream into a series of individual fluid flow paths, the individual fluid flow paths are spaced vertically, each individual fluid flow path has a flow path depth less than a particle settling distance at a given fluid flow rate;

the pocket lips of the first tray define each respective individual fluid flow path as a fluid flow zone adjacent to and along the next-upper tray;

the pocket lips of the first tray cooperate with the respective first tray to define a pocket comprising a relatively-still sludge collection zone immediately below the respective individual fluid flow path that is adjacent to and along the next-upper tray, the cooperating lips of the first tray are configured to define a depth generally in the settling direction of the respective pocket and of the respective relatively-still sludge collection zone, the respective relatively-still sludge collection zone is configured to receive and retain settled particles that have settled from the respective next-above individual fluid flow path;

each tray is further configured with a sludge exit edge;

the frame supports the trays with the sludge exit edge extending at the low-angle with respect to the fluid flow axis;

one of the brackets of the frame is configured with a sludge exit lip extending along a respective sludge exit edge; and the sludge exit lip is further configured to extend from under the respective sludge exit edge of one tray generally parallel to the settling direction and toward the next lower-adjacent tray for a distance about equal to the flow path depth of the respective individual flow path for which the one tray is the upper boundary.

26. Apparatus as recited in claim 25, wherein:

the sludge exit lip extending from an upper tray is configured with a terminus spaced from the respective sludge exit edge of a next-lower adjacent tray to define a sludge exit slot extending generally at the low-angle.

27. Apparatus as recited in claim 26, the apparatus further comprising:

a sludge pusher received in each of the relatively-still sludge collection zones, each sludge pusher being configured with opposite drive tabs and being movable in the transverse direction in the respective relatively-still sludge collection zone against particles that have settled from the adjacent next-above flow path, the movement of the sludge pushers being effective to remove the settled particles from the respective relatively-still sludge collection zones through the respective sludge exit slots; and wherein the sludge pushers are effective while the pocket lips extending from the upper tray limit the extent in the transverse direction of the fluid flow in the adjacent next-above flow path.

28. Apparatus as recited in claim 27, the apparatus further comprising:

a gantry configured to straddle the plurality of the adjacent trays that divides the fluid flow stream into the vertical series of the individual fluid flow paths, the gantry being further configured with opposed channels extending in the settling direction, one channel being adjacent to each of the respective entrance edges and exit edges of the plurality of trays to slidably receive the drive tab of each of the respective pushers;

the gantry being movable in the transverse direction so that the channels engage a respective one of the drive tabs and cause the sludge pushers to move in the respective relatively-still sludge collection zones against particles that have settled from the adjacent next-above flow path so that the settled particles are removed from the respective relatively-still sludge collection zones through the respective sludge exit slots.

29. Apparatus as recited in claim 28, the apparatus further comprising:

a clean flow chamber having a clean flow opening adjacent to each of the fluid exit edges of the respective trays, the openings being configured to directly receive from each respective individual fluid flow path cleaner fluid after settled-particles have been received and retained in the respective relatively-still sludge collection zone;

a sludge receiver chamber configured to define a sludge combination zone extending vertically and adjacent to the respective sludge exit slots, the sludge receiver chamber being separate from all of the individual flow paths and from the clean flow chamber;

the sludge receiver chamber being configured with an opening corresponding to each sludge exit slot to receive from the respective relatively-still sludge collection zone the respective particles that were settled and retained in and removed from that relatively-still sludge collection zone, the sludge receiver chamber being configured to allow the received settled particles from all of the relatively-still sludge collection zones to flow under the force of gravity and combine separately from the respective flow paths, the sludge receiver chamber being further configured with a sludge storage zone for containing the received combined settled particles, the containing being separate from the respective flow paths.

30. A method of separating settleable particles from a fluid flow stream, the method comprising the operations of:

flowing the fluid flow stream with the particles into a flow channel that extends at a low-angle with respect to a longitudinal direction;

defining a pocket alongside the flow channel, the pocket extending at the low-angle and having a depth that is generally perpendicular to the longitudinal direction;

controlling the flow of the fluid flow stream in the flow channel to promote rapid settling of the particles out of the fluid flow stream and more rapidly settling of the particles into the depth of the pocket while the flow without the settled-particles flows past the pocket as a cleaner flow; and transporting the settled particles in the pocket in a low-angle direction generally transverse to both the longitudinal direction and the settling direction to remove the settled-particles from the pocket.

31. A method as recited in claim 30, further comprising the operation of:

capturing the removed settled particles in a zone that is separate from the fluid flow stream and from the pocket.

32. A method as recited in claim 30, wherein the low-angle of the pocket with respect to the longitudinal direction is a first low-angle that is zero degrees, and wherein the low-angle generally transverse to the longitudinal direction and the settling direction is a second low-angle that is in a range from zero degrees to about thirty degrees.

33. A method as recited in claim 30, wherein the low-angle of the pocket with respect to the longitudinal direction is in a range of angles, and wherein the low-angle generally transverse to the longitudinal direction and the settling direction is in the range of angles, and wherein each range of angles is from zero degrees to about thirty degrees.

34. A method as recited in claim 30, wherein the transporting comprises the operations of:

providing a pusher configured as an elongated rectangle that is narrow in the transverse direction and elongated in the direction of the low-angle to extend completely across the pocket and in a direction of the settling about equal to the depth of the pocket;

mounting the pusher in the pocket with the elongated blade parallel to the low-angle and to the settling direction; and driving a gantry that straddles the pusher to move the mounted pusher across the pocket in the transverse direction and push the settled particles out of the pocket.

* * * * *